(12) United States Patent
Henderson

(10) Patent No.: US 10,308,135 B2
(45) Date of Patent: Jun. 4, 2019

(54) MAGNETIC LEVITATION OF VEHICLES

(71) Applicant: Greg Henderson, Saratoga, CA (US)

(72) Inventor: Greg Henderson, Saratoga, CA (US)

( * ) Notice: Subject to any disclaimer, the term of this patent is extended or adjusted under 35 U.S.C. 154(b) by 0 days.

(21) Appl. No.: 15/579,012

(22) PCT Filed: Jun. 3, 2016

(86) PCT No.: PCT/US2016/035873
§ 371 (c)(1),
(2) Date: Dec. 1, 2017

(87) PCT Pub. No.: WO2016/197031
PCT Pub. Date: Dec. 8, 2016

(65) Prior Publication Data
US 2018/0141459 A1    May 24, 2018

Related U.S. Application Data

(60) Provisional application No. 62/170,646, filed on Jun. 3, 2015.

(51) Int. Cl.
| | | |
|---|---|---|
| *B60L 13/00* | (2006.01) | |
| *B60L 13/04* | (2006.01) | |
| *B60L 13/10* | (2006.01) | |
| *B60L 15/00* | (2006.01) | |
| *B61B 13/08* | (2006.01) | |
| *B61B 13/10* | (2006.01) | |

(52) U.S. Cl.
CPC ........... *B60L 15/005* (2013.01); *B60L 13/003* (2013.01); *B60L 13/04* (2013.01); *B60L 13/10* (2013.01); *B61B 13/08* (2013.01); *B61B 13/10* (2013.01); *B60L 2200/26* (2013.01)

(58) Field of Classification Search
CPC ...... B60L 15/005; B60L 13/003; B60L 13/04; B60L 13/10; B61B 13/08; B61B 13/10
See application file for complete search history.

(56) References Cited

U.S. PATENT DOCUMENTS

| | | | | |
|---|---|---|---|---|
| 5,722,326 A | * | 3/1998 | Post .................. | B60L 13/04 104/281 |
| 9,263,974 B1 | * | 2/2016 | Henderson ............ | H02N 15/00 |
| 2003/0015115 A1 | * | 1/2003 | Lamb .................. | B60L 13/04 104/282 |
| 2003/0112105 A1 | * | 6/2003 | Post .................. | B60L 13/04 335/285 |
| 2007/0089636 A1 | * | 4/2007 | Guardo, Jr. ........... | B60L 13/10 104/281 |
| 2015/0175031 A1 | * | 6/2015 | Henderson ............ | B60L 13/04 180/65.8 |
| 2015/0303768 A1 | * | 10/2015 | Henderson ............ | B60L 13/04 310/90.5 |

(Continued)

*Primary Examiner* — Jason C Smith
(74) *Attorney, Agent, or Firm* — Ramey and Schwaller; William P. Ramey; Melissa D. Schwaller

(57) ABSTRACT

Magnetic levitation can be used for transportation purposes. In various embodiments, the vehicle utilizing magnetic levitation can be enclosed within a tube or a tunnel or outside of an enclosed environment. Various cross-sections of vehicles and tubes can be utilized. In various embodiments, the vehicles can be used for personal or mass transportation use. The vehicle can travel in at least two directions with a window at each end of the vehicle.

27 Claims, 57 Drawing Sheets

(56) References Cited

U.S. PATENT DOCUMENTS

| | | | |
|---|---|---|---|
| 2016/0033970 A1* | 2/2016 | Henderson | B60L 13/04 |
| | | | 701/22 |
| 2016/0039310 A1* | 2/2016 | Melvin | B60L 13/04 |
| | | | 180/65.8 |
| 2017/0028870 A1* | 2/2017 | Nachtmann | B60L 13/04 |
| 2017/0151889 A1* | 6/2017 | Melvin | A63C 17/00 |
| 2017/0210243 A1* | 7/2017 | Olynick | B60L 13/04 |
| 2018/0141459 A1* | 5/2018 | Henderson | B61B 13/08 |

* cited by examiner

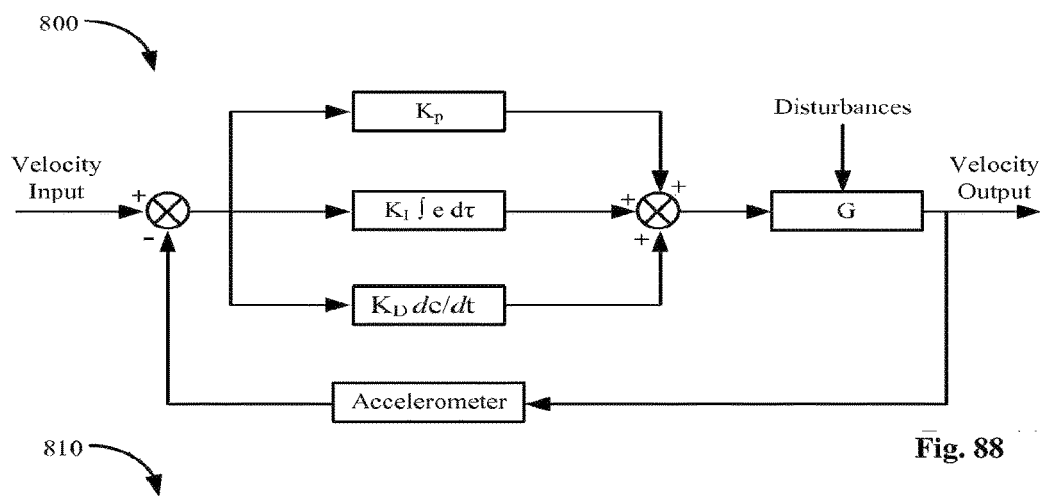
Fig. 88
$$\begin{bmatrix} Xaccel_{CMD} \\ Yaccel_{CMD} \\ YAWaccel_{CMD} \end{bmatrix} * \begin{bmatrix} 1 & -1 & -1 \\ 1 & 1 & -1 \\ -1 & 1 & -1 \\ -1 & -1 & -1 \end{bmatrix} = \begin{bmatrix} Servo1_{CMD} \\ Servo2_{CMD} \\ Servo3_{CMD} \\ Servo4_{CMD} \end{bmatrix}$$
Fig. 89
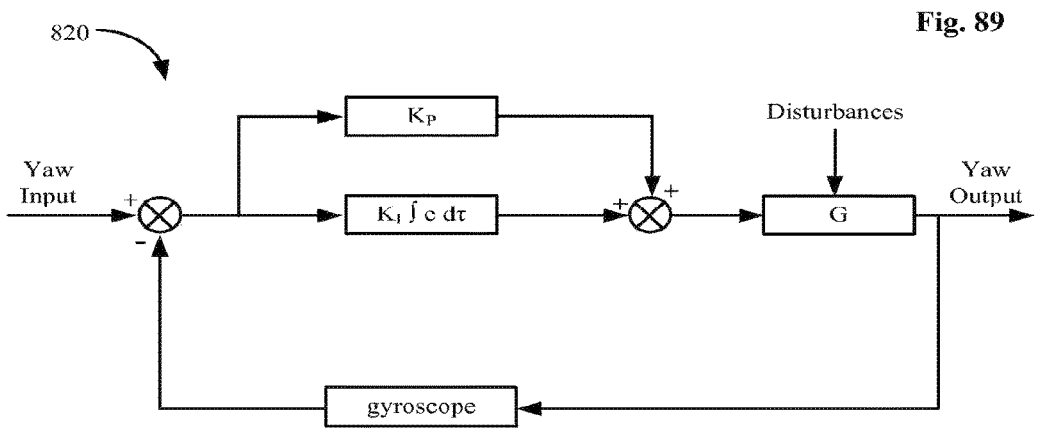
Fig. 90

MAGNETIC LEVITATION OF VEHICLES

CROSS-REFERENCE TO RELATED APPLICATIONS

This application is a continuation of International Application No. PCT/US16/35873, filed Jun. 3, 2016, which claims the benefit of U.S. Provisional Application No. 62/170,646, filed Jun. 3, 2015; the entirety of all are incorporated by reference herein.

FIELD OF THE INVENTION

The present invention generally relates to electromagnetic levitation systems, and more particularly to transportation systems employing magnetic levitation vehicles.

BACKGROUND

Maglev (derived from magnetic levitation) is a transport method that uses magnetic levitation to move vehicles without touching the ground. Generally, with maglev, a vehicle travels along a guideway (corresponding to the rail tracks of conventional railways) and can use magnets to create—lift and propulsion, thereby reducing friction by a great extent and allowing very high speeds.

Currently there are several categories of Maglev Systems, including without limitation, the electrodynamic suspension (EDS), the electromagnetic suspension (EMS) and the Inductrak.

In electromagnetic suspension (EMS) systems, the train levitates above a steel rail while electromagnets, attached to the train, are oriented toward the rail from below. The system is typically arranged on a series of C-shaped arms, with the upper portion of the arm attached to the vehicle, and the lower inside edge containing the magnets. The rail is situated inside the C-shaped arms, between the upper and lower edges. Magnetic attraction varies inversely with the cube of distance, so minor changes in distance between the magnets and the rail produce greatly varying forces. These changes in force are dynamically unstable, a slight divergence from the optimum position tends to grow, requiring sophisticated feedback systems to maintain a constant distance from the track.

In electrodynamic suspension (EDS), both the guideway and the train exert a magnetic field, and the train is levitated by the repulsive and attractive force between these magnetic fields. In some configurations, the train can be levitated only by repulsive force. The magnetic field is produced either by superconducting magnets or by an array of permanent magnets. The repulsive and attractive force in the track is created by an induced magnetic field in wires or other conducting strips in the track. A major advantage of EDS maglev systems is that they are dynamically stable, changes in distance between the track and the magnets creates strong forces to return the system to its original position.

The Inductrak system is based on the principle of electromagnetism to attain repulsive magnetic levitation. The levitation is attained during propulsion at a certain speed as a result of induced electricity produced by the short-circuited coils and the Halbach array permanent magnets. As a result the Inductrak system is less expensive than the previously mentioned two maglev systems (the EDS and EMS).

An advantage of a magnetic levitated vehicle is maintenance, because the vehicle floats along a frictionless magnetic guide way. There is no contact with the ground and therefore no need for any moving plates. As a result there are no components that could wear out. This means that vehicles and tracks would need no maintenance at all. Another advantage is that because maglev vehicles float, there is no friction and noise. Also, as a result the maglev vehicle can travel extremely fast, for example, about 500 kph or more depending on the environment in which it is cruising. If the vehicle travels along a vacuum, it can attain up to 800 kph or more because there is no wind resistance acting against its body.

However, there are several disadvantages with traditional maglev vehicles. Maglev guide paths are bound to be more costly than conventional steel railways. Most existing maglev systems require a continuous magnetic, electromagnetic or super conducting plate that runs the length of the guideway. This means it is costly to build just the guideway system. Relying on complex electromagnetic systems in the tracks, the existing maglev systems can cost tens of millions of dollars per mile.

The other disadvantage of the maglev vehicles is lack of existing infrastructure. For example, if a high-speed line between two cities is built, then high-speed maglev vehicles can only serve both cities but would not be able to serve other lines or normal railways branching out therefrom which require normal speed. This means that maglev vehicles are strictly limited only to high-speed lines and not flexible enough to serve other lines.

Despite its widely acknowledged advantages in safety, speed, and efficiency in transit applications, governments and transit authorities have been extremely slow to adopt maglev vehicles due to cost and lack of flexibility.

One of the primary objects of this invention therefore is to provide a magnetic levitated transport system that solves the drawbacks inherent to the existing maglev vehicle systems.

The present invention in one or more embodiments, relates to a magnetic levitation vehicle of any shape that levitates using magnetic fields to induce eddy currents in a conductive substrate, without having to necessarily be on a guideway. In particular, hover engines are described with a rotating configuration of magnets to induce eddy currents in a conductive substrate where the interaction between the magnets and the induced eddy currents are used to generate lift forces and/or propulsive forces.

SUMMARY

An embodiment of the disclosure is a device for transportation utilizing magnetic levitation comprising one or more vehicles capable of use for transportation in a tube or over any conductive substrate comprising at least one hover engine, each hover engine having an electric motor including a winding, a first set of magnets and a first structure which holds the first set of magnets wherein an electric current is applied to the winding to cause one of the winding or the first set of magnets to rotate; wherein the magnets are permanent magnets, electromagnets, or a combination of permanent magnets and electromagnets; a second structure, configured to receive a rotational torque from the electric motor to rotate the second structure, the structure holding a second set of magnets wherein the second set of magnets are rotated to induce eddy currents in a substrate such that the induced eddy currents and the second set of magnets interact to generate forces which cause the vehicle to hover above and/or translate from location to location along the substrate; wherein the magnets are permanent magnets, electromagnets, or a combination of permanent magnets and electromagnets; one or more speed controllers coupled to the at least one hover engine; an electric power source that supplies the electric current to the at least one hover engine via the one or more speed controllers; and a travelling surface; wherein the one or more vehicles are capable of moving in at least two directions. In an embodiment, the cross-section of the vehicle is a different shape than the cross-section of the tube. In an embodiment, the cross-section of the vehicle is a shape that is the same as the cross-section of the tube. In an embodiment, the vehicle is capable of moving in at least four directions. In an embodiment, the vehicle is capable of moving in at least five directions. In an embodiment, the directions are forward, backward, laterally, diagonally, and upward. In an embodiment, the vehicle is controlled by an individual inside of the vehicle. In an embodiment, the vehicle is controlled by an external entity. In an embodiment, the entity is selected from the group consisting of an individual and a computer. In an embodiment, the device transports people. In an embodiment, the device transports cargo. In an embodiment, the vehicle travels on at least one selected from the group consisting of conduit, tube, tunnel, over any conductive substrate, and rail.

An embodiment of the disclosures is a system of transportation comprising the vehicle of claim 1 and a network of interconnected traveling surfaces. In an embodiment, the interconnected traveling surfaces comprise at least one selected from the group consisting of conduit, tube, tunnel, and rail. In an embodiment, the interconnected traveling surfaces are tubes. In an embodiment, the cross-section of the vehicle is a different shape than the cross-section of the tube. In an embodiment, the cross-section of the vehicle is a shape that is the same as the cross-section of the tube. In an embodiment, the vehicle carries individuals. In an embodiment, the vehicle carries cargo. In an embodiment, the interconnected traveling surfaces comprise a conductive substrate. In an embodiment, the vehicle travels in a tube. In an embodiment, the tube has been pressurized. In an embodiment, the tube has been evacuated of fluid. In an embodiment, a route of the vehicle can be changed dynamically. In an embodiment, the vehicle can be used with at least one selected from the group consisting of wheels, skids, standoffs, lifts, struts, superconductivity, or other means of static or dynamic support, tracking, propulsion, levitation, guidance, and influence. In an embodiment, at least one selected from the group consisting of suspension struts, levitation, rolling, track, or suspension components extend from the vehicle in a manner that reduces aerodynamic obstruction within the tube. In an embodiment, the vehicles travel between 400-800 mph (643.74-1287.48 kph).

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIGS. 186A to 86C are illustrations of a magnetically lifted device with four tiltable STARMs tilted in various configurations in accordance with the described embodiments.

FIGS. 88 to 90 are illustrations of block diagrams and equations associated with a guidance, navigation and control system in accordance with the described embodiments.

DETAILED DESCRIPTION

Figure 1:
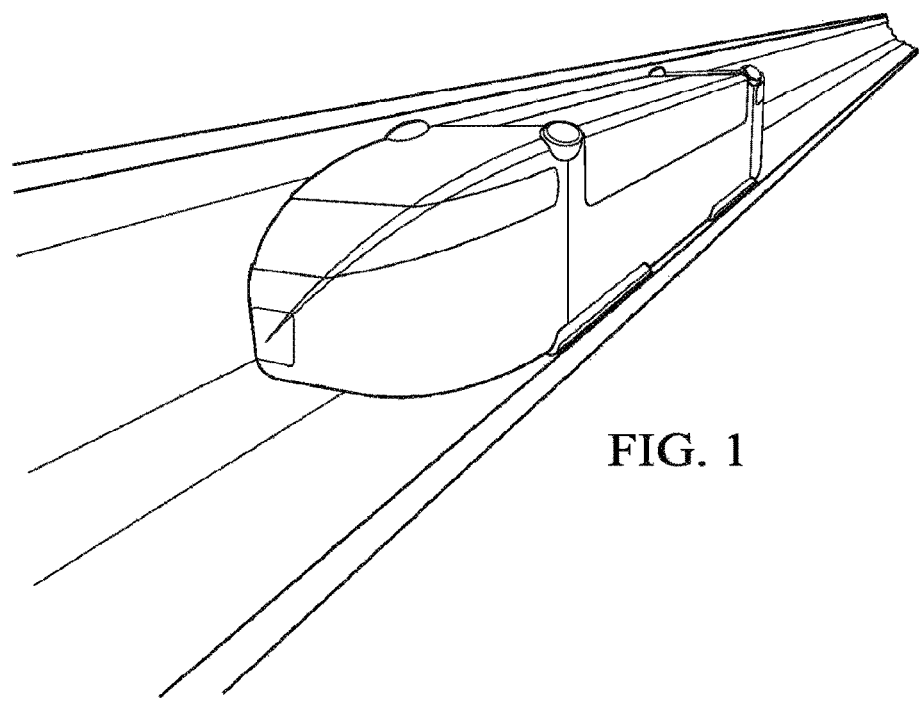
FIG. 1 is an illustration of a vehicle in a tube in accordance with the described embodiments.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure can be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

The following applications and patents are hereby incorporated by reference: Continuation-in-part of application Ser. No. 14/737,442, filed on Jun. 11, 2015, now U.S. Pat. No. 9,325,220, which is a continuation-in-part of application Ser. No. 14/639,045, filed on Mar. 4, 2015, now U.S. Pat. No. 9,126,487, which is a continuation-in part of application Ser. No. 14/639,047, filed on Mar. 4, 2015, which is a continuation-in-part of application Ser. No. 14/069,359, filed on Oct. 31, 2013, now U.S. Pat. No. 9,148,077, Continuation-in-part of application Ser. No. 14/737,444, filed on Jun. 11, 2015, which is a continuation-in-part of application Ser. No. 14/639,045, filed on Mar. 4, 2015, now U.S. Pat. No. 9,126,487, which is a continuation-in-part of application Ser. No. 14/639,047, filed on Mar. 4, 2015, which is a continuation-in-part of application Ser. No. 14/069,359, filed on Oct. 31, 2013, now U.S. Pat. No. 9,148,077 and Provisional application No. 62/066,891, filed on Oct. 21, 2014, provisional application No. 62/011,011, filed on Jun. 11, 2014, provisional application No. 62/031,756, filed on Jul. 31, 2014, provisional application No. 62/031,756, filed on Jul. 31, 2014, provisional application No. 62/011,011, filed on Jun. 11, 2014, provisional application No. 61/977,045, filed on Apr. 8, 2014, provisional application No. 62/066,891, filed on Oct. 21, 2014, provisional application No. 61/799,695, filed on Mar. 15, 2013, provisional application No. 62/066,891, filed on Oct. 21, 2014, provisional application No. 62/011,011, filed on Jun. 11, 2014, provisional application No. 62/031,756, filed on Jul. 31, 2014, provisional application No. 61/977,045, filed on Apr. 8, 2014, provisional application No. 62/066,891, filed on Oct. 21, 2014, provisional application No. 62/011,011, filed on Jun. 11, 2014, provisional application No. 62/031,756, filed on Jul. 31, 2014, provisional application No. 61/799,695, filed on Mar. 15, 2013.

Transportation System Employing Magnetic Levitation Vehicles

Various transportation systems employing magnetic levitation vehicles are described herein. In particular, arrangements of substrate and magnetic levitation Vehicles to provide cheap and flexible transportation system are described.

Transportation system includes infrastructure and vehicles. Infrastructure is the fixed installations that allow a vehicle to operate. It consists of a way, a terminal and facilities for parking and maintenance. The concept between the conventional Maglev trains (i.e., EDS, EMS and the Inductrak) and the magnetic levitation Vehicles employing hover engine may seem similar, but they work differently from each other. Unlike the maglev trains, which run and work only on a maglev rail track in a very limited route whereby its movement and direction is very limited, the magnetic levitation vehicles employing hover engine on the other hand work like an automobile, and can freely move anywhere it goes, and with distinct feature and characteristic wherein it can move in an arbitrary directional manner.

In the magnetic levitation Vehicle employing hover engine, magnetic engine is entirely contained within the object being levitated, magnetic engine can also generate thrust and directional control magnetically, so it doesn't need a track for guidance, thus the only required infrastructure is a conductive surface, this means systems of any scale could be laid quickly and cheaply.

A conductive substrate can form a roadway above which the magnetic levitation Vehicle operates. The conductive substrate can be formed from copper. In particular, three one eighth inch sheets of copper layered on top of one another are used. Other conductive materials can be used. For example, a road using a top sheet of copper over aluminum sheets or only aluminum sheets can be used. The thickness of the conductive material which is used can depend on the material properties of the conductive material, such as its current carrying capacity and the amount of magnetic lift which is desired.

A substrate can include a portion which is configured to support induced eddy currents. In addition, it can include portions used to add mechanical support or stiffness, to provide cooling. For example, pipes or fins can be provided which are configured to remove heat. In another example, the substrate can be formed as a plurality of tiles which are configured to interface with one another. In an example, the portion of the substrate which is used to support the induced eddy currents may be relatively thin and additional materials may be added to provide structural support and stiffness.

In other embodiments, the portion of the substrate which supports the eddy currents can be formed from layers of different materials. For example, an electric insulator may be used between layers of a conductive material, such as layers of copper insulated from one another. In another example, one or more layers of a ferromagnetic material can be used with one or more paramagnetic materials or diamagnetic materials.

The roadway can include various sloped, flat, or curved surfaces. Curved surfaces may be formed more easily using a number of layered thin sheets. In another example, the surface of the substrate can include a surface structure, such as raised or sunken dimples which effect induced eddy currents.

In yet another example, the surface can be multi-use, for instance, a roadway consisting of a layer of asphalt over copper could accommodate both maglev and conventional vehicles.

Unlike the conventional maglev trains (i.e., EDS, EMS and the Inductrak), which run and work only on a maglev rail track in a very limited route whereby its movement and direction is very limited, the magnetic levitation vehicle employing hover engine on the other hand work like an automobile, and can freely move anywhere it goes, and with distinct feature and characteristic wherein it can move in an arbitrary directional manner. Therefore, a magnetic levitation vehicle employing hover engines can be used as a single vehicle only if it runs above a conductive substrate, and if a roadway is consisted of a layer of asphalt over copper, the vehicles employing hover engines can run together with conventional vehicles on the same roadway.

In various embodiments, a plurality of vehicles can link together to form a train or a vehicle group. In one embodiment, the vehicles can be mechanically linked to form a train to carry massive cargo, and the linkages may be constructed from open chains, closed chains, or a combination of open and closed chains. Each vehicle provides lift force and propulsive force for the train.

In another embodiment, the vehicles can be non-mechanically linked to form a vehicle group. A mobile control unit such as the aforementioned GNC system can be located on each vehicle in the group and obtain and process data from a plurality of sensors also located on the vehicle. The GNC system can be configured to communicate, either directly or indirectly, with a group control system assigned to the group using a wireless communications solution. The group control system can acquire monitoring data for the entire group of associated vehicles, which can be used to manage the group of associated vehicles and/or one or more individual vehicles in the group. The group control system can be located on a vehicle traveling as part of the group of associated vehicles or at a fixed location. The GNC system can receive command from the group control system, interpret it and then in response generate one or more additional commands involving controlling the actuators and/or hover engines to implement the commands, such as move right, move in some direction or rotate in place.

In yet another embodiment, a vehicle group can be dynamically switched, for example, when there exist a temporary need of mass transport, a number of vehicles can form a group to carry massive cargo, and after finishing the task, each vehicle can withdraw from the group and be used as a single one, so as to improve the flexibility of using the vehicles.

With respect to FIG. 1, a vehicle in a tube in accordance with the present disclosure is described. In an embodiment, the tube can be any shape with a substantially hollow interior. In various embodiments, the tube is including but not limited to circular, rectilinear, polygonal, substantially non-circular, ovoid, elliptical, conic, or any combination thereof. In various embodiments, the tube is formed of including but not limited to catenary, hyperbolic, parabolic, arched, circular-arched sections, or any combination thereof. In various embodiments, the vehicles can be used for mass transportation or personal use. In various embodiments, the size of the vehicle depends upon the number of people or amount of cargo to be transported. In various embodiments, the tube, tunnel, or track that the vehicle travels In one embodiment, the vehicle include a body which has vertical and horizontal walls, the horizontal walls serving to form both a floor and a ceiling, while the vertical walls forming side walls. A front wall of the body projects outwardly, forming a streamlined shape, such that reducing the aerodynamic drag. A windshield is mounted on the front wall. In other embodiment, the rear wall is the same as the front wall of the body, that is, the rear wall projects outwardly; forming a streamlined shape and a windshield is mounted on the rear wall, such that when the vehicle moves in two opposite directions, the aerodynamic drags in two opposite directions can be reduced equally. In an embodiment, a rear wall of the body is substantially flat and arranged vertically on the rear of the body. In an embodiment, a plurality of hover engines are positioned on the exterior of the vehicle. In an embodiment, one hover engine is present on each corner of the vehicle. In an embodiment, four hover engines which are fully housed are set under the floor of the vehicle. In other embodiment, the number of hover engines may vary from two to any plural number, and the hover engines may be partially housed, shrouded, faired, enclosed, or shielded.

In an embodiment, a tube or tunnel encloses the vehicle to protect the vehicle from environments. The wall of the tube or tunnel can be formed from conductive materials such as aluminum or copper, thus the wall of the tube or tunnel can interact with the hover engines on the vehicle to induce eddy currents and generate lift and propulsion forces to drive the vehicle. In other embodiment, the tube can be stitched by planks which are formed from different materials, for example, the planks serving as a bottom of the tube are formed of conductive materials such as aluminum or copper, the planks serving as parts of the tube other than the bottom may be formed of non-conductive materials such as engineering plastics.

In one embodiment, the cross-section of the tube and vehicle are substantially rectangular, but the tube and vehicle may have different cross-sections. In an embodiment, the cross-section of the tube can be circular. For example, the tube, tunnel, or route enclosure may have other than rectangular cross-section. For example, it may have square, circular, polyhedral, convex, concave, or otherwise featured cross-section or cross-sections. The vehicle can be substantially shaped otherwise in cross-section than the form of the tunnel, tube, or route enclosure. For example, the vehicle may have square, rectangular, polyhedral, convex, concave, or other cross-sections. The tube, tunnel, or route enclosure and vehicle may have different cross-sections. For example, this may include combinations represented by square/round, round/square, round/triangular, rectangular/round, and others. In other embodiment, vehicles only partially occupying the cross-sectional area of a tube, tunnel, or route enclosure can bypass fluids, in available area or areas, to reduce impediment to travel, especially to very high speed travel in evacuated tubes, tunnels, or route enclosures.

Referring to FIG. 1, the inner surface of the bottom of a tube is not planar; it includes a horizontal plane and two outward inclined planes. The bottom surfaces of the hover engines confront the two outward inclined planes and are parallel to them. so as to generate the largest lift and propulsive forces. Moreover, the two outward inclined planes can provide additional forces directing inward of the tube to help to guide the vehicle when the vehicle operates. In an embodiment, the upper surfaces of the tube and vehicle are the same as the bottom. In an embodiment, only the outward inclined planes of the tube comprise the conductive substrate. In an embodiment, the entire tube comprises the conductive substrate.

In another embodiment, the inner surface of the bottom of a tube can be a level, horizontal surface, and the bottom surfaces of the hover engines may be parallel to the inner surface of the bottom of a tube, so as to generate the largest lift and propulsive forces when the vehicle operates. In an embodiment, the upper surface of the tube is the same as the bottom surface of the tube.

In order to generate the largest lift and propulsive forces when the vehicle operates, the hover engines may vary in orientation and position relative to various magnetic levitation substrates or other materials or surfaces. This variation or orientation or position may allow various capabilities or aspects of performance to be balanced, exchanged, or prioritized. For example, hover engine assemblies, parts, or components may adjust, passively or actively, to accommodate transit in a tube vs. movement on a planar surface, vs. accommodating transitions between two differently configured surfaces or substrates.

Figure 2:
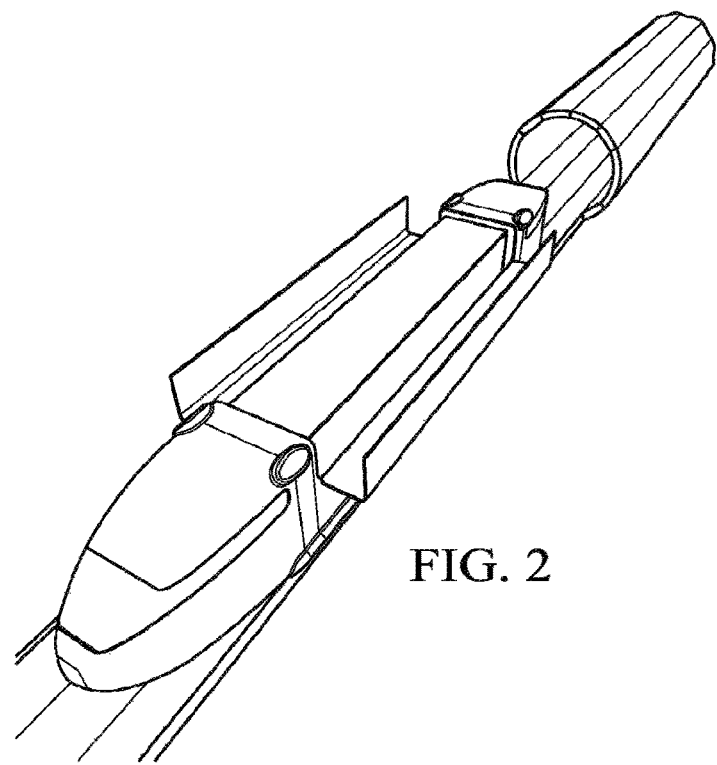
FIGS. 2 and 3 are illustrations of a vehicle with cargo in a tube in accordance with the described embodiments.
Figure 3:
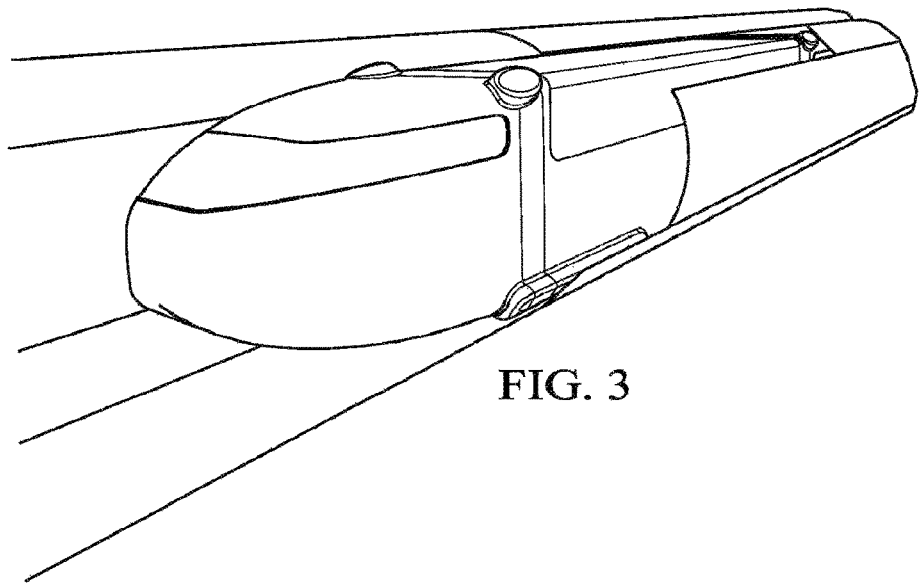
Figure 4:
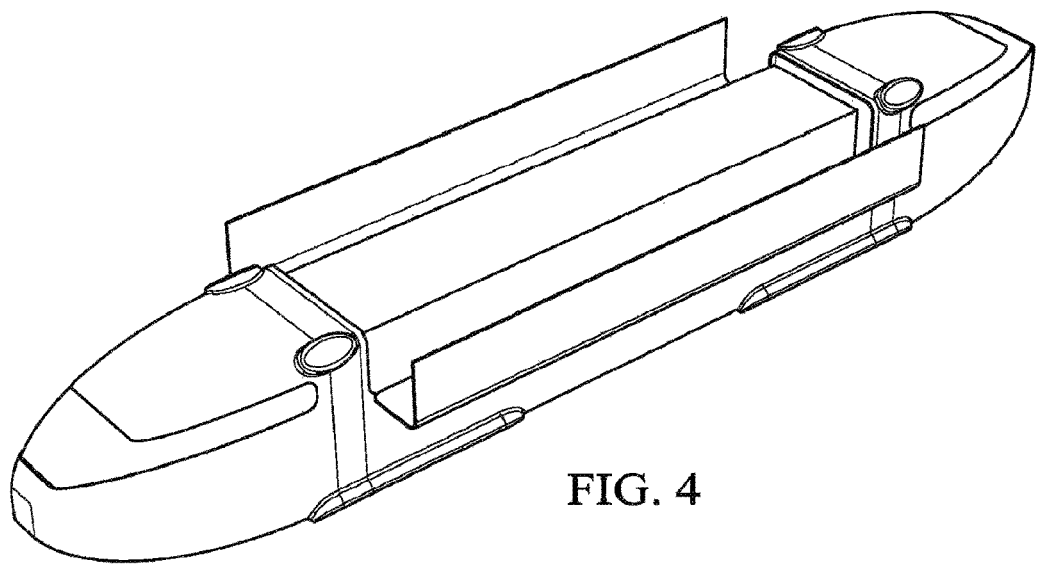
FIGS. 4 to 6 are illustrations of unloading cargo from a vehicle in accordance with the described embodiments.
Figure 5:
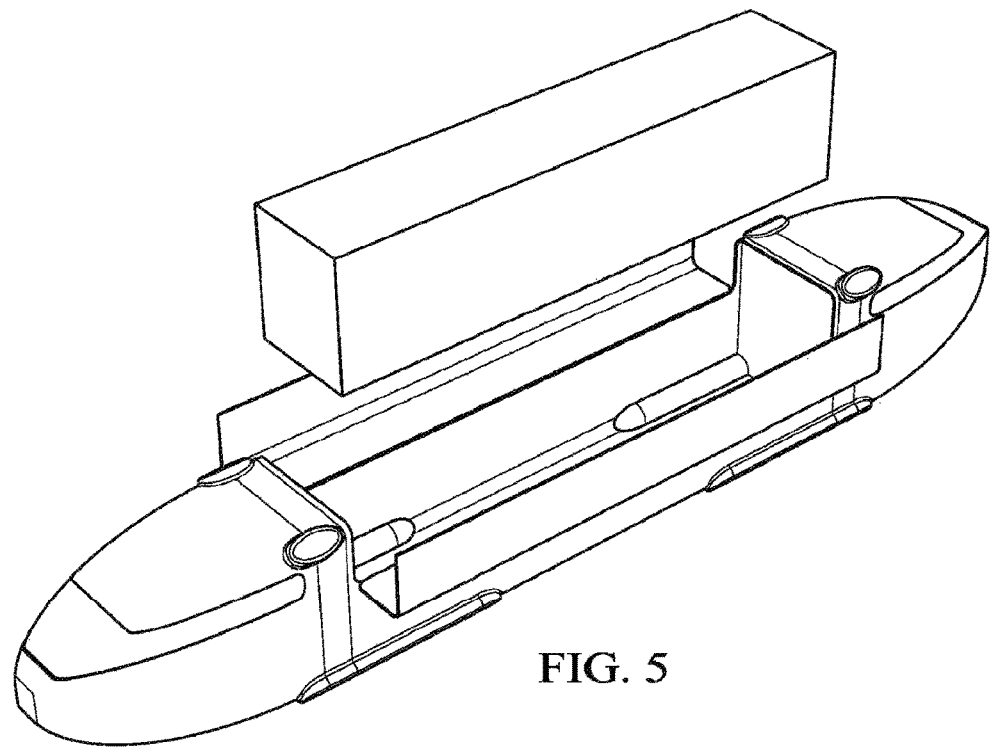
Figure 6:
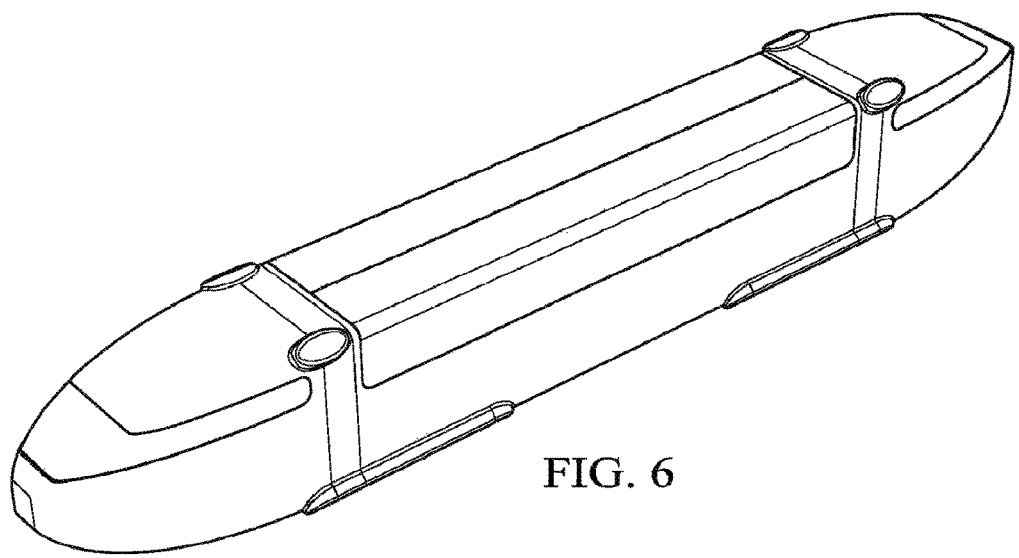
Figure 7:
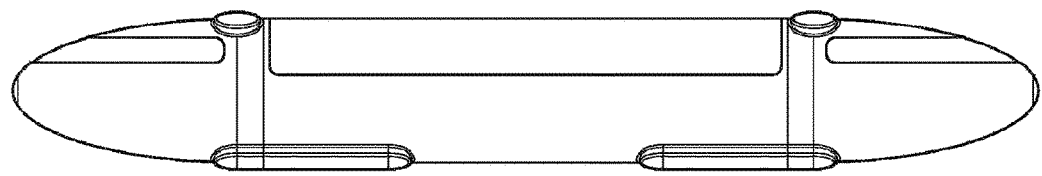
FIGS. 7 to 9 are illustrations of loading cargo to a vehicle in accordance with the described embodiments.
Figure 8:
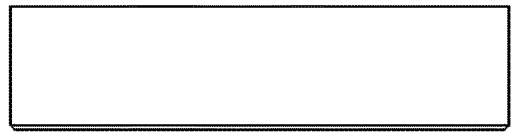
Figure 8:
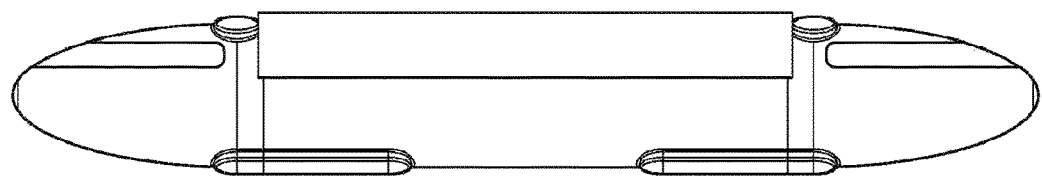
Figure 9:
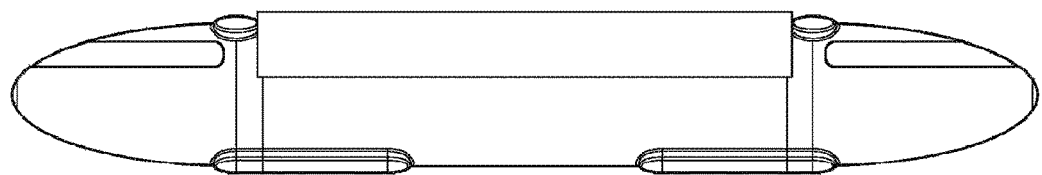
Figure 10:
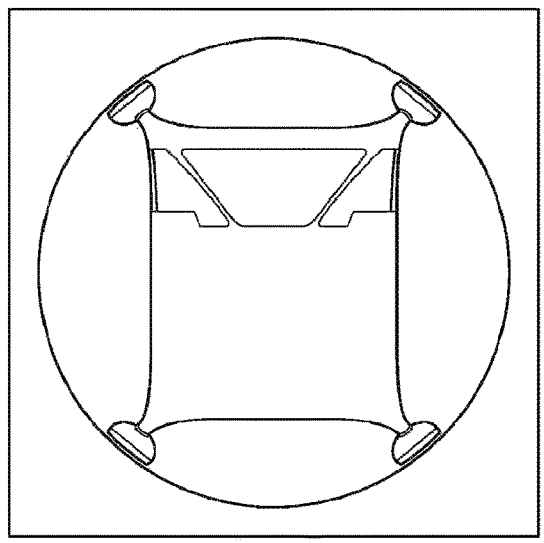
FIG. 10 is a front view of a vehicle in a tube in accordance with the described embodiments.
Figure 11:
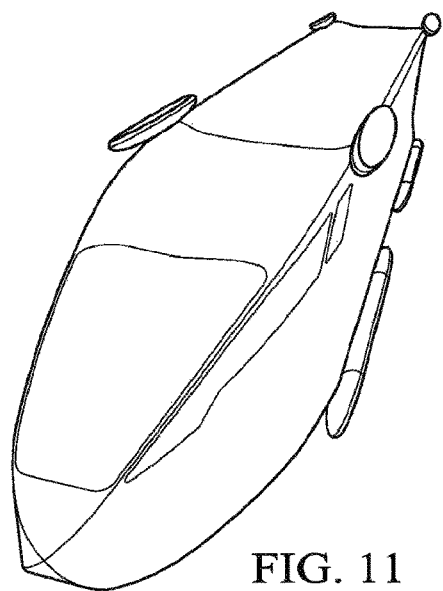
FIG. 11 is an illustration of a vehicle in accordance with the described embodiments.
Figure 12:
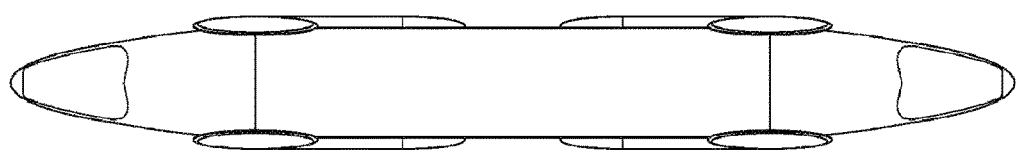
FIG. 12 is an illustration of a top view of the vehicle in FIG. 11 in accordance with the described embodiments.
Figure 13:
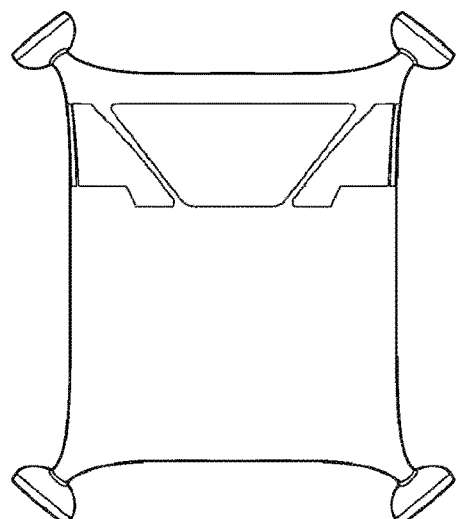
FIG. 13 is a front view of FIGS. 11 and 12 in accordance with the described embodiments.
Figure 14:
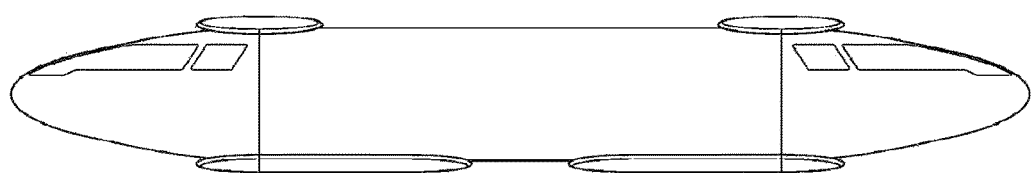
FIGS. 14 and 15 are illustrations of the side view of the vehicle in FIGS. 11-13 in accordance with the described embodiments.
Figure 15:
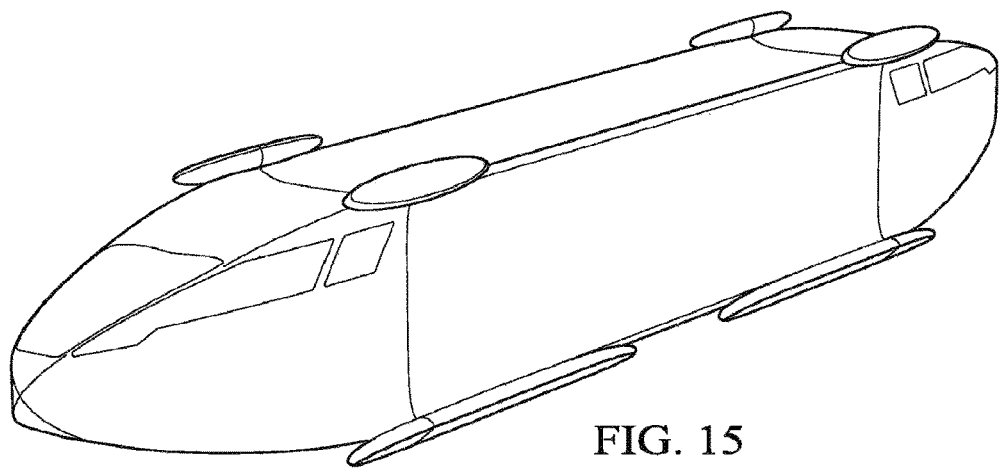
Figure 16:
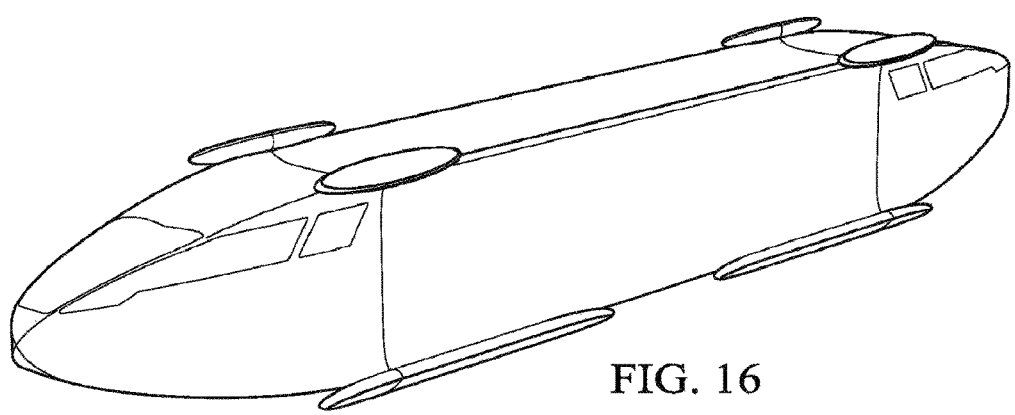
FIG. 16 is an illustration of another vehicle in accordance with the described embodiments.
Figure 17:
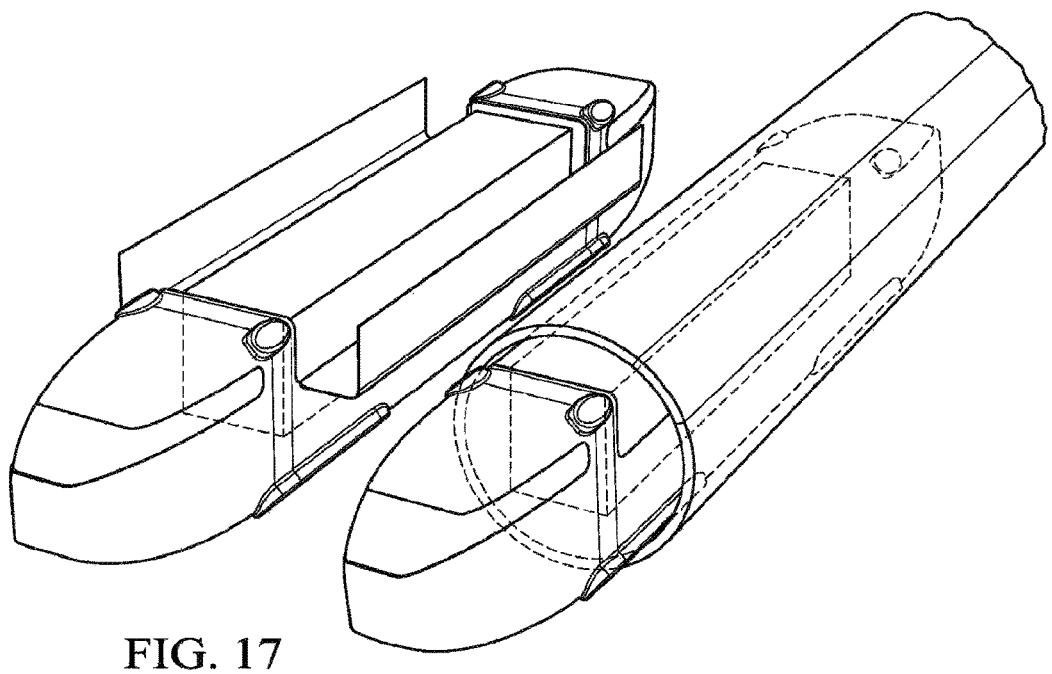
FIGS. 17 to 22 are illustrations of another vehicle with cargo for use in a tube in accordance with the described embodiments.
Figure 18:
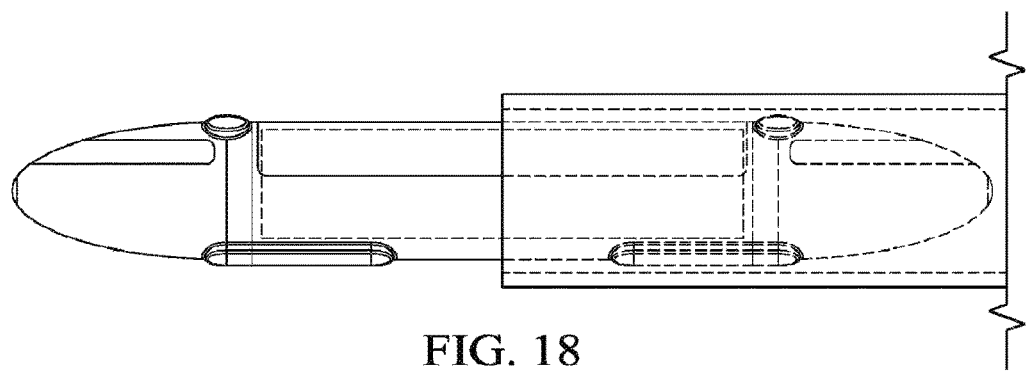
Figure 19:
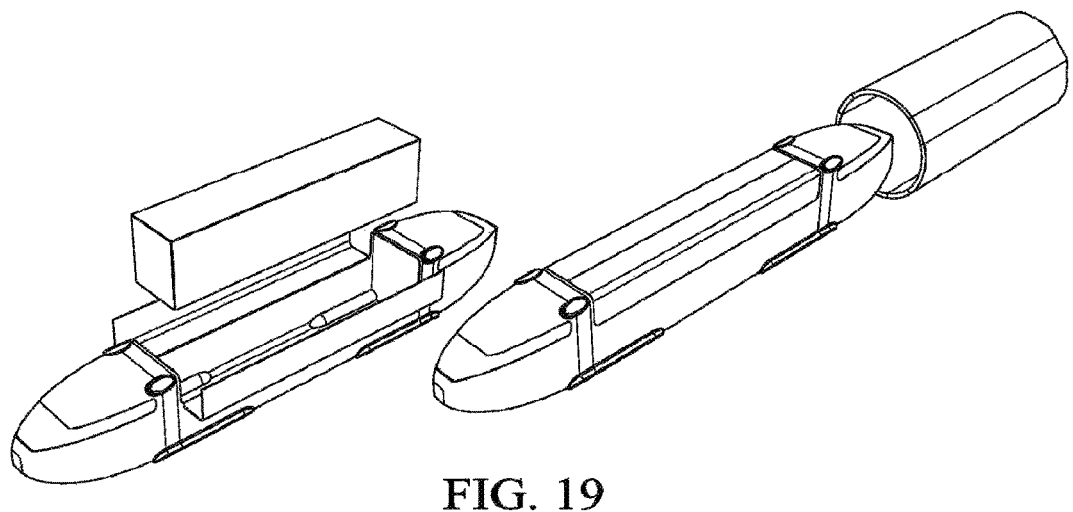
Figure 20:
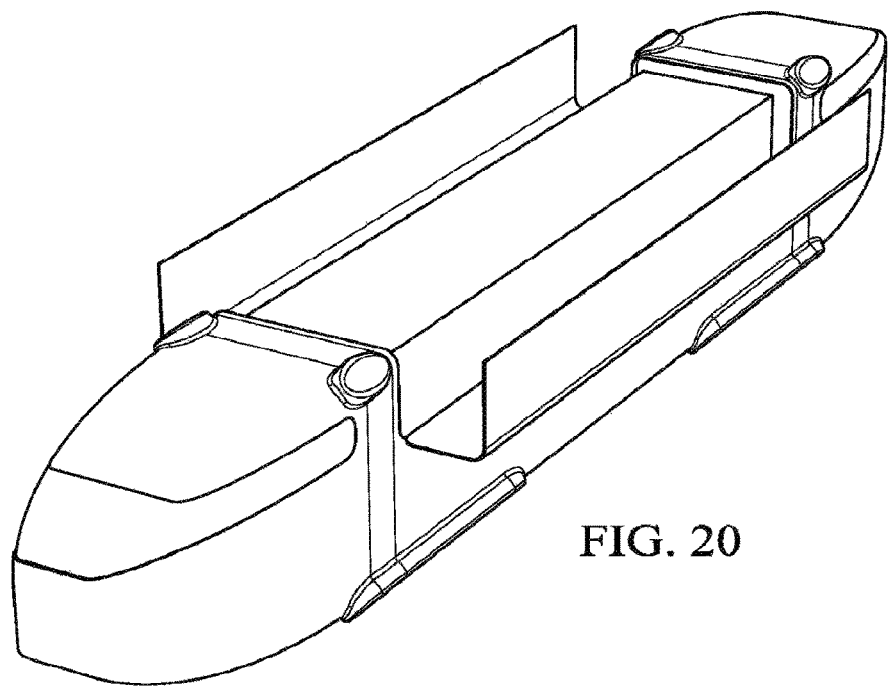
Figure 21:
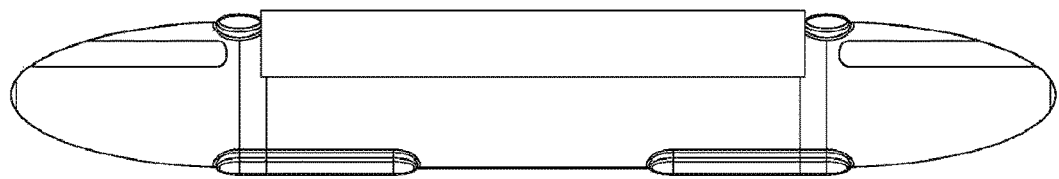
Figure 22:
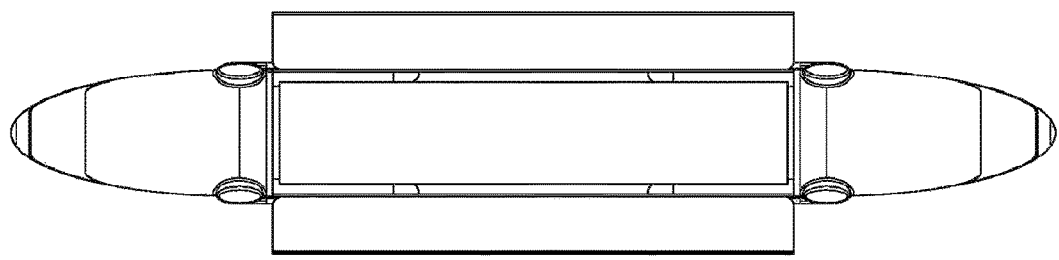
Figure 23:
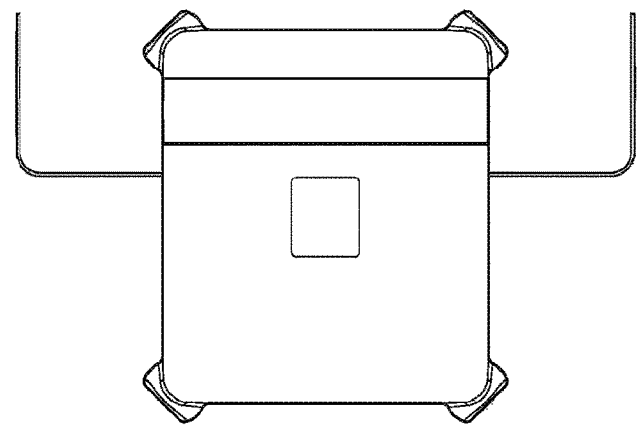
FIG. 23 is a front view of the vehicle in FIG. 22 in accordance with the described embodiments.
Figure 24:
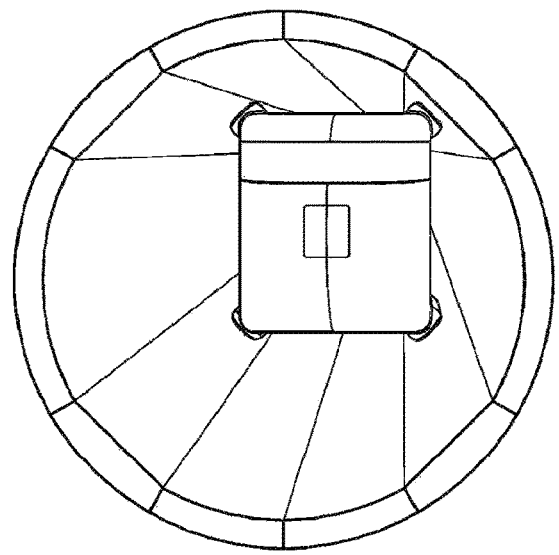
FIG. 24 is an illustration of the vehicle in FIG. 23 for use in a tube in accordance with the described embodiments.
Figure 25:
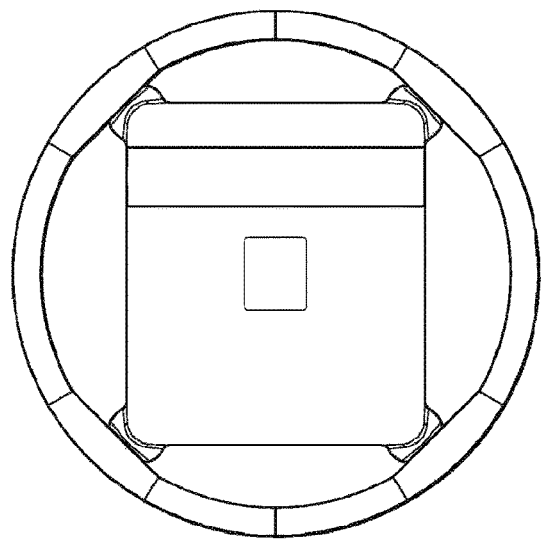
FIG. 25 is a front view of FIG. 24 in accordance with the described embodiments.
Figure 26:
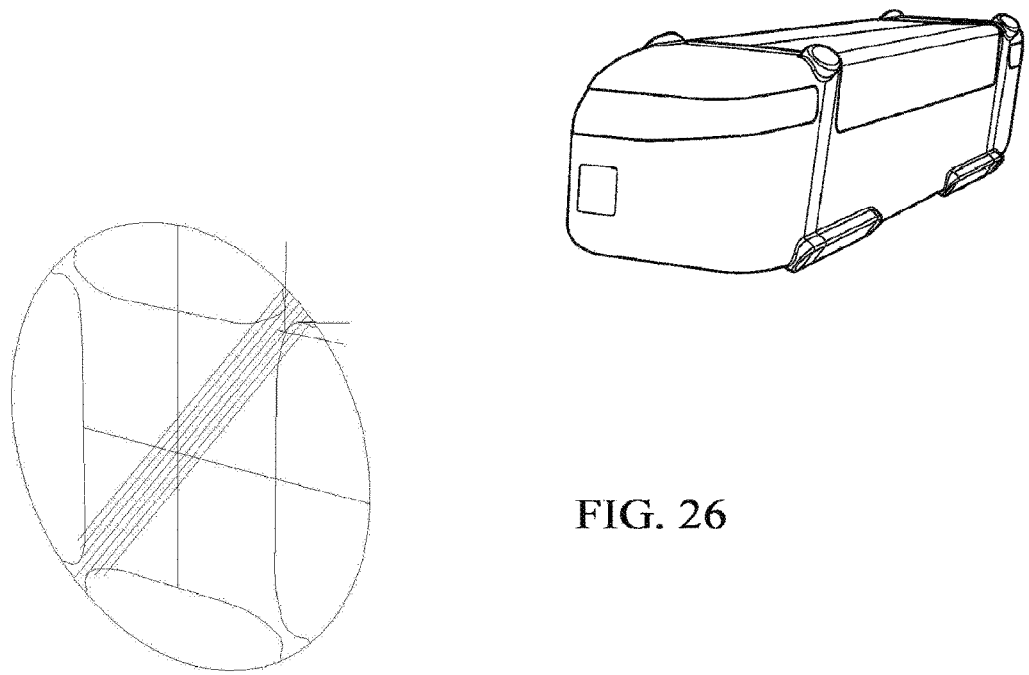
FIG. 26 is an illustration of a vehicle in accordance with the described embodiments.
Figure 27:
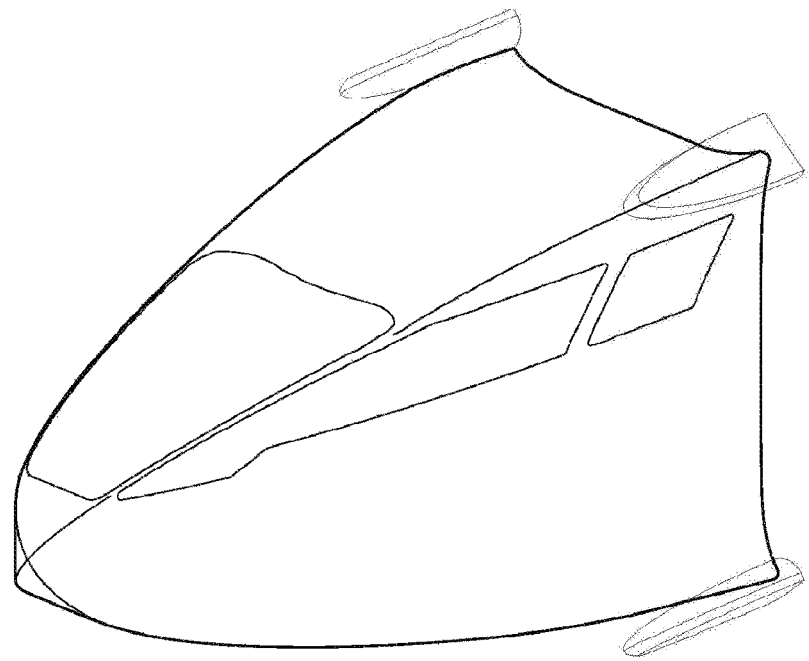
FIGS. 27 to 35 are illustrations of a vehicle in accordance with the described embodiments.
Figure 28:
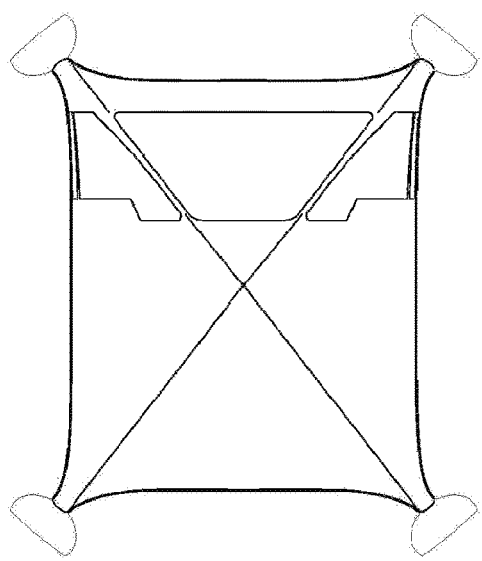
Figure 29:
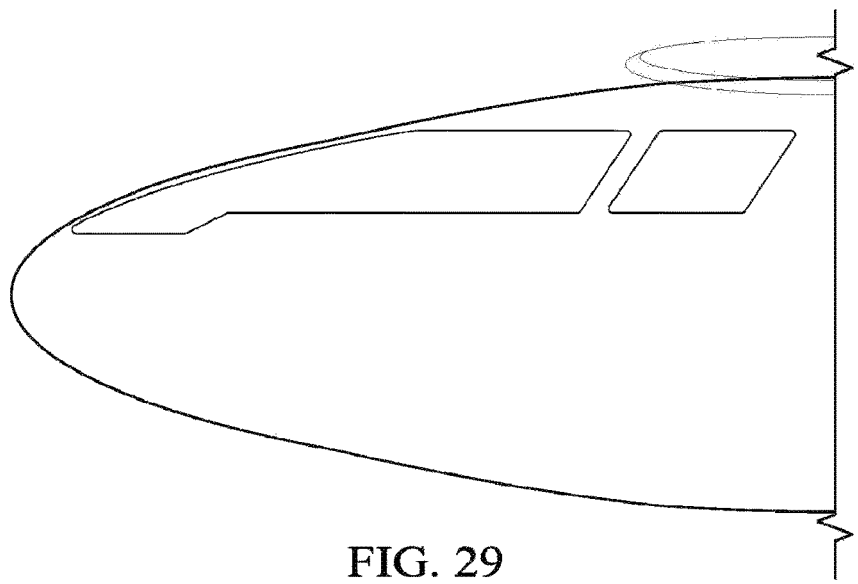
Figure 30:
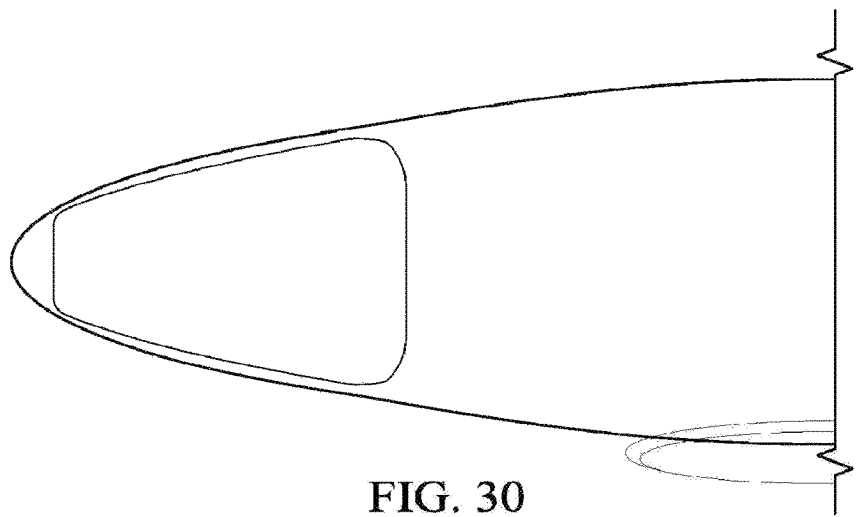
Figure 31:
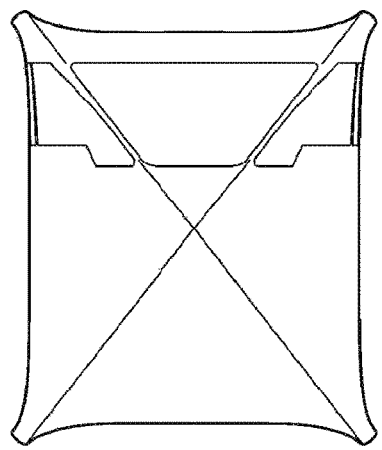
Figure 32:
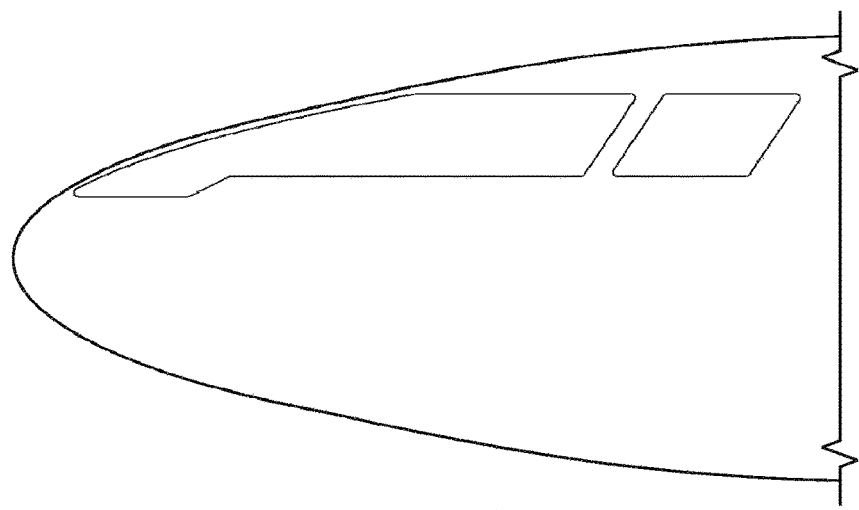
Figure 33:
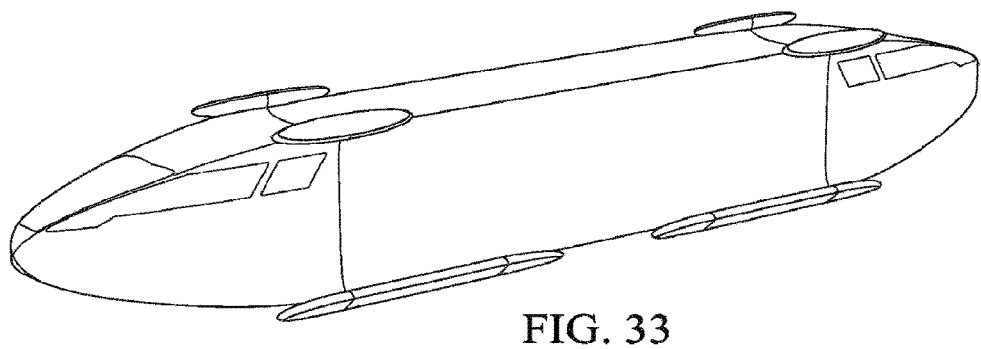
Figure 34:
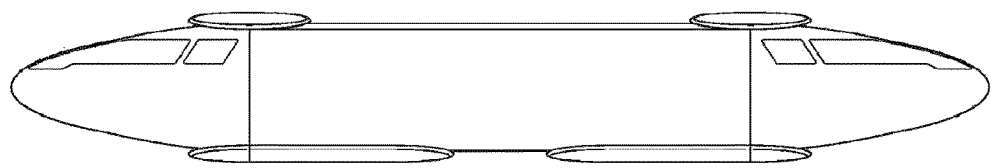
Figure 35:
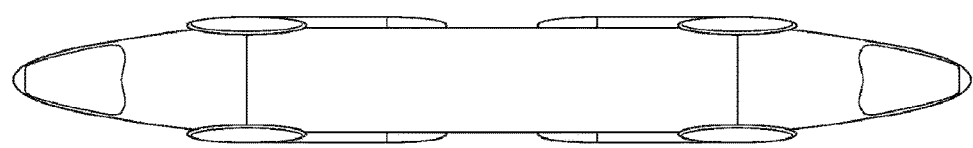
Figure 36:
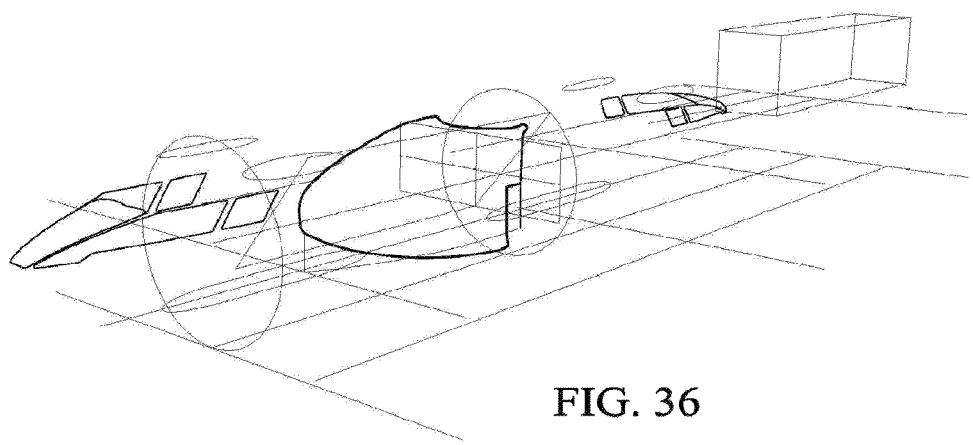
FIG. 36 is a perspective view of a vehicle in accordance with the described embodiments.
Figure 37:
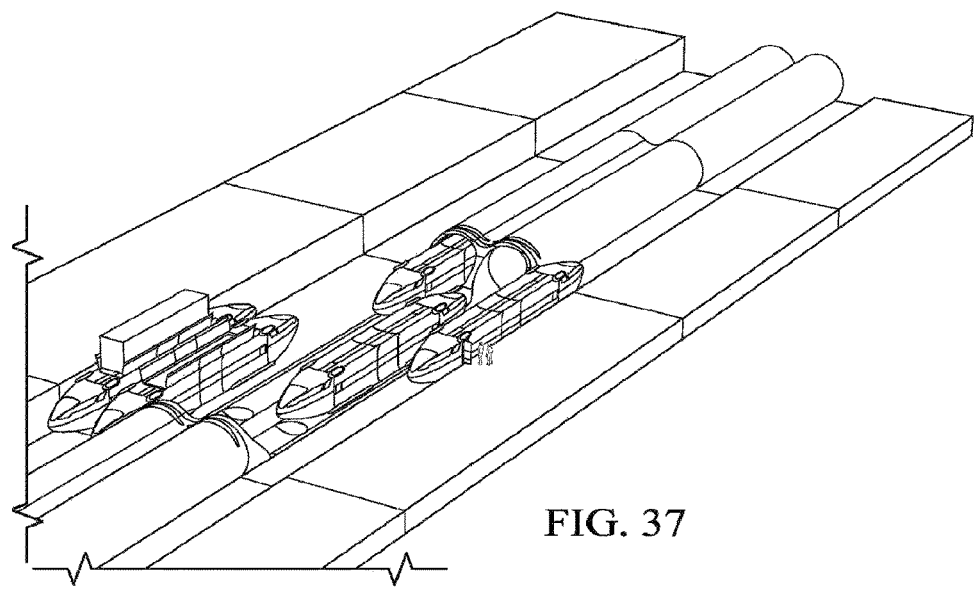
FIGS. 37 to 46 are illustrations of a platform in accordance with the described embodiments.
Figure 38:
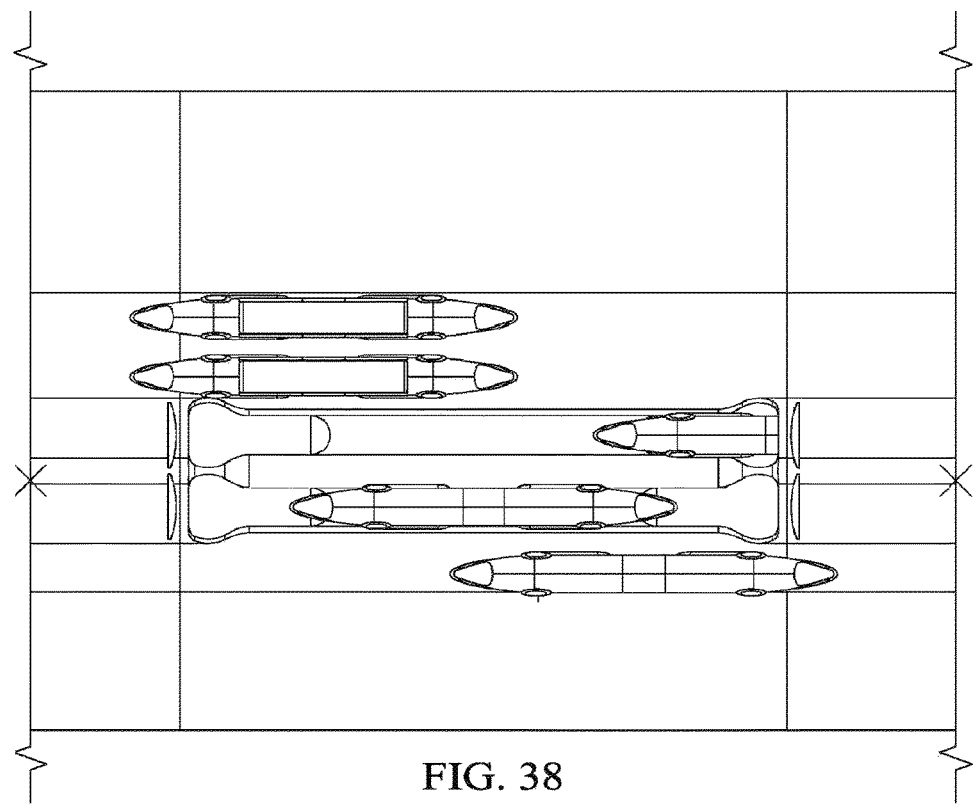
Figure 39:
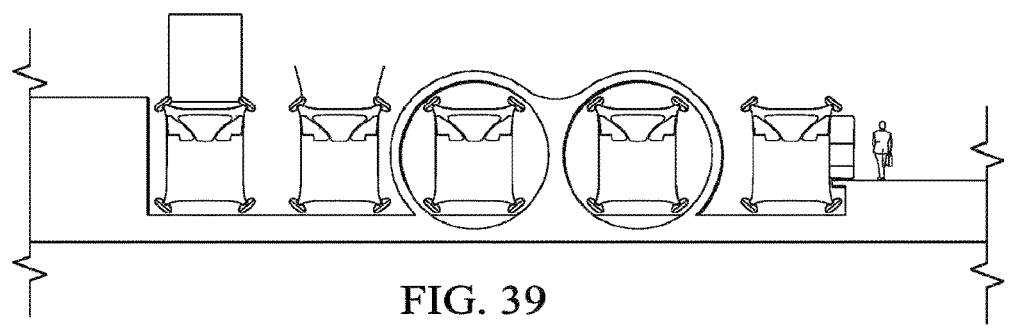
Figure 40:
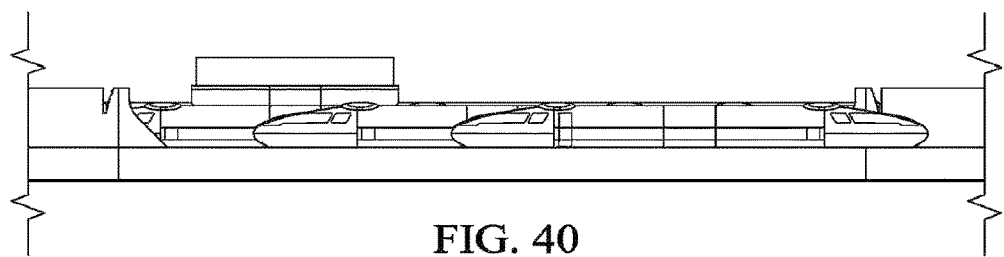
Figure 41:
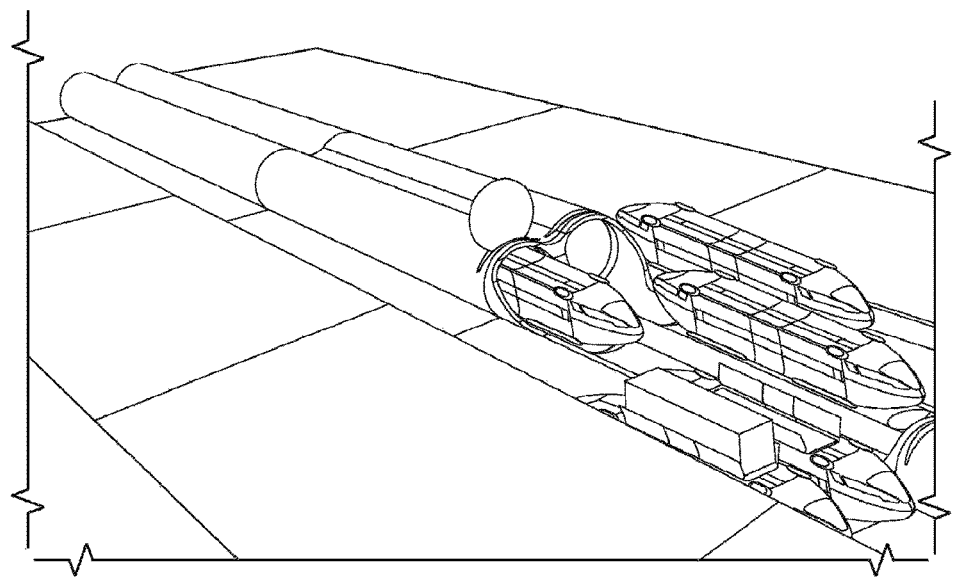
Figure 42:
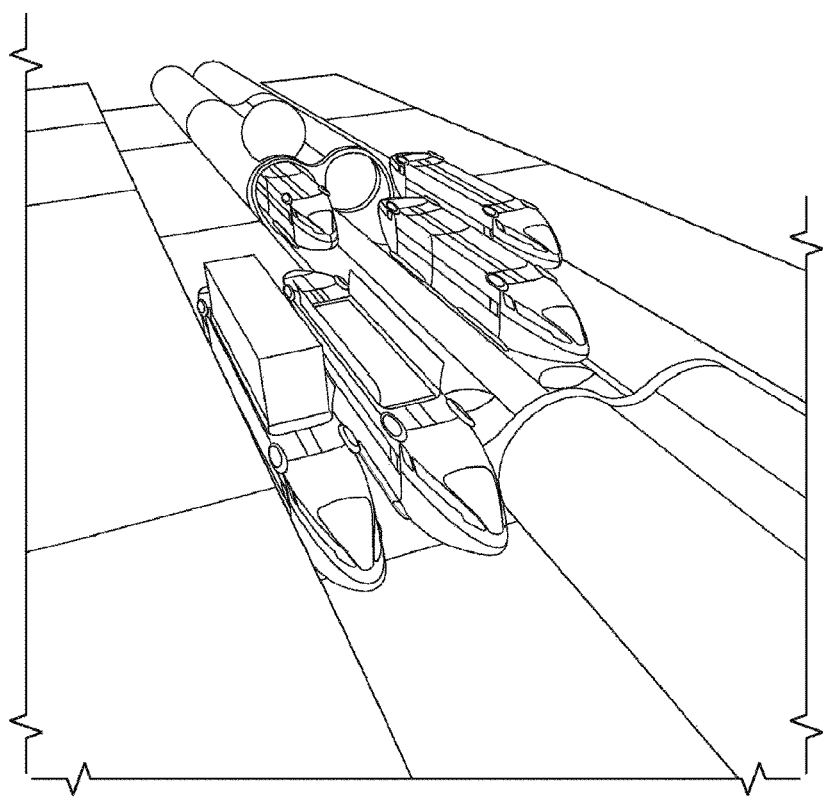
Figure 43:
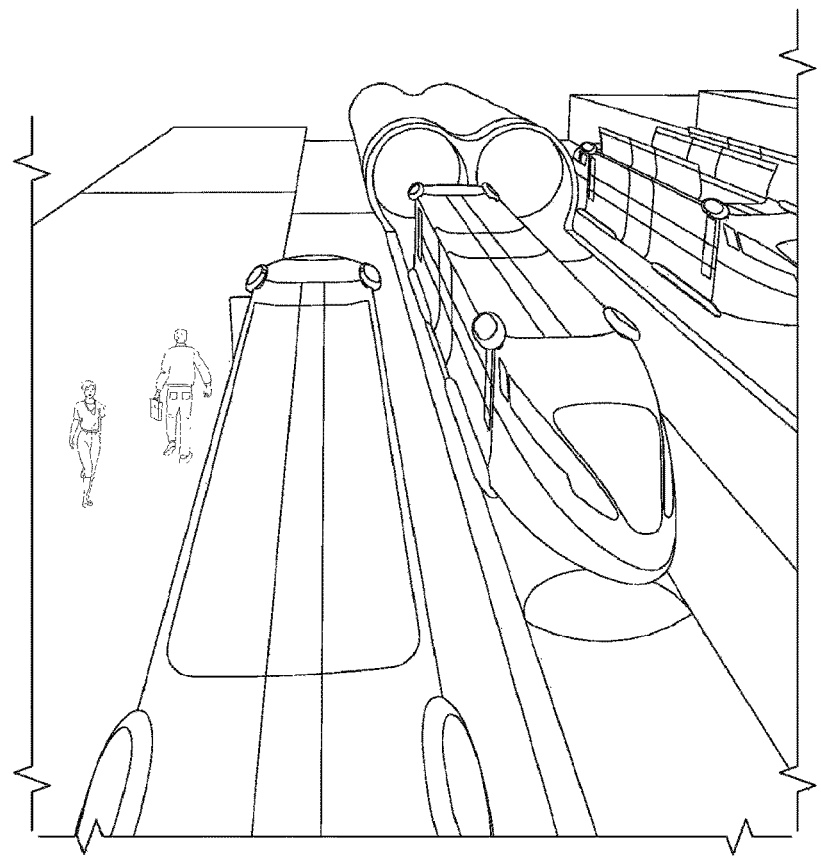
Figure 44:
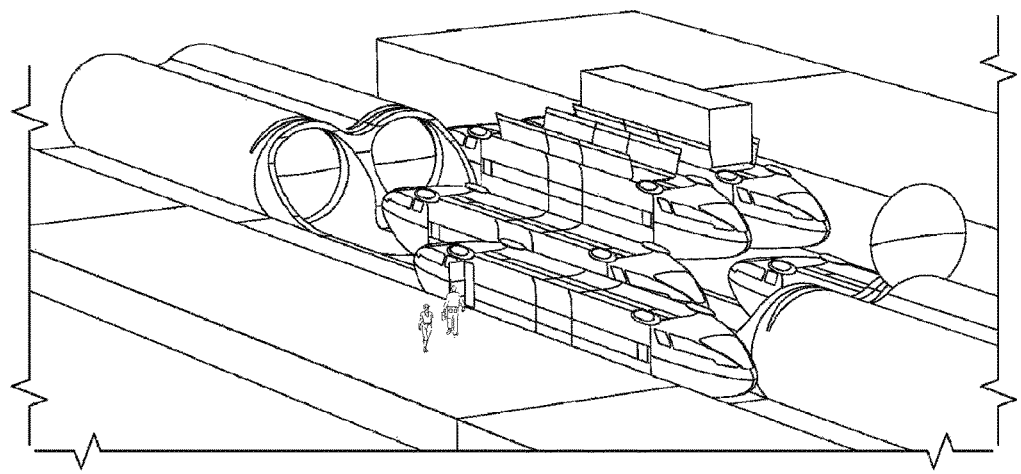
Figure 45:
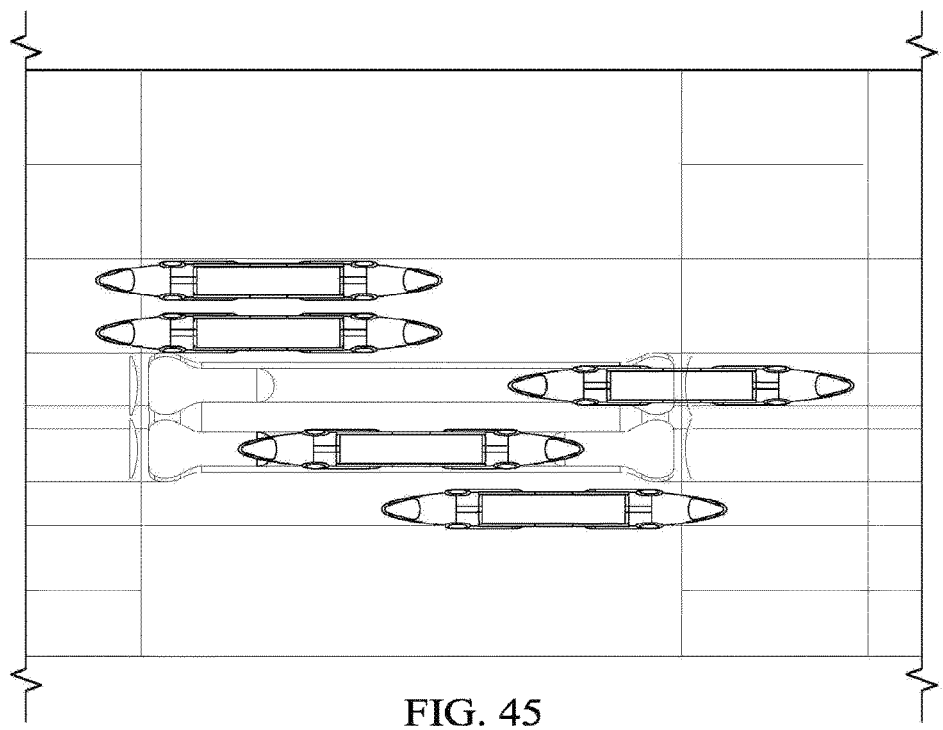
Figure 46:
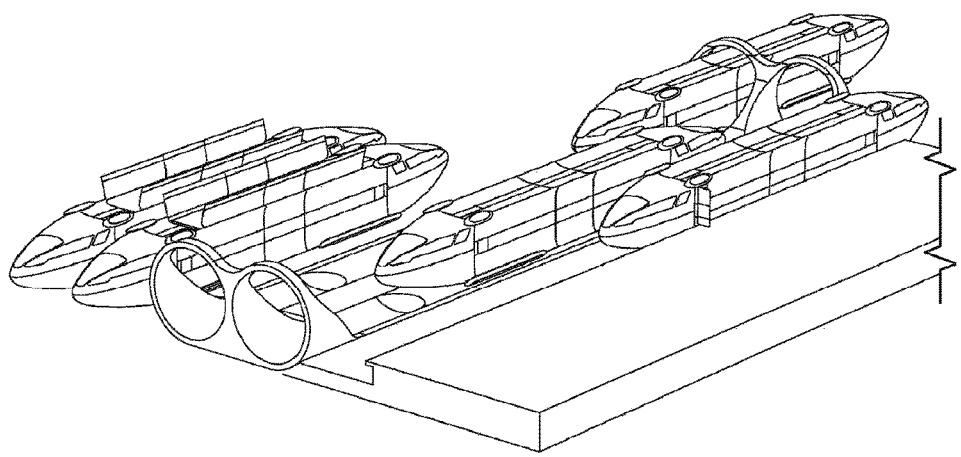
Figure 47:
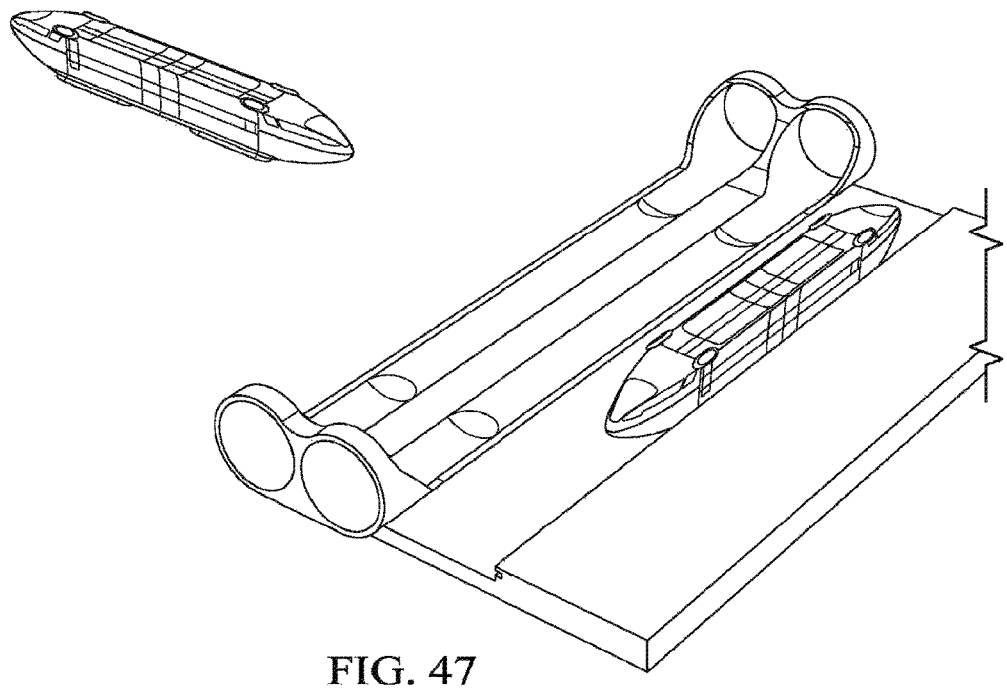
FIG. 47 is an illustration of a station in accordance with the described embodiments.
Figure 48:
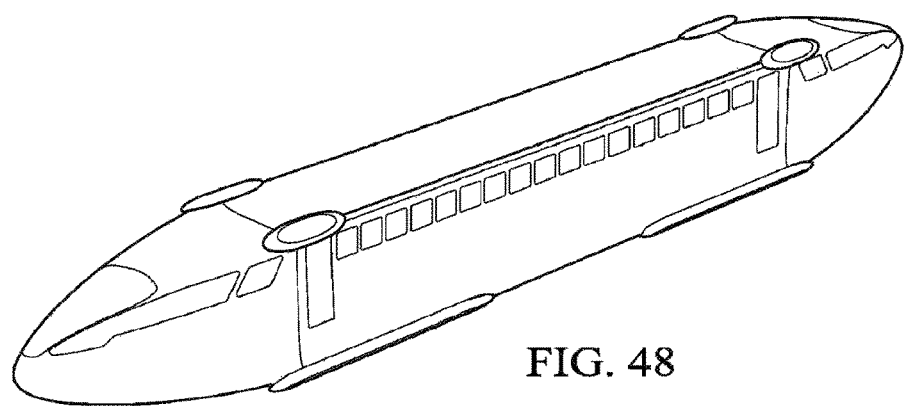
FIGS. 48 and 49 are illustrations of a vehicle in accordance with the described embodiments.
Figure 49:
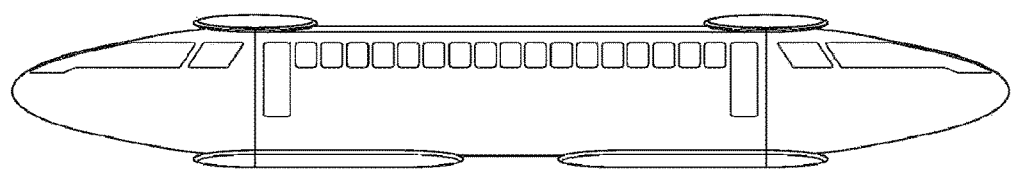
Figure 50:
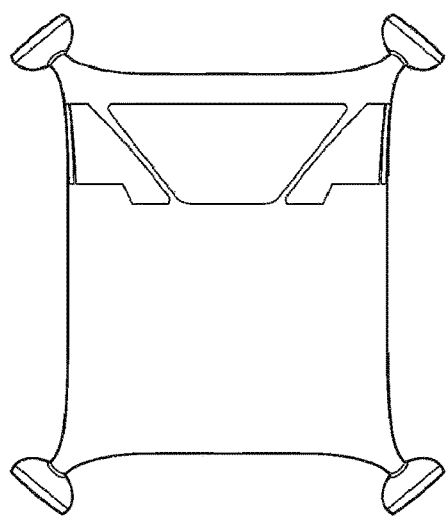
FIG. 50 is a front view of the vehicle in FIGS. 48 and 49 in accordance with the described embodiments.
Figure 51:
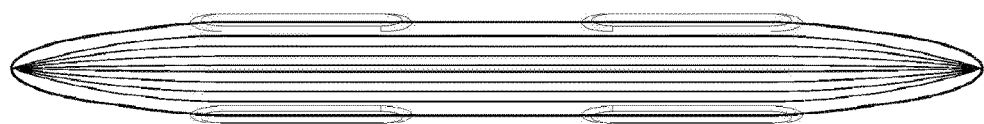
FIG. 51 is a vertical view the vehicle in FIGS. 48-50 in accordance with the described embodiments.
Figure 52:
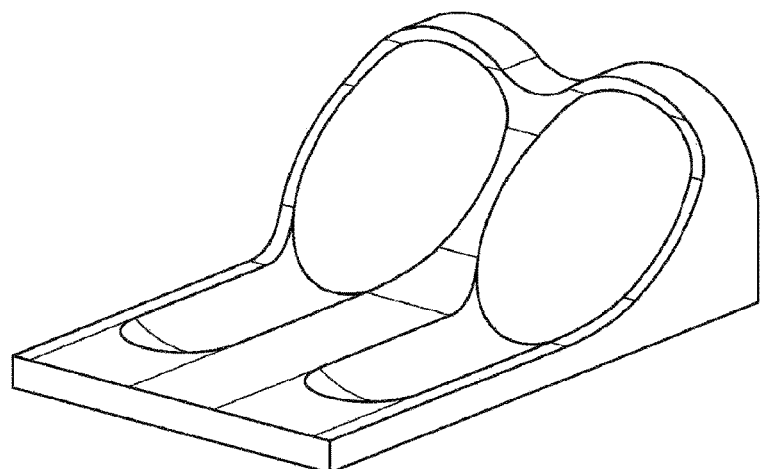
FIG. 52 is an illustration of tubes in accordance with the described embodiments.
Figure 53:
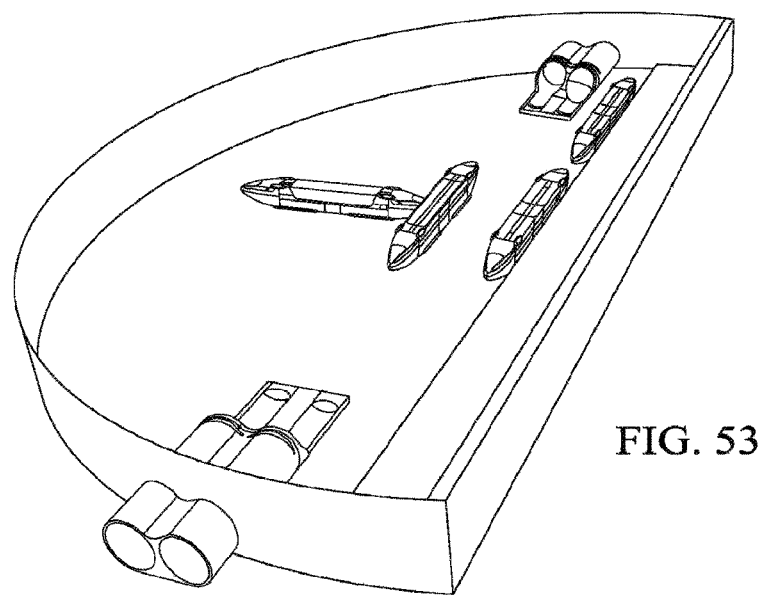
FIGS. 53 to 55 are illustrations of a station in accordance with the described embodiments.
Figure 54:
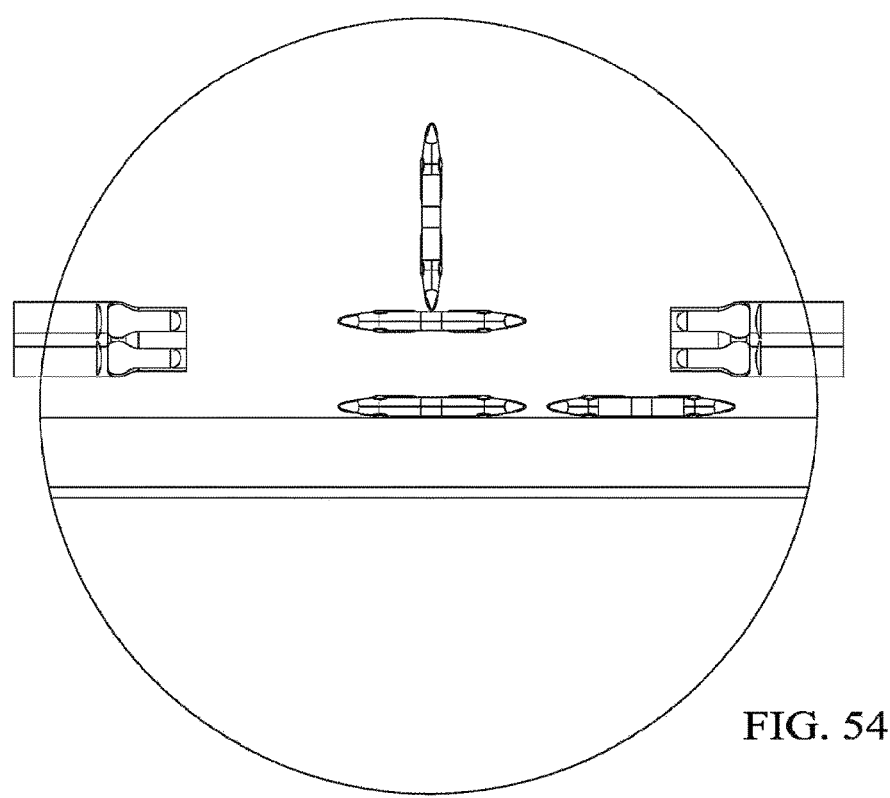
Figure 55:
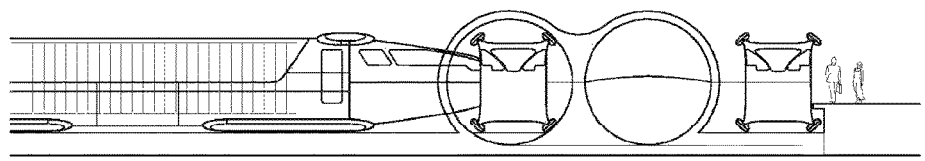
Figure 56:
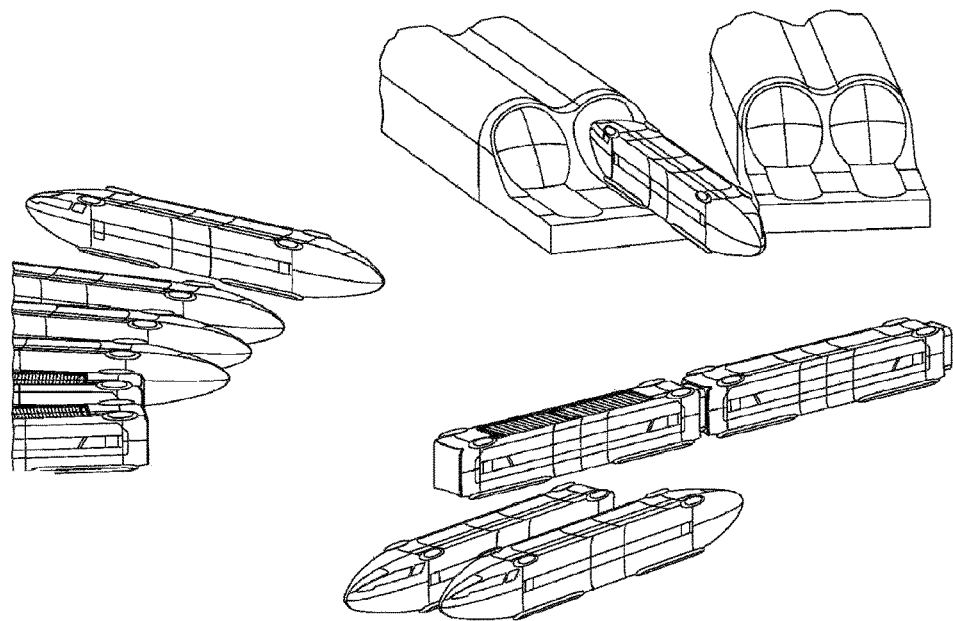
FIGS. 56 to 58 are illustrations of a station in accordance with the described embodiments.
Figure 57:
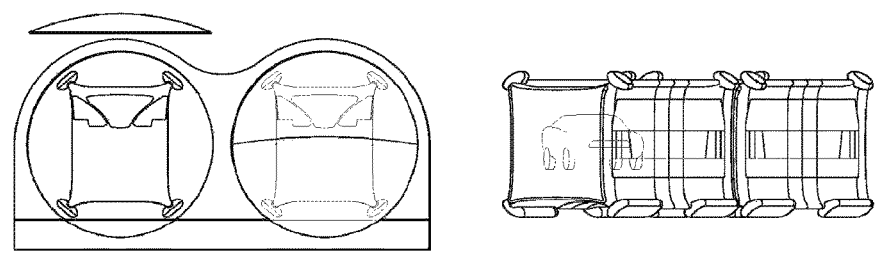
Figure 58:
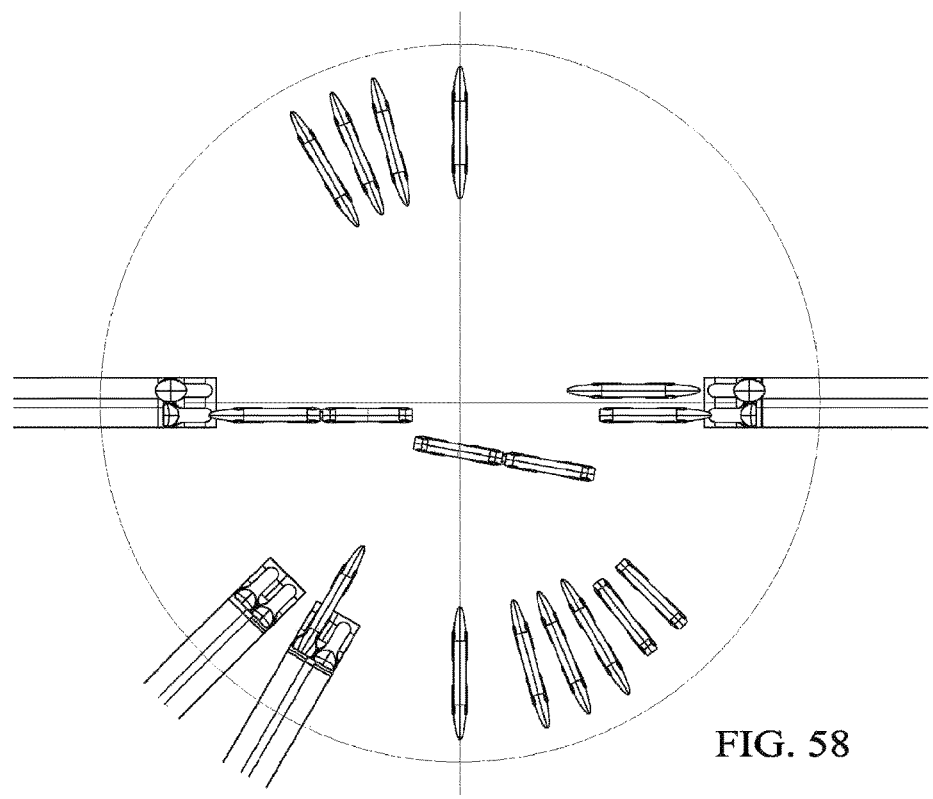
Figure 59:
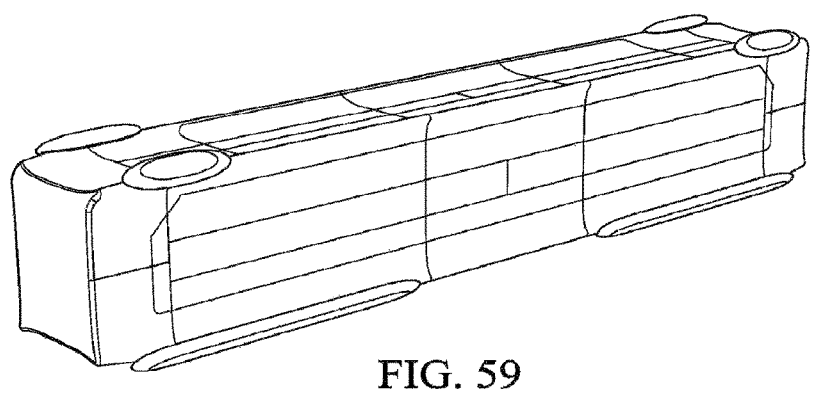
FIG. 59 is an illustration of another vehicle in accordance with the described embodiments.
Figure 60:
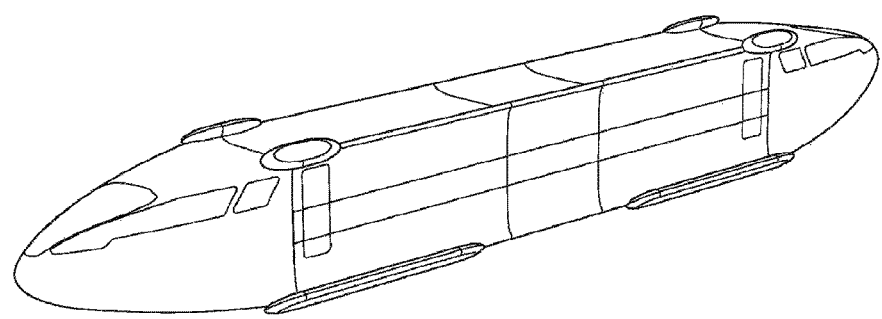
FIG. 60 is an illustration of another vehicle in accordance with the described embodiments.
Figure 61:
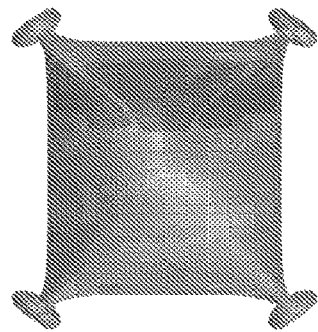
FIG. 61 is a front view of FIG. 60 in accordance with the described embodiments.
Figure 62:
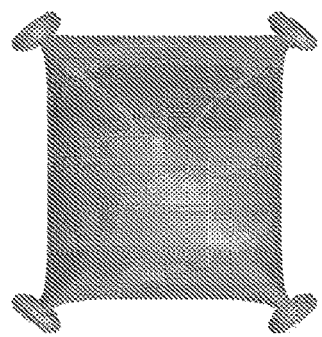
FIG. 62 is a front view of a vehicle in which the top of the vehicle is not concave in accordance with the described embodiments.
Figure 63:
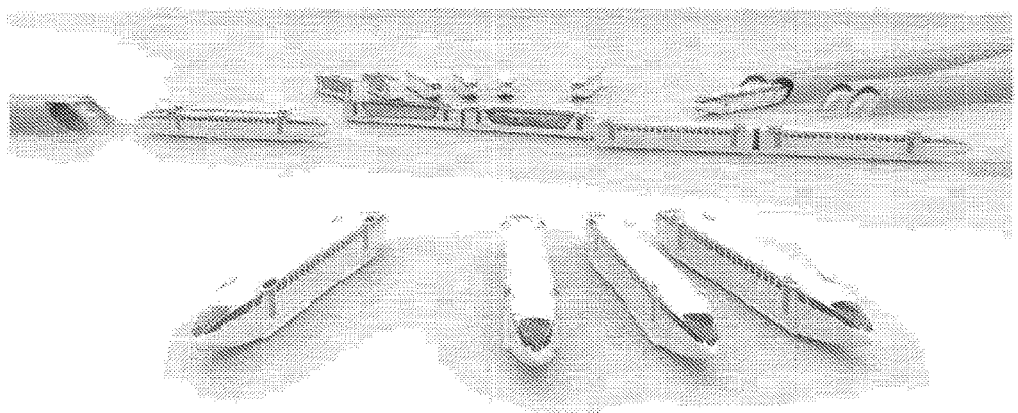
FIGS. 63 to 69 are illustrations of a station in accordance with the described embodiments.
Figure 64:
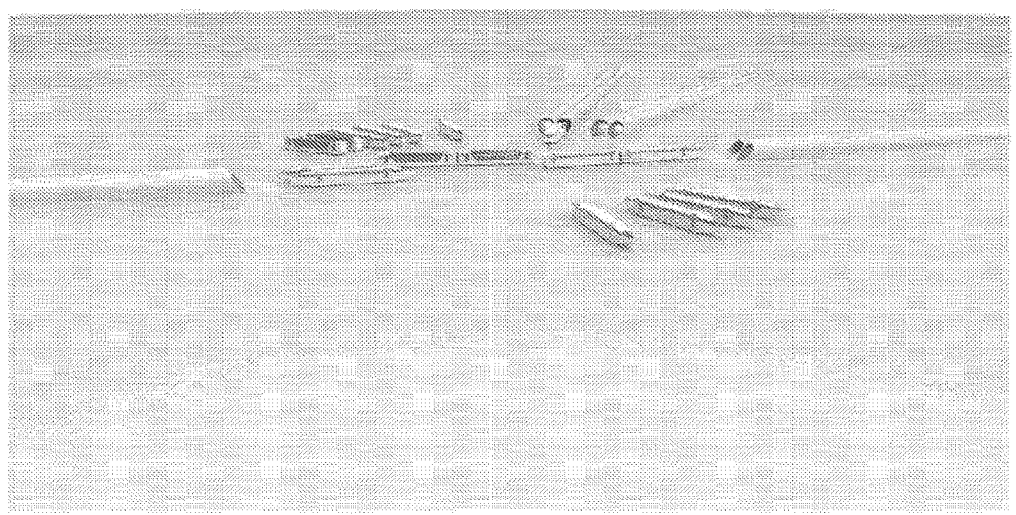
Figure 65:
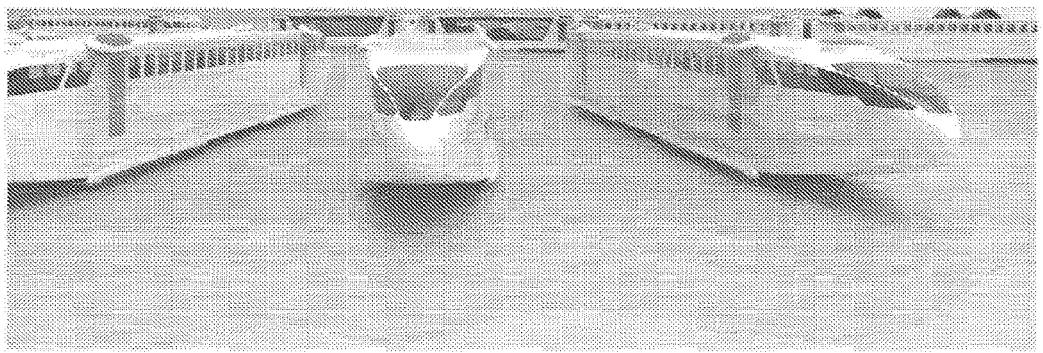
Figure 66:
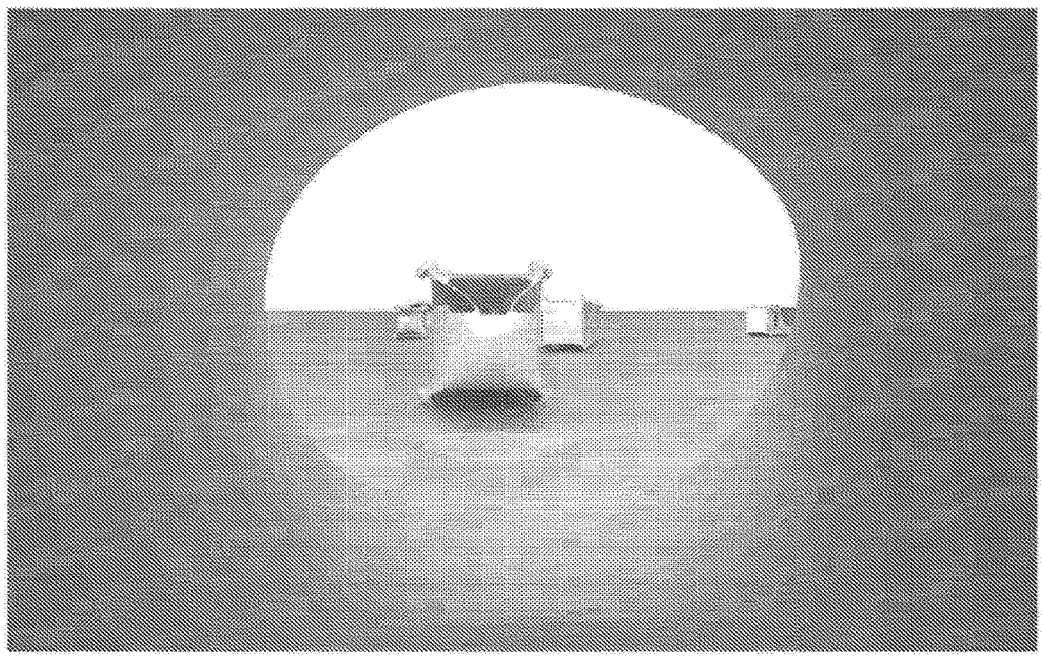
Figure 67:
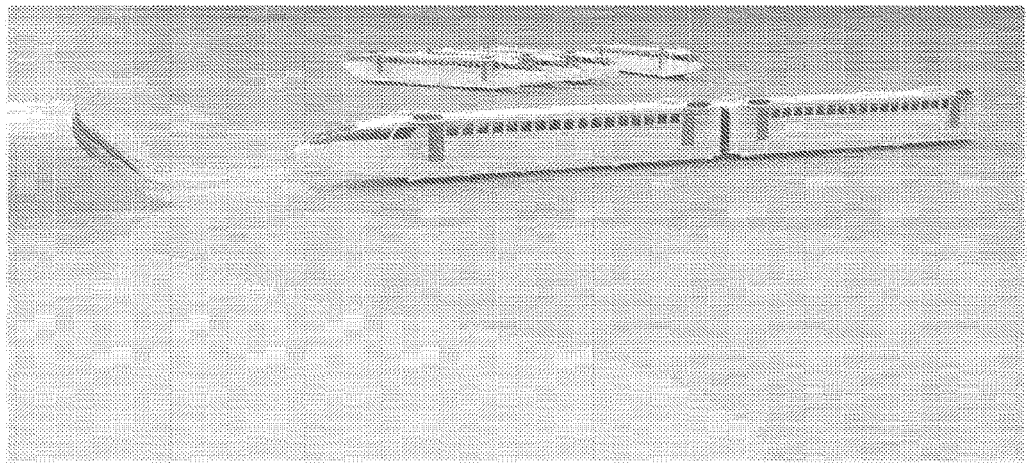
Figure 68:
Figure 69:
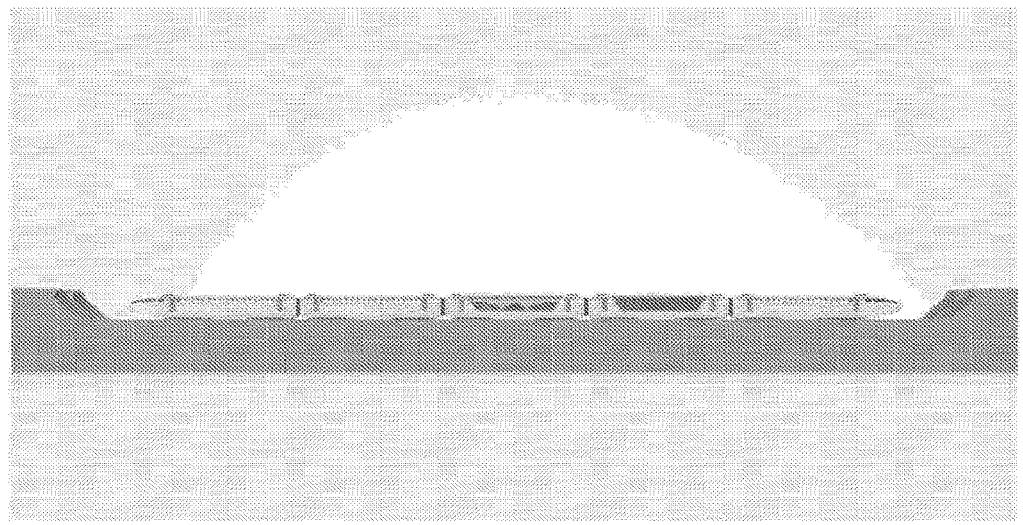
Figure 70:
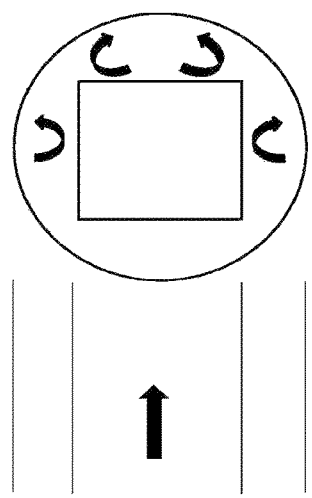
FIG. 70 is an illustration of the atmosphere within the tunnel routing around and bypassing the vehicle.
Figure 71:
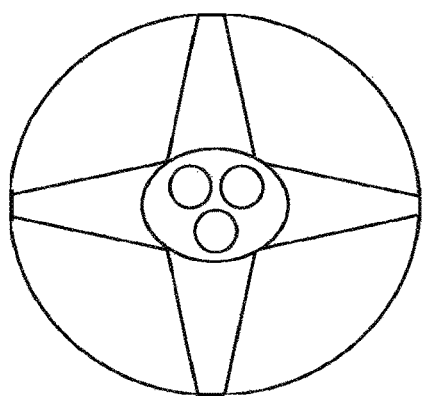
FIG. 71 is an illustration of suites of pods (vehicles)

FIGS. 2 and 3 are illustrations of a vehicle with cargo in a tube in accordance with the described embodiments;

FIGS. 4 to 6 are illustrations of unloading cargo from a vehicle in accordance with the described embodiments;

FIGS. 7 to 9 are illustrations of loading cargo to a vehicle in accordance with the described embodiments;

FIG. 10 is a front view of a vehicle in a tube in accordance with the described embodiments;

FIG. 11 is an illustration of a vehicle in accordance with the described embodiments;

FIG. 12 is an illustration of a top view of the vehicle in FIG. 11 in accordance with the described embodiments;

FIG. 13 is a front view of FIGS. 11 and 12 in accordance with the described embodiments;

FIGS. 14 and 15 are illustrations of the side view of the vehicle in FIGS. 11-13 in accordance with the described embodiments;

FIG. 16 is an illustration of another vehicle in accordance with the described embodiments;

FIGS. 17 to 22 are illustrations of another vehicle with cargo for use in a tube in accordance with the described embodiments;

FIG. 23 is a front view of the vehicle in FIG. 22 in accordance with the described embodiments;

FIG. 24 is an illustration of the vehicle in FIG. 23 for use in a tube in accordance with the described embodiments;

FIG. 25 is a front view of FIG. 24 in accordance with the described embodiments;

FIG. 26 is an illustration of a vehicle in accordance with the described embodiments;

FIGS. 27 to 35 are illustrations of a vehicle in accordance with the described embodiments;

FIG. 36 is a perspective view of a vehicle in accordance with the described embodiments;

FIGS. 37 to 46 are illustrations of a platform in accordance with the described embodiments;

FIG. 47 is an illustration of a station in accordance with the described embodiments;

FIGS. 48 and 49 are illustrations of a vehicle in accordance with the described embodiments;

FIG. 50 is a front view of the vehicle in FIGS. 48 and 49 in accordance with the described embodiments;

FIG. 51 is a vertical view the vehicle in FIGS. 48-50 in accordance with the described embodiments;

FIG. 52 is an illustration of tubes in accordance with the described embodiments;

FIGS. 53 to 55 are illustrations of a station in accordance with the described embodiments;

FIGS. 56 to 58 are illustrations of a station in accordance with the described embodiments;

FIG. 59 is an illustration of another vehicle in accordance with the described embodiments;

FIG. 60 is an illustration of another vehicle in accordance with the described embodiments;

FIG. 61 is a front view of FIG. 60 in accordance with the described embodiments;

FIG. 62 is a front view of a vehicle in which the top of the vehicle is not concave in accordance with the described embodiments;

FIGS. 63 to 69 are illustrations of a station in accordance with the described embodiments;

FIG. 70 is an illustration of the atmosphere within the tunnel routing around and bypassing the vehicle;

FIG. 71 is an illustration of suites of pods (vehicles);

FIGS. 72A, 72B, 73 and 74 are illustrations of STARMs tilted relative to a conductive substrate and associated forces which are generated in accordance with the described embodiments.

Figure 75A:
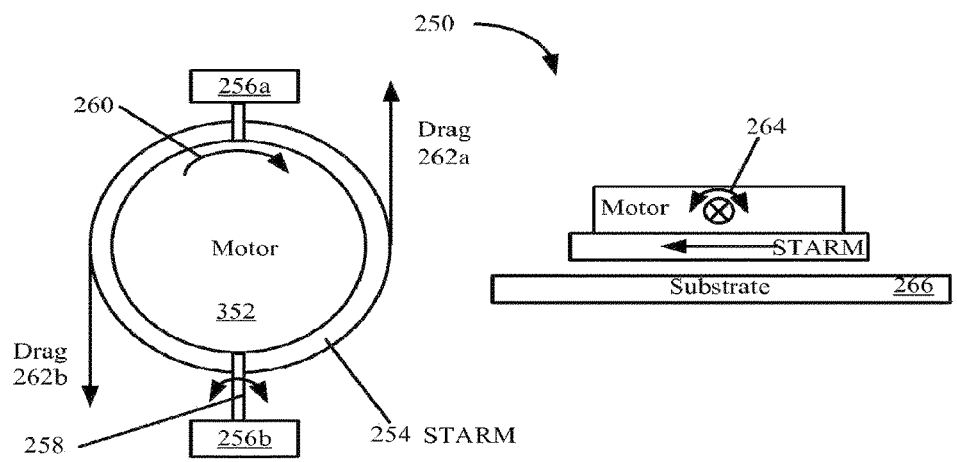
FIGS. 75A to 75C are illustrations force imbalances resulting from tilting a hover engine in accordance with the described embodiments.
Figure 75B:
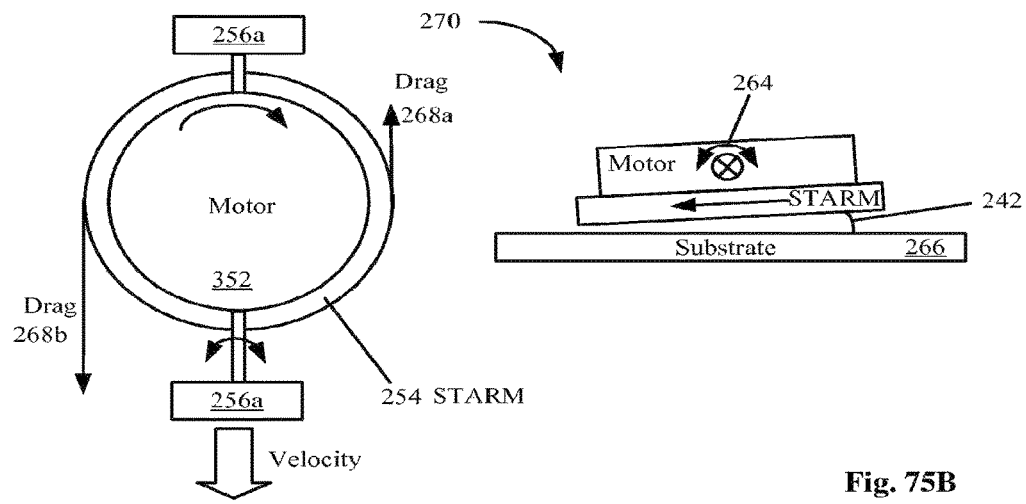
Figure 75C:
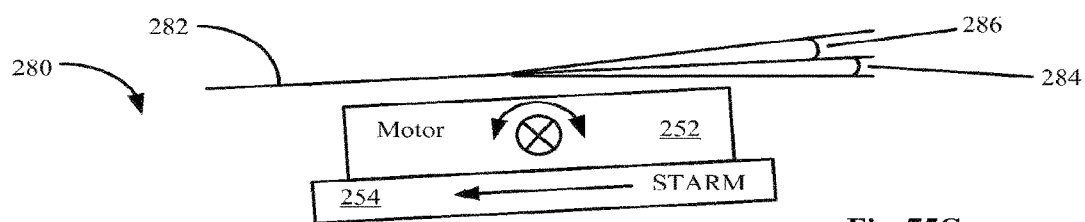

FIGS. 75A to 75C are illustrations force imbalances resulting from tilting a hover engine in accordance with the described embodiments.

Figure 76A:
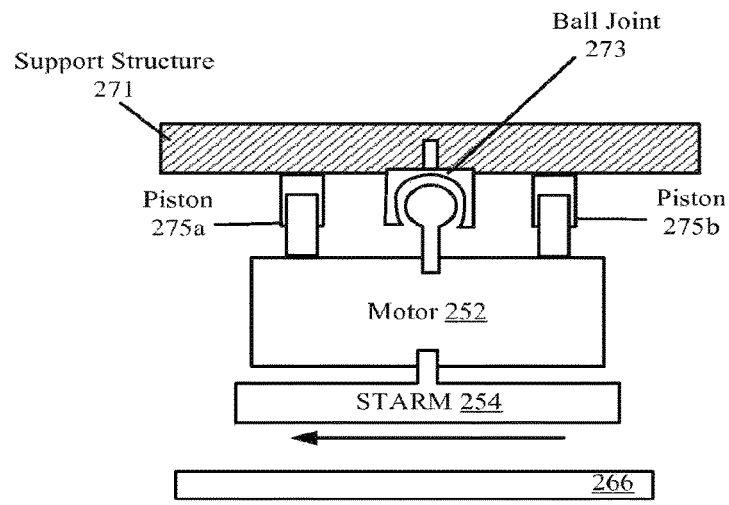
FIGS. 76A to 76B are illustrations of two orientation control mechanisms for a hover engine in accordance with the described embodiments.
Figure 76B:
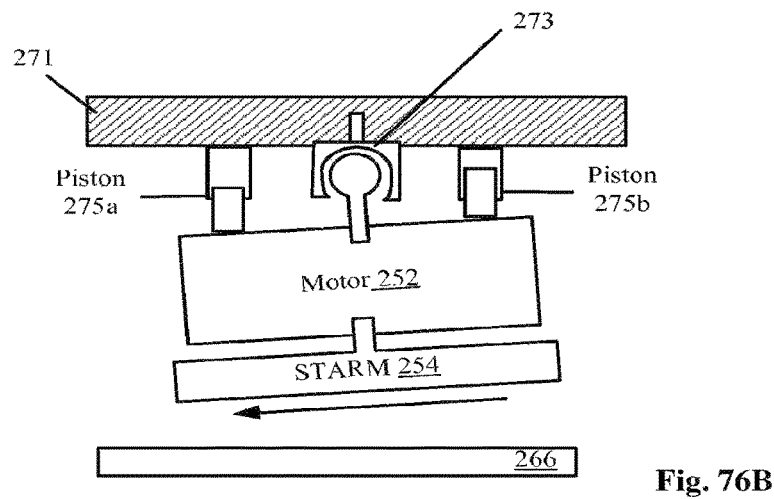

FIGS. 76A to 76B are illustrations of two orientation control mechanisms for a hover engine in accordance with the described embodiments.

Figure 77A:
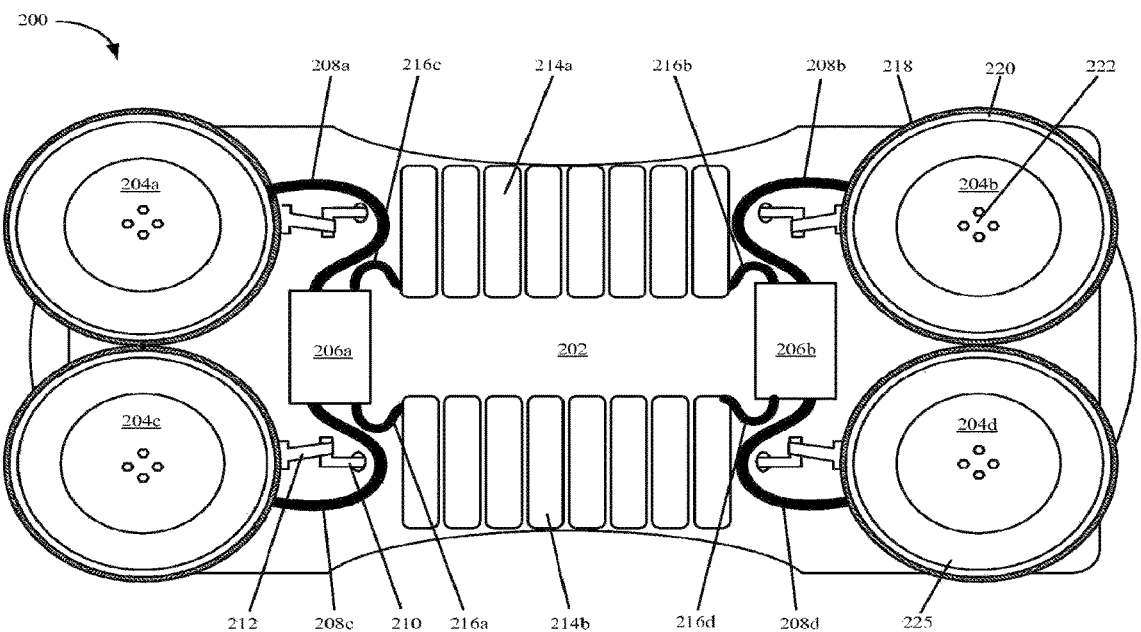
FIGS. 77A, 77B and 77C are a bottom, top and side view of a battery powered vehicle in accordance with the described embodiments.
Figure 77B:
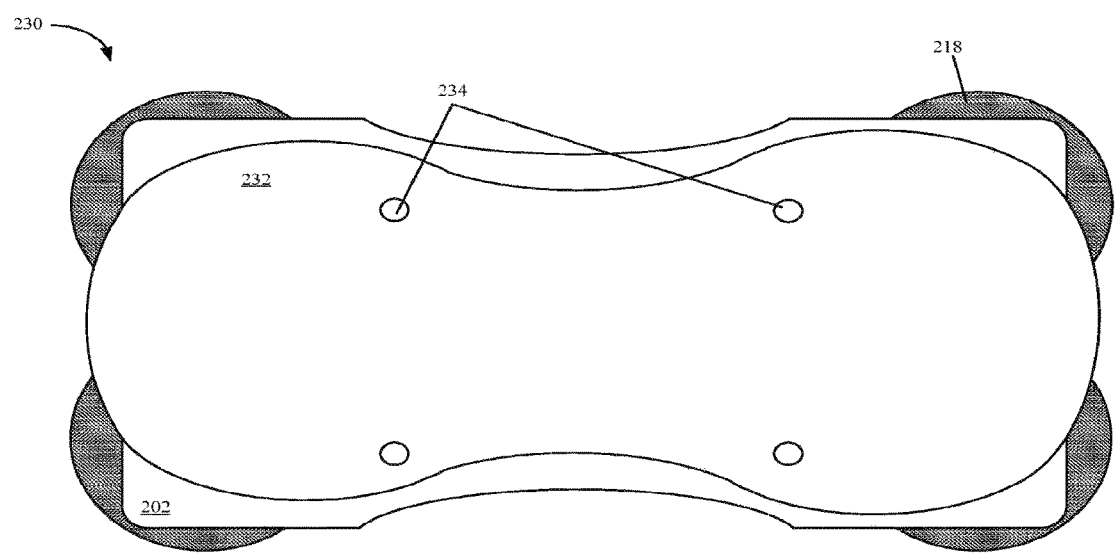
Figure 77C:
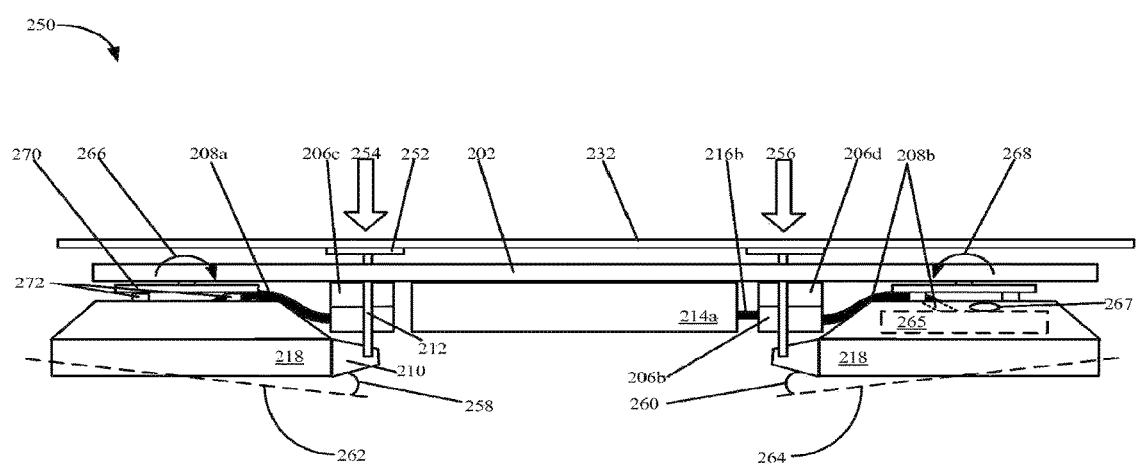

FIGS. 77A, 77B and 77C are a bottom, top and side view of a battery powered vehicle in accordance with the described embodiments.

Figure 78A:
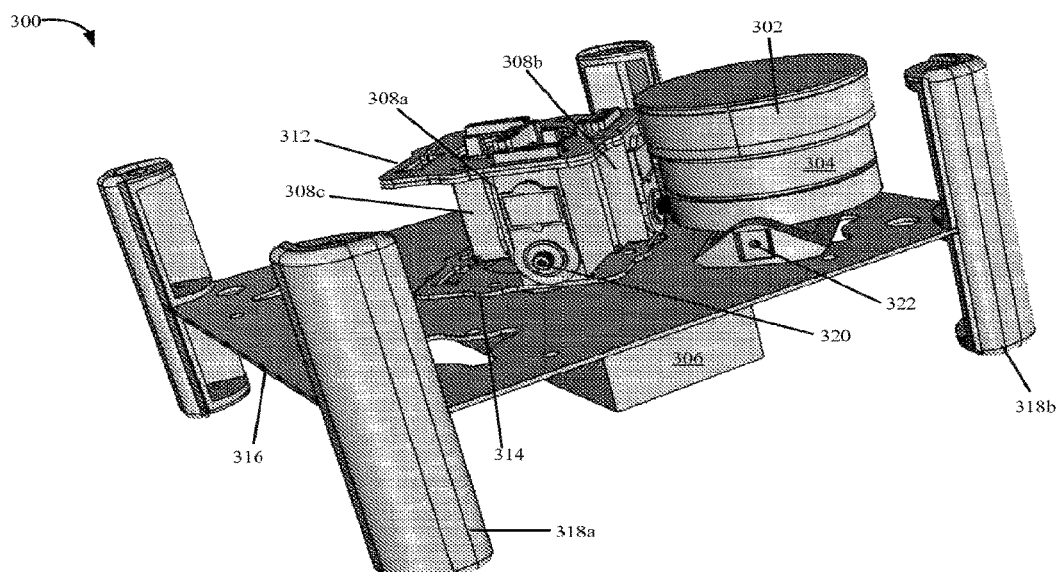
FIGS. 78A-78C are perspective, top and bottom views of a magnetically lifted vehicle in accordance with the described embodiments.
Figure 78B:
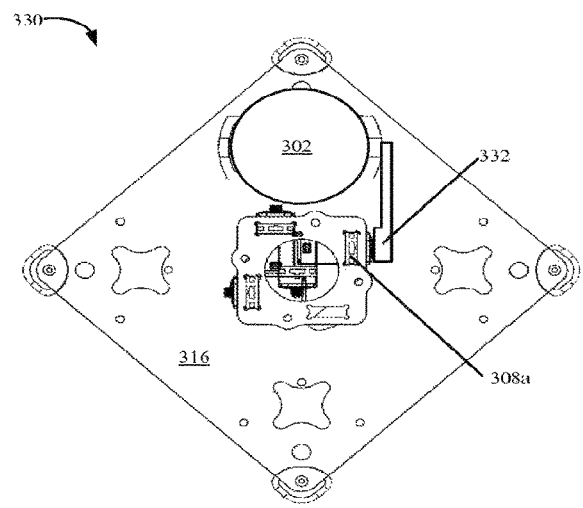
Figure 78C:
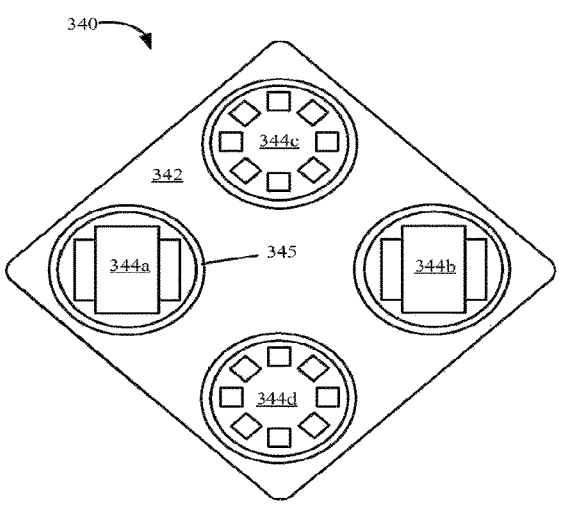
Figure 79A:
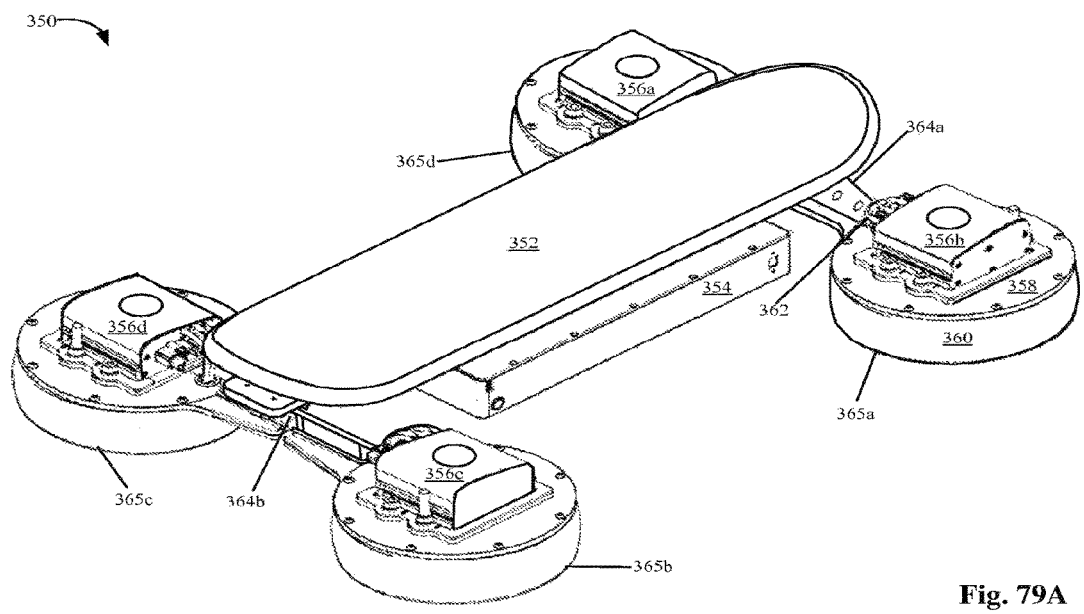
FIGS. 79A-79D and 80 are perspective, front and top views of a magnetically lifted vehicle and perspective views of an attachment components associated with the vehicle in accordance with the described embodiments.
Figure 79B:
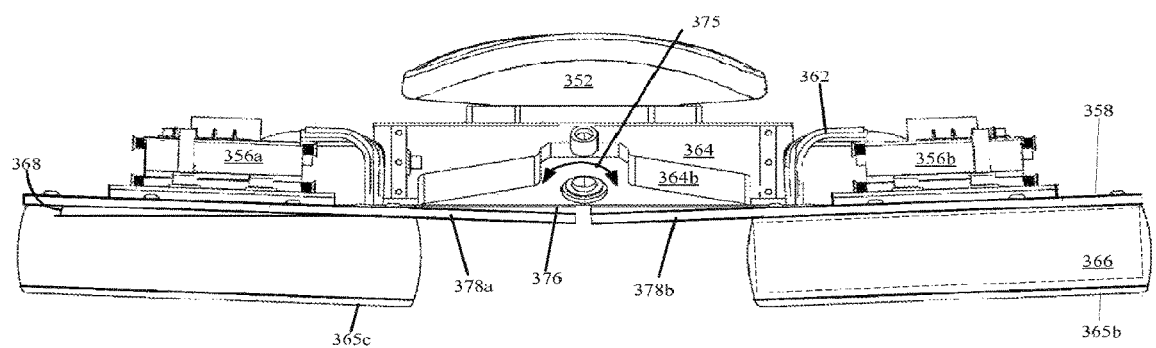
Figure 79C:
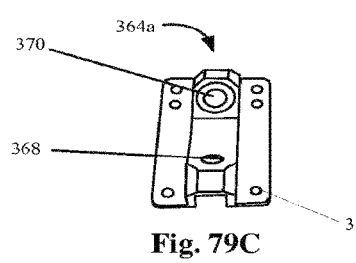
Figure 79D:
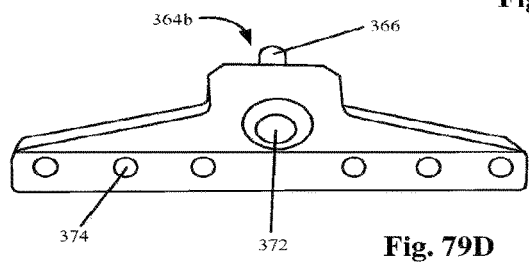
Figure 80:
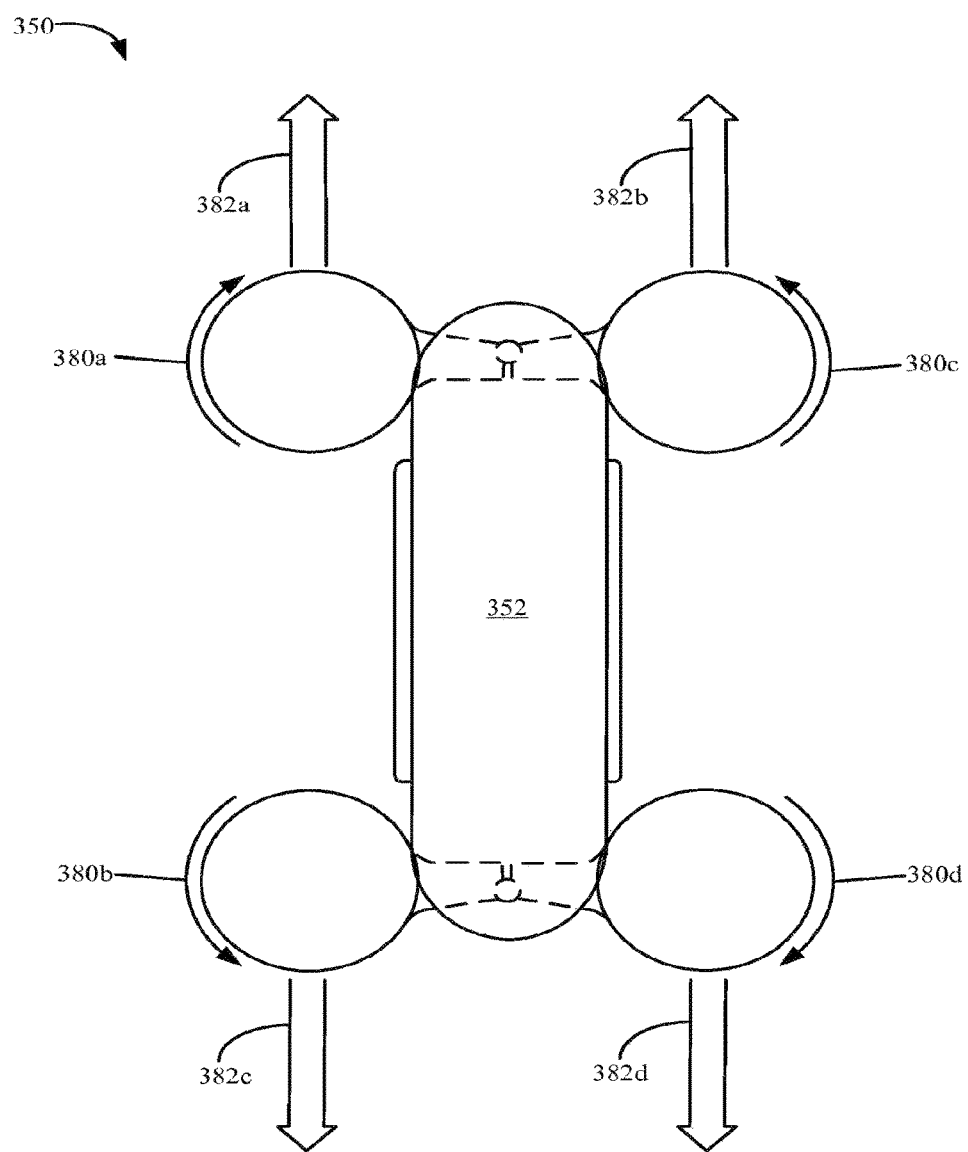

FIGS. 78A-78C are perspective, top and bottom views of a magnetically lifted vehicle in accordance with the described embodiments.

FIGS. 79A-79D and 80 are perspective, front and top views of a magnetically lifted vehicle and perspective views of an attachment components associated with the vehicle in accordance with the described embodiments.

Figure 81:
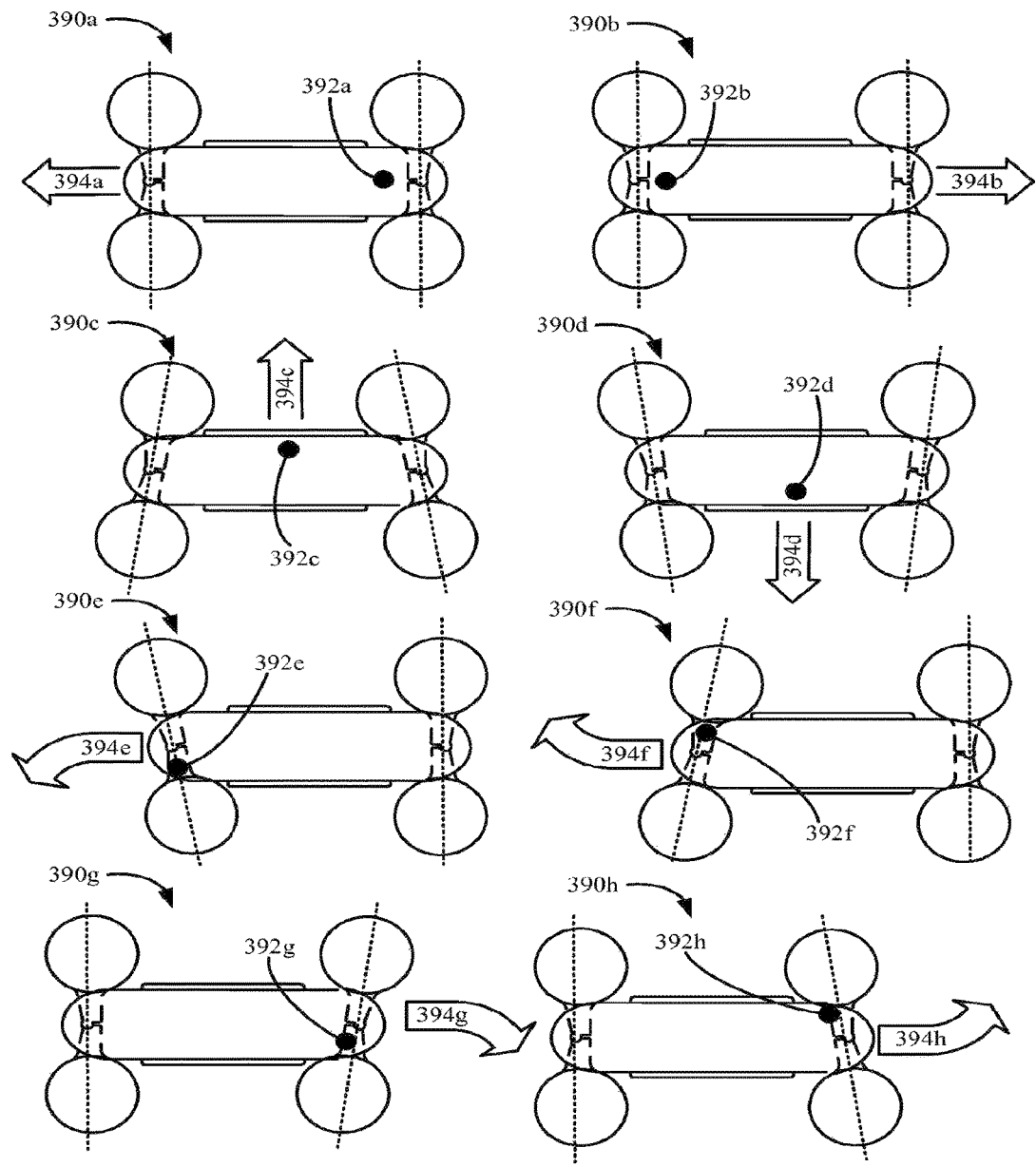
FIG. 81 illustrates a directional control scheme for the vehicle shown in FIGS. 79A-79D to 80 in accordance with the described embodiments.

FIG. 81 illustrates a directional control scheme for the vehicle shown in FIGS. 79A-79D to 80 in accordance with the described embodiments.

Figure 82A:
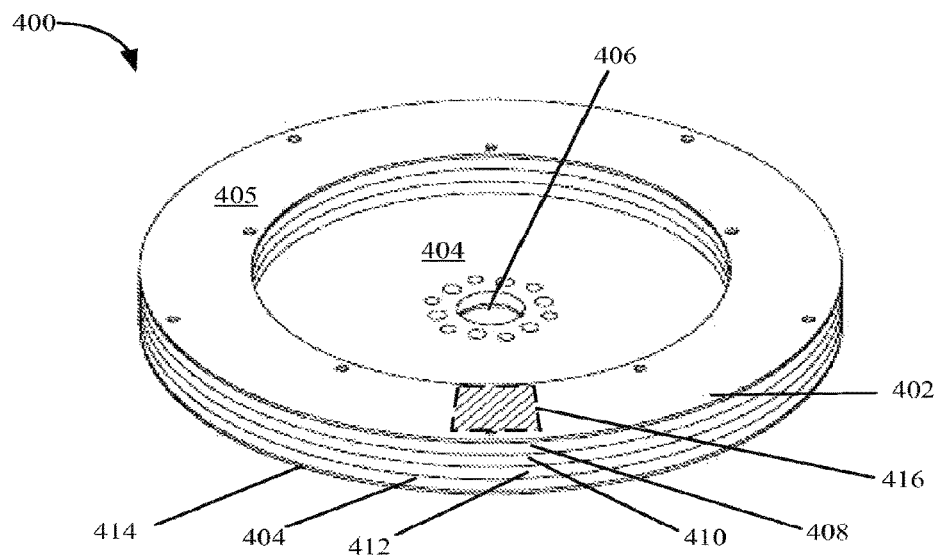
FIGS. 82A to 82C are illustrations of a hover engine in accordance with the described embodiments.
Figure 82B:
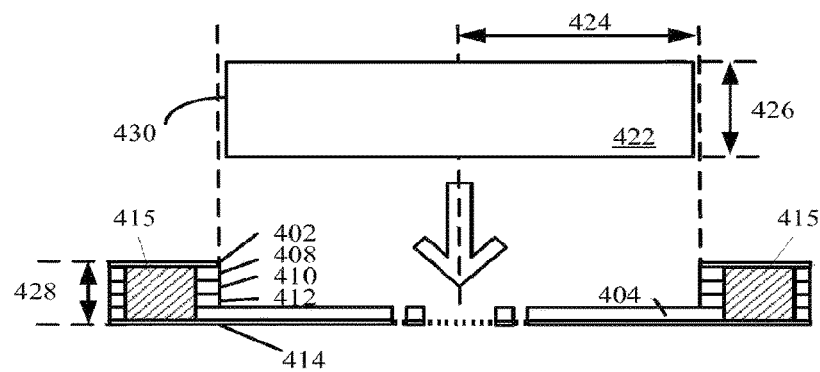
Figure 82C:
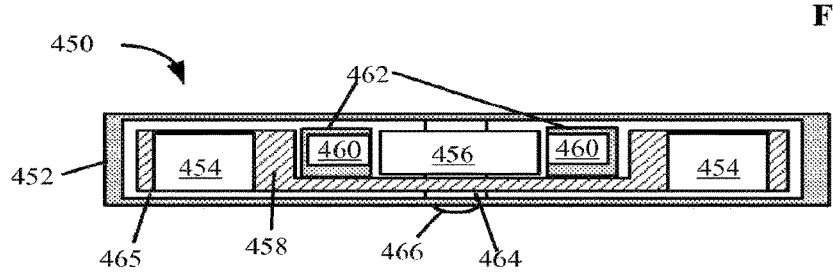

FIGS. 82A to 82C are illustrations of a hover engine in accordance with the described embodiments.

Figure 83A:
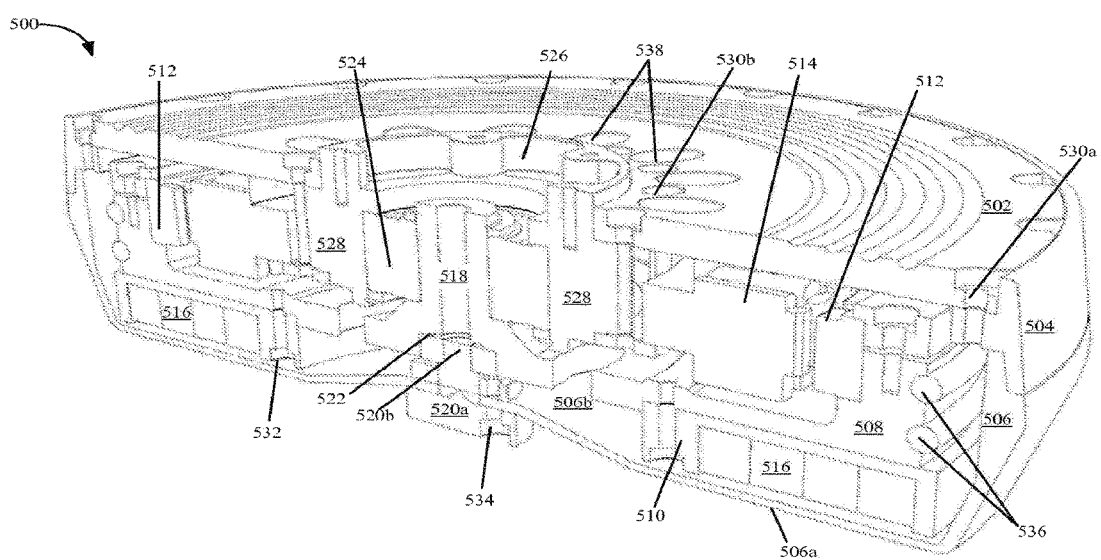
FIG. 83A is a perspective cross section of a hover engine in accordance with the described embodiments.

FIG. 83A is a perspective cross section of a hover engine in accordance with the described embodiments.

Figure 83B:
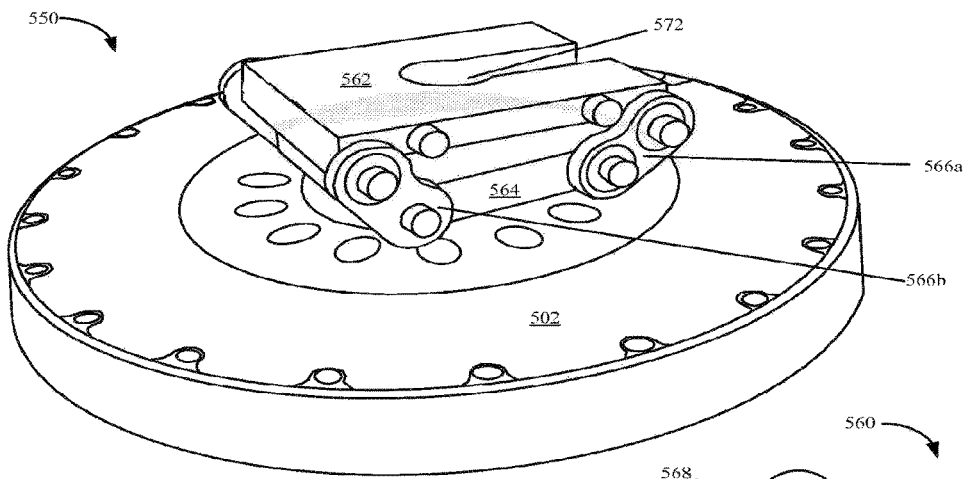
FIG. 83B is an outside perspective view of the hover engine shown in FIG. 16A which includes an attached hinge mechanism in accordance with the described embodiments.

FIG. 83B is an outside perspective view of the hover engine shown in FIG. 16A which includes an attached hinge mechanism in accordance with the described embodiments.

Figure 83C:
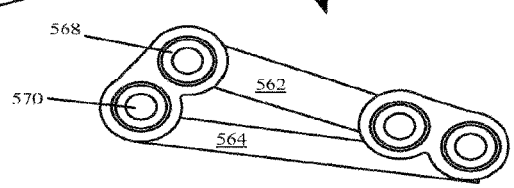
FIG. 83C is a side view of the hinge mechanism shown in FIG. 16B.

FIG. 83C is a side view of the hinge mechanism shown in FIG. 16B.

Figure 84A:
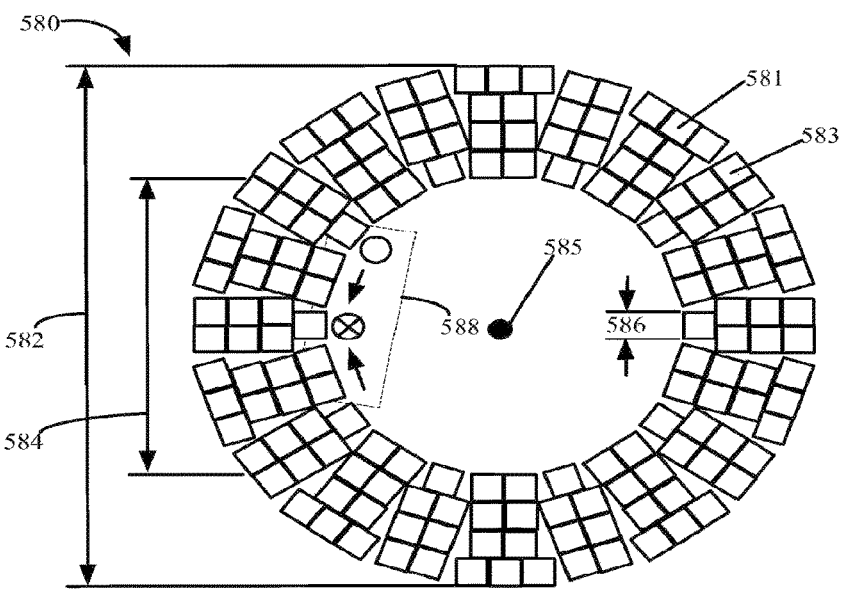
FIGS. 84A and 84B are top views of two magnet configurations and associated polarity alignment patterns where the magnets are arranged circularly in accordance with the described embodiments.
Figure 84B:
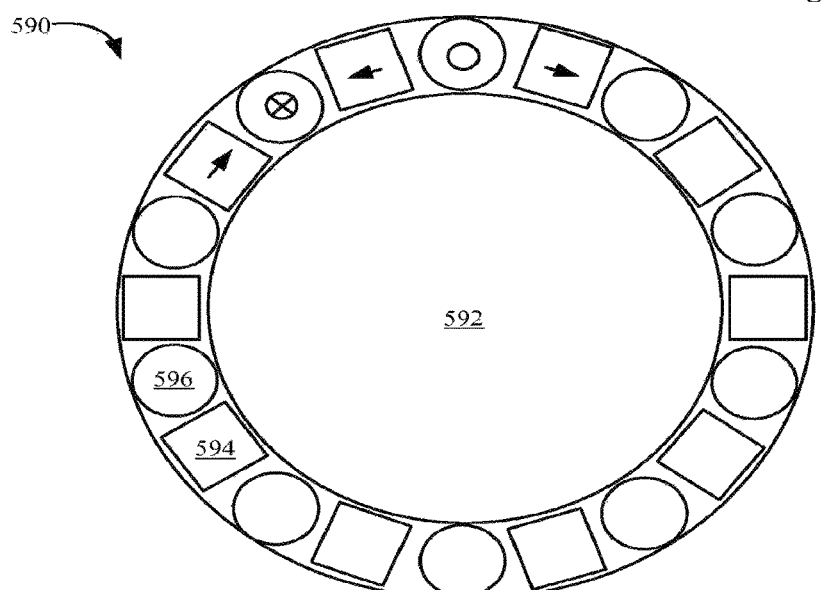

FIGS. 84A and 84B are top views of two magnet configurations and associated polarity alignment patterns where the magnets are arranged circularly in accordance with the described embodiments.

Figure 85:
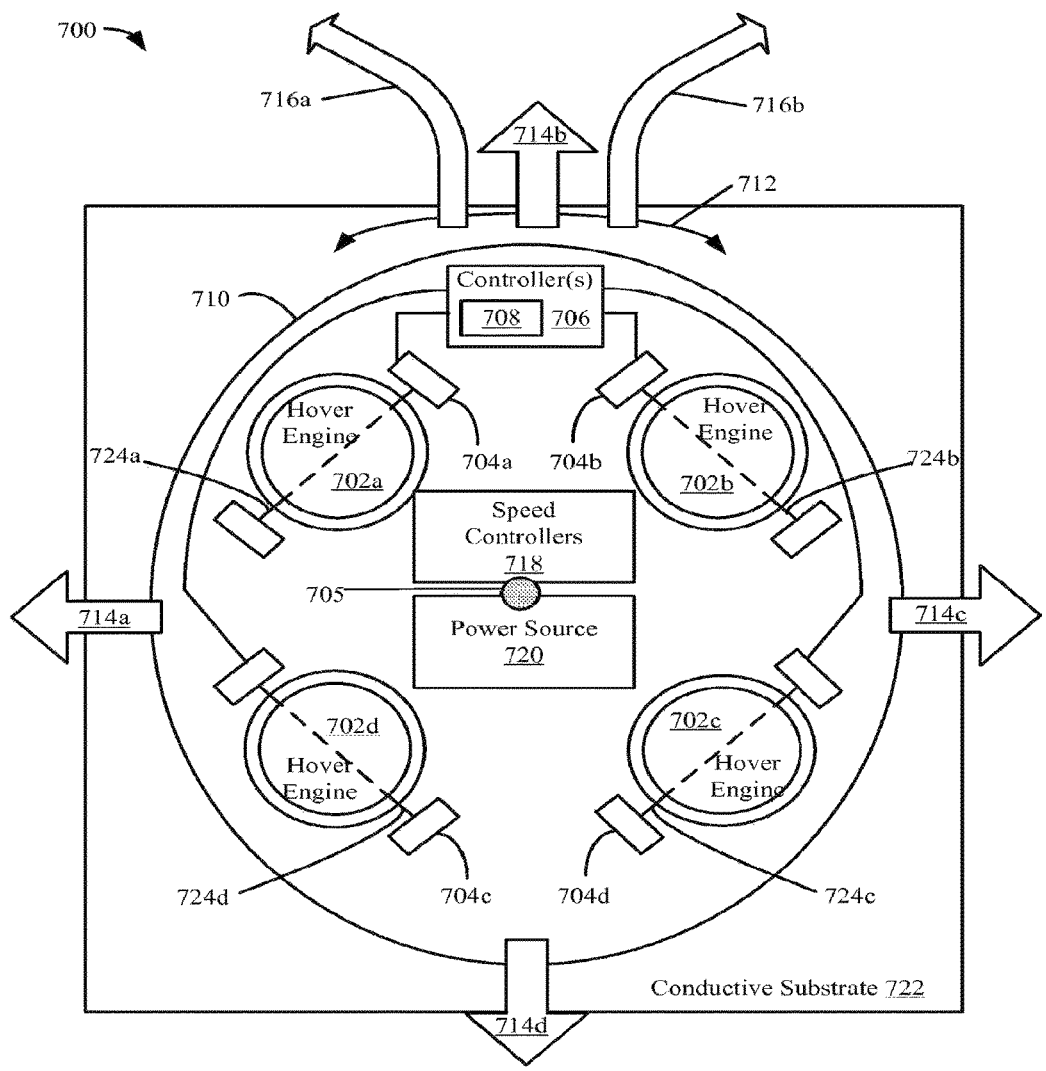
FIG. 85 is an illustration of a magnetically lifted device with four tiltable STARMs in accordance with the described embodiments.

FIG. 85 is an illustration of a magnetically lifted device with four tiltable STARMs in accordance with the described embodiments.

Figure 86A:
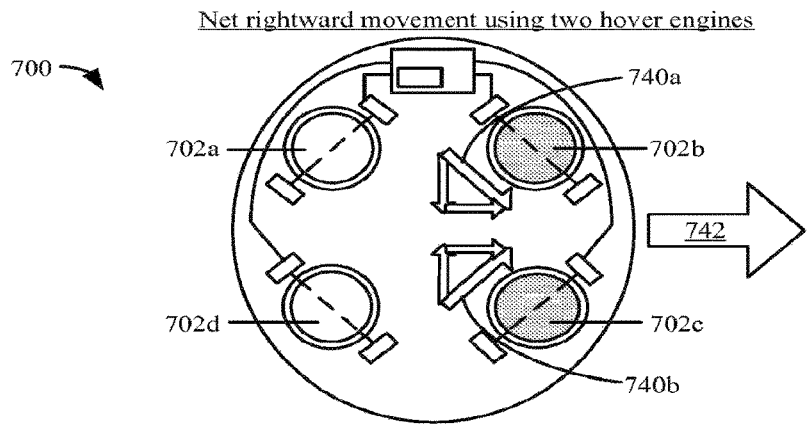
Figure 86B:
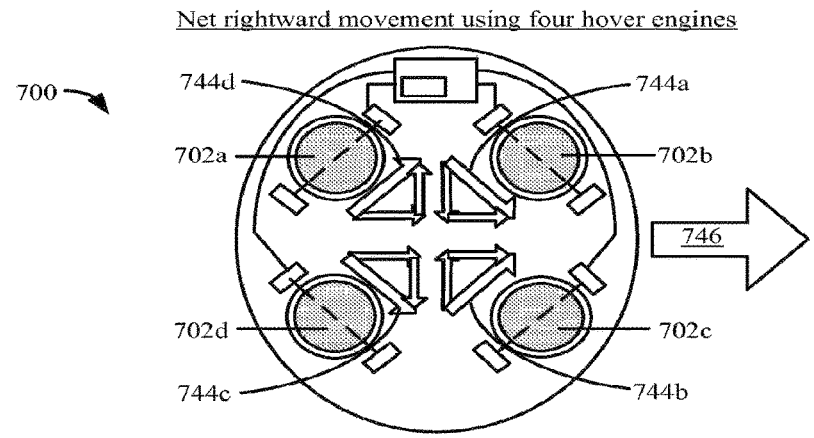
Figure 86C:
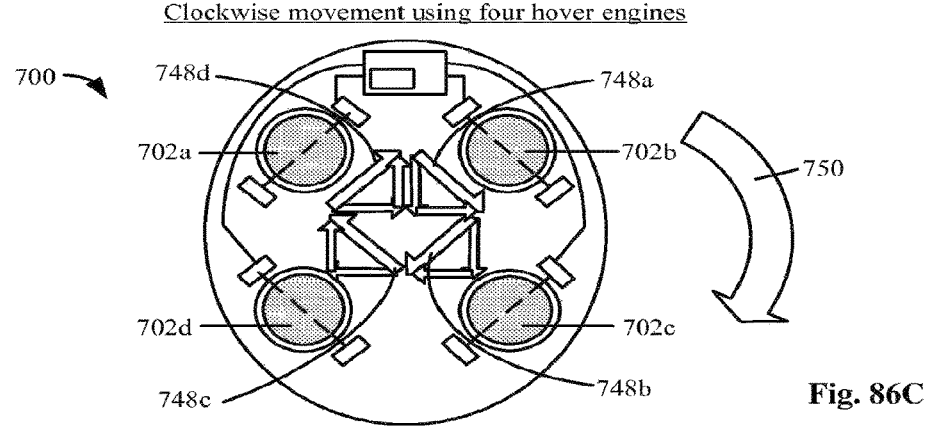

FIGS. 86A to 86C are illustrations of a magnetically lifted device with four tiltable STARMs tilted in various configurations in accordance with the described embodiments.

Figure 87:
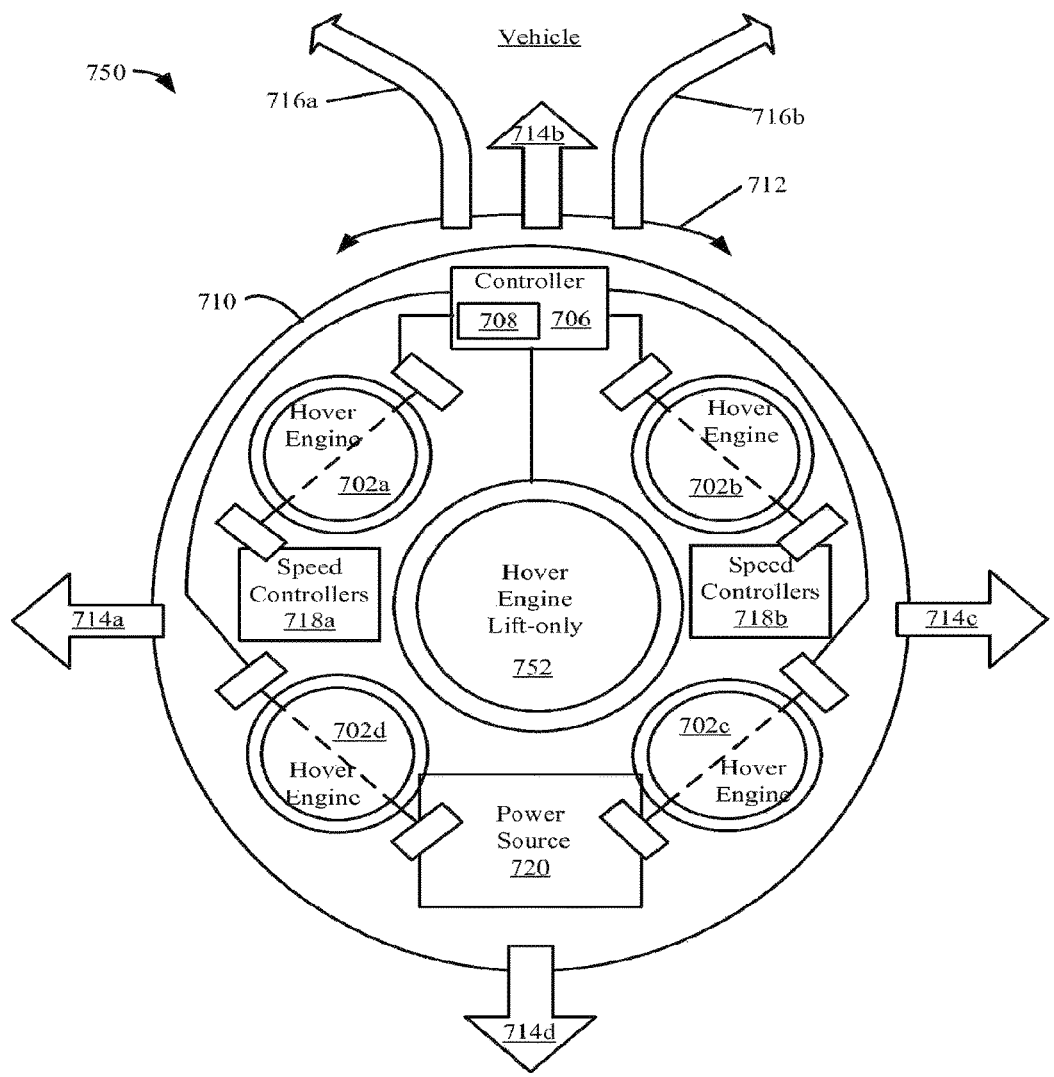
FIG. 87 is an illustration of a magnetically lifted device with four tiltable STARMs and one fixed STARM in accordance with the described embodiments.

FIG. 87 is an illustration of a magnetically lifted device with four tiltable STARMs and one fixed STARM in accordance with the described embodiments.

FIGS. 88 to 90 are illustrations of block diagrams and equations associated with a guidance, navigation and control system in accordance with the described embodiments.

In an embodiment, air can move around the different shapes of pods or vehicles in a hyperloop-like tube environment. In an embodiment, the shape of the pod is circular. In an embodiment, the shape of the pod is spherical. In an embodiment, the shape of the pod is square. In an embodiment, the shape of the pod is any shape that can function as needed to transport individuals or cargo. The provision of appropriate clearance between tunnel and train, engine, vehicle, or car is an important feature of this design. In cross-section, clearance can function in a manner similar to the cross-section of a duct. In this case the duct-like function is formed by proximity and adjacency of the vehicle and the tunnel interior surface.

Available section area between tunnel and vehicle can be utilized to allow any atmosphere within the tunnel to route around and bypass the vehicle. FIG. 70. This forms a vehicle-adjacent volume to allow alternative and advantageous aerodynamic solutions to address the dynamics of compression and expansion which can occur with high-speed travel.

The nesting of tunnel and vehicle can take a variety of forms. Among these are a circular tunnel bore occupied by vehicles which are substantially square or rectilinear in section. Functional elements such as vehicle suspension struts, levitation, rolling, track, or suspension, components can extend in ways to present reduced aerodynamic obstruction within the confined tube-like structure.

Similarly, other tunnel/vehicle forms can be nested to create similar useful functions. FIG. 71. Examples of valid tunnel/vehicle section combinations include:

1. Circular tunnel/and substantially triangular vehicle or suspension arrangement.

2. Circular tunnel/other polygonal vehicle or suspension arrangement.

3. Circular tunnel/non-circular vehicle or suspension arrangement.

4. Rectilinear, polygonal, or variously formed tunnel and circular or otherwise formed vehicle or suspension arrangement.

5. Substantially non-circular tunnel section and circular vehicle or suspension arrangement.

6. Ovoid, elliptical, formed of conic-sections, formed of catenary, hyperbolic, parabolic, arched, circular-arched tunnel section/compatible vehicle section or suspension arrangement.

A number of transportation concepts related to magnetic levitation of vehicles including trains are discussed herein and in the accompanying figures. Novel concepts disclosed are in some cases differentiated based on details of use and/or technical limitations or capacities. The concepts include:

1. Vehicle transit format; compatible with or dependent upon:
   a. Single vehicle. The disclosed hover technology is compatible with single vehicle uses.
   b. Mechanically linked vehicles including trains. The disclosed hover technology is compatible with linked vehicle uses.
   c. Non-mechanically linked trains. The disclosed hover technology is compatible with non-mechanically linked, train and or group routed vehicle uses.
   d. Dynamically switched vehicle groups. The disclosed hover technology is compatible with dynamically switched and routed vehicle, group, and/or train use.

2. Vehicle transit, routing, and/or switching formats:
   a. The disclosed hover technology can be applied to vehicles which make use of linear features and/or interconnected features such as conduit, tube, tunnel, or rail.
   b. The disclosed hover technology can be applied to vehicles which are not dependent, or not exclusively dependent, upon directions of travel which can be characterized as substantially longitudinal, such as forward/reverse. For example, a not dependent vehicle may possess the ability to travel laterally, diagonally, or otherwise, and may have zero or negative turning radii or other turning properties.
   c. The disclosed hover technology can be used in stationary positions as well as in translation or other non-stationary applications. For example, a vehicle may hover in a stationary position while loading or unloading.

3. Vehicle use compatible with, or dependent upon enclosed conduit, tube, or tunnel:
   a. The disclosed hover technology can be applied to vehicles which are able to operate within and/or independently of an enclosed conduit, tube, tunnel, or environment which may be pressurized and/or not evacuated of atmosphere or other fluid.
   b. The disclosed hover technology can be applied to vehicles which are capable of substantially operating within a conduit, tube, tunnel, or environment evacuated to partial or deep vacuum levels.
   c. The disclosed hover technology can be applied to vehicles which are capable of substantially operating within a conduit, tunnel, or environment containing various gasses and/or fluids or various mixtures and compositions of gasses and/or fluids.

d. The disclosed hover technology can be completely enclosed to enhance or allow operation in hostile environments in including space, marine, explosive atmospheres, and where radiological, chemical, or biological contaminants may be present.
e. The disclosed hover technology can be applied to vehicles from vehicle external and vehicle independent means.

4. Compatibility with non-linear, not-linear, or planar bearing substrates; including substrates for bearing via magnetic levitation:
a. The disclosed hover technology can be applied to vehicles which operate independently of linear bearing substrates or structures.
b. The disclosed hover technology can be applied to vehicles which operate on non-linear or not-linear bearing substrates including those with features which may be characterized as having features which include planar, convex, concave, or are otherwise articulated or composed.
c. The disclosed hover technology can be applied to vehicles which operate and/or travel in various orientations and may use variously opposed, not-opposed, non-opposed, inverted, or otherwise organized magnetic levitation strategies. This includes using magnetic levitation to create load or preload.

5. Ability to use passive magnetic levitation bearing substrates:
a. The disclosed hover technology does not rely on active or dynamic track or substrate functionality. Active components can be exclusively vehicle-borne if needed.
b. The disclosed hover technology can function in a glide-type mode which may be especially important as a safety feature in the event of power failures or other conditions of operation.

6. Ability to depart from explicit or approximate circular/cylindrical relationships between tube, tunnel or route enclosure and vehicle, train, or group travelling within.
a. Vehicle may use designs which only partially occupy available cross-sectional area of a tunnel, tube, or route enclosure.
b. Vehicle may be substantially shaped otherwise, in cross-section, than the form of the tunnel, tube, or route enclosure. For example the vehicle may have square, rectangular, polyhedral, convex, concave, or otherwise featured cross-section or cross-sections.
c. The tunnel, tube, or route enclosure may be have other than a circular cross-section. For example, it may have square, rectangular, polyhedral, convex, concave, or otherwise featured cross-section or cross-sections.
d. Tunnel, tube, or route enclosure and vehicle, may have different cross-sections. For example this may include combinations represented by square/round, round/square, round/triangular, rectangular/round, and others.
e. Vehicles only partially occupying cross-sectional area of a tunnel, tube, or route enclosure can bypass fluids, in available area or areas, to reduce impediment to travel, especially to very high speed travel in evacuated tubes, tunnels, or route enclosures.

7. Ability to operate with different alignments and orientations, angular and otherwise, with magnetic levitation bearing substrates and other materials or surfaces.
a. The disclosed "hover engine" or "hover engines" assembly or assemblies may or may not be fully or partially housed, shrouded, faired, enclosed, or shielded.
b. The disclosed hover engine or engines may vary in orientation and position relative to various magnetic levitation substrates or other materials or surfaces.
c. Any variation in orientation and/or position may occur with, within, or independently of any housing, shroud, fairing, or shielding.
d. This variation or orientation or position may allow various capabilities or aspects of performance to be balanced, exchanged, or prioritized. For example, hover engine assemblies, parts, or components may adjust, passively or actively, to accommodate transit in a tube vs. movement on a planar surface, vs. accommodating transitions between two differently configured surfaces or substrates.
e. The disclosed hover technology can be augmented with or used in tandem or in series with other means or methods such as wheels, skids, standoffs, lifts, struts, superconductivity, or other means of static or dynamic support, tracking, propulsion, levitation, guidance, or influence.
f. The disclosed hover technology can augment other means or methods.

8. The disclosed hover technology can offer advantages of significant "hover height" or standoff distance from hover substrates, especially compared to technologies such as air bearings.
a. Increases in standoff can offer benefits in terms of safety from collision or grounding with tunnel, tube, route enclosure, plaza, transition, or other mechanical and/or hover substrate features which are within or depart from ideal parameters.
b. Greater standoff distance can translate into significant savings with regard to construction of hover substrates, tubes, tunnels, or route enclosures due to reduced requirements for precision and accuracy, especially with regard to high or very high speed travel.

9. The disclosed hover technology can offer regenerative energy recovery opportunities with regard to converting kinetic energy, for example in the form of vehicle speed, into recovered, otherwise utilized, and/or stored potential energy.
a. Some applications can benefit from recovery or conversion of kinetic energy. For example, a high speed train may transition to a lower rate of travel by operating the "hover engines" in a passive or coasting mode or by operating the hover engines in a way that allows them to power an energy recovery process or system.

The accompanying figures depict vehicles including trains using hover technology, which are substantially rectangular in cross-section and occupying a tube, tunnel, or route enclosure which is circular in cross-section. The train-capable vehicles are depicted in relationship to tunnels, tubes, or route enclosures as well as operating and/or parked and/or being switched and moved upon a plaza-like surface. In some cases, depicted are routing, switching, or other movement which has substantially lateral components and/or can involve substantially unconstrained turns or rotations.

The disclosed hover technology is depicted in these images as housed in enclosures integral to and/or displaced from vehicular forms. The use of displacement can create available cross-sectional area to allow aerodynamic techniques such as bypass of gasses for reduction of impediment and/or resistance to movement, especially in constraining tubes, tunnels, and/or route enclosures.

Magnetic Propulsion

In this section, configurations of STARMs, which generate propulsive and lift forces, are described. Propulsive and/or lift forces can be generated by mechanisms including but not limited to those disclosed herein. In particular embodiments, an orientation of one or more STARMs relative to a substrate can be used to generate propulsive and/or control forces. Other mechanisms of propulsion are possible, alone or in combination with controlling the STARM orientation to generate propulsive and directional control forces. Thus, these examples are provided for the purpose of illustration only and are not meant to be limiting. For example, the rotation rate of one or more STARM can be varied to provide yaw control.

Figure 72A:
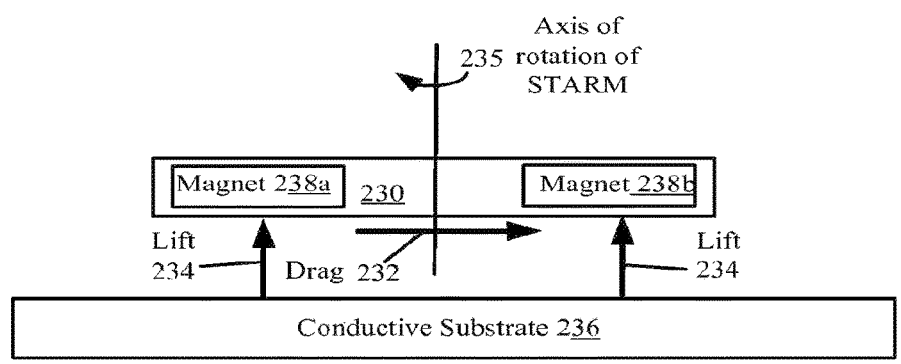
FIGS. 72A, 72B, 73 and 74 are illustrations of STARMs tilted relative to a conductive substrate and associated forces which are generated in accordance with the described embodiments.

In FIG. 72A, a STARM 230 is shown in a neutral position. The STARM includes magnets, such as 238a and 238b. In the neutral position, the lifting forces 234 on average over time are equal across the bottom surface of the STARM 230. Further, the net drag forces 232 acting on the STARM 230 are balanced (While rotating, the STARM generates a magnetic field which is moved through the conductive substrate 236. The eddy currents formed in the substrate as a result of the moving magnetic field resist this movement, which can act as a drag force 232 on the STARM 230). With imbalances due to lift and drag balanced, the STARM 230 will substantially remain in place of over the conductive substrate.

Small imbalances may exist, which cause the STARM to move in one direction or another. For example, local variations in material properties in the conductive substrate 236 can cause small force imbalances. As another example, the dynamic vibration of the STARM 230, such as from adding or removing loads can cause small force imbalances. However, unless the small force imbalances are biased in a particular direction, the STARM will remain relatively in the same location (i.e., it might move around a particular location in some manner).

If the rotational momentum is not balanced, the STARM may rotate in place. A vehicle can include multiple STARMs which are counter rotating to balance the rotational forces. Further, as will be described below in more detail, the orientation of a STARM can be controlled to generate a moment around a center of mass of a vehicle, which allows the rotation of a vehicle to be controlled.

Figure 72B:
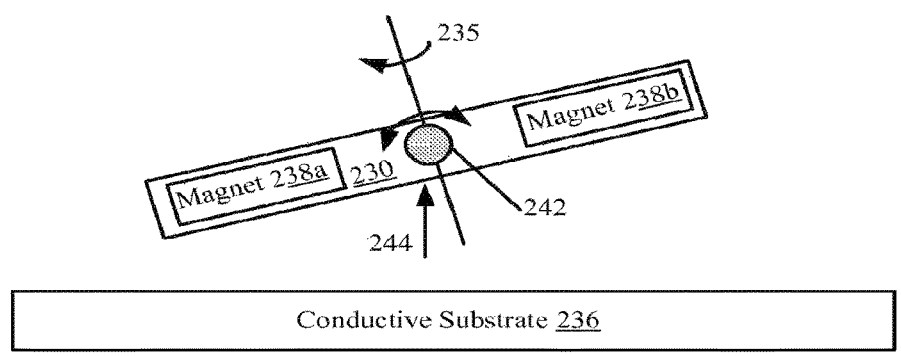

FIG. 72B shows the STARM 230 in a tilted position. The STARM 230 has been rotated around an axis 242 which is perpendicular to the axis of rotation 235 of the STARM 230. When the STARM 230 is tilted, more drag is generated on the side of the STARM 230 closest to the substrate 236. As is described in more detail below, the drag typically increases when the magnets are brought closer to the substrate. The drag imbalance on the different sides of the STARM causes a thrust to be generated mostly in the direction of the tilt axis 242, i.e., into or out of the page. For some magnet and system configurations, the lift 244 can remain relatively constant or even increase as a function of tilt angle, i.e., lift 244 can be greater than lift 234. The amount of thrust may increase when the tilt angle is first increased. The amount of tilt which is possible can be limited to prevent the STARM 230 form hitting the substrate 236.

Figure 73:
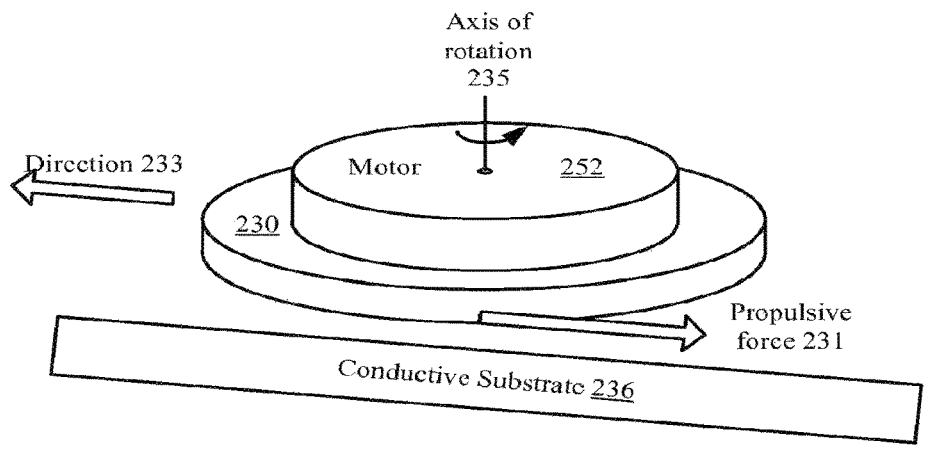

FIG. 73 shows an example of a hover engine including a STARM 230 and motor 252 climbing an inclined substrate 236. The hover engine is tilted to generate a propulsive force 231 which moves the hover engine in direction 233 up the included surface. In one embodiment, the magnitude of the propulsive force 231 can be sufficient for a hover engine to lift a payload in a vertical direction. For example, the conductive substrate 236 can be aligned vertically and the hover engine can be configured to climb vertically and carry its weight and a payload up the wall.

Figure 74:
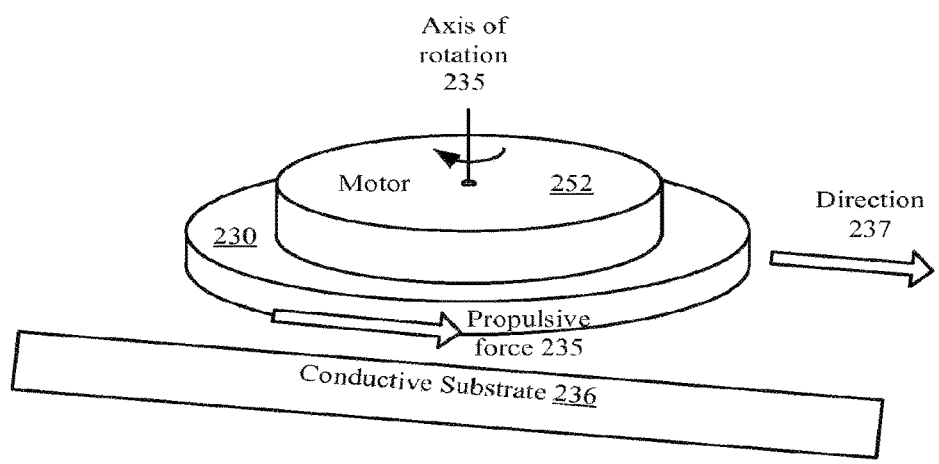

FIG. 74 shows an example of a hover engine braking as it descends down an incline. In FIG. 74, the hover engine, which includes motor 252 and STARM 230, is moving down a sloped substrate in direction 237. The hover engine is outputting a propulsive force 235 which is pushing the hover engine up the incline opposite the direction of movement 237. The braking force slows the descent of the hover engine down the inclined substrate. In a particular embodiment, a hover engine can be configured to output a sufficient force to allow it to hold its position on an inclined surface, i.e., the force output from the hover engine balances the gravitational forces. In general, hover engines can be configured to output forces in a direction of movement for propulsion or opposite the direction of movement for braking.

FIGS. 75A, 75B and 75C are block diagrams which are used to discuss more details associated with hovering and propulsive effects from rotating arrangements of magnets used in a hover engine. In FIG. 75A, a hover engine includes a motor 252 is coupled to a STARM 254. The STARM 254 is coupled to the motor 252 and the motor 252 is coupled to a rotatable member 258. The rotatable member 258 is coupled to anchors 256a and 256b. The combination of the rotatable member 258 and the anchors 256a and 256b can be configured to constrain a range of rotation of the rotatable member. For example, the rotatable member 258 may be allowed to rotate through some angle range 264 around its axis.

The rotatable member 258 can be configured to receive and input torque from some mechanism. For example, in one embodiment, a mechanical linkage can be provided which allows a user to supply a force. The force can be converted into torque which causes the rotatable member 258 and hence the motor 252 and the STARM 254 to rotate.

In another embodiment, an actuator can be used to supply the torque to rotate rotatable member 258. An actuation of the actuator can cause the motor 252 and STARM 254 to tilt relative to the substrate 266. The actuator can include a servo motor which receives control commands from a controller. In one embodiment, the actuator can include its own controller which receives control commands from a separate processor, which is part of the control system.

In yet another embodiment, a hover engine can be configured to receive an input force from a user and can include an actuator. The actuator can be used to change a position of the STARM, such as returning it to a designated position after a user has tilted it. In another operation mode, the actuator can be used to provide automatic control around some tilt position initiated by user via an input force.

It yet another embodiment, the actuator can be used to provide automatic controls which may be used to correct a control input from a user. For example, if the control system detects the magnetically lifted device is an unstable position as a result of a user input, the control system can control one or more STARMs to prevent this event from happening. A magnetic lifting vehicle, such as a vehicle for personal use, vehicle for mass transportation, or a hoverboard, can include one or more on-board sensors used to make these corrections.

A magnetically lifted device may also include one or more weight sensors for determining a weight distribution of a payload. The weight distribution associated with the device and payload can affect the response of the device in response a command to change an orientation of the device via some mechanism, such as a tiltable hover engine. For example, the weight distribution associated with a payload can affect the magnitude of rotational moments. Thus, knowledge of the weight distribution may be used to more finely tune the commands used to control the orientation of the STARM, such as selecting which STARM to actuate and an amount to actuate it.

When the STARM 254 and motor 252 are rotating, a rotation of the rotatable member 258 changes the angular momentum of the STARM and the motor. It can also change the magnetic forces acting on the STARM 254 as the magnetic forces vary with the distance of the magnets in the STARM 254 from the substrate 266. Therefore, the amount of torque needed to rotate the member 258 can depend on the moment of inertia associated with the STARM 254 and motor 252, how fast the STARM 254 and motor 262 are spinning and the height of the STARM 254 above the substrate 266. The height of the STARM above the substrate can depend on 1) its rotational velocity, which affects how much lift is generated, and 2) a payload weight and 3) how the payload weight is distributed on the device. The height of the STARM above the substrate can vary for different portions of the STARM and from STARM to STARM when a device includes multiple STARMs.

In the example of FIG. 75A, the STARM 254 is approximately parallel to the substrate 266. The magnetic drag, such as 262a and 262b, opposes the rotation of the STARM 254. The motor 252 is configured to rotate in the clockwise direction 260. Thus, the drag torque is in the counter clockwise direction. Power is supplied to the motor 252 to overcome the drag torque.

When the STARM is parallel to the substrate 266, the magnetic drag is balanced on all sides of the STARM 254. Thus, there is no net translational force resulting from the magnetic drag. A net translational force is generated when the STARM 254 and its associated magnets is tilted relative to the substrate.

In FIG. 75B, the STARM 254 is in a titled position 270. Thus, one side of the side of STARM 254 is closer to the substrate 266 and one side of the STARM 254 is farther away from the substrate 266. The magnetic interaction between the magnets in the STARM 254 and substrate decreases as a distance between the magnets in the STARM and substrate 266 increases The magnitude of the interactions varies non-linearly with the distance from the substrate. Thus, in tilted position 270, the drag force 268 *b* is increased on one side of the STARM 254 and the drag force 268a is reduced on the opposite side of the STARM 254 as shown in FIG. 75B. The drag force imbalance creates traction, which causes a translational force to be generated approximately in the direction of the axis of rotation of the rotational member 258.

When the STARM 254 is initially tilted, the translational force can result in an acceleration of the STARM 124 in the indicated direction and hence change in velocity in the indicated direction. In particular embodiments, with one or more STARMs configured to generate translational forces, a device can be configured to climb. In another embodiment, the device may be configured to maintain its position on a slope while hovering such that the gravitational forces acting on the device are balanced by the translational forces generated by the device and its associated hover engines.

The device can have sufficient propulsive ability to allow it to hold its position on the slope against the force of gravity. For example, the device can be moved side to side while it maintains its position on the slope. Further, the device may be able to move downwards on the slope and then climb upwards on the slope against gravity. In some instance, the climbing can be done while the device's orientation remains relatively unchanged, i.e., the device doesn't have to be turned around to climb. This maneuver can be accomplished by changing an orientation of the hover engines relative to the substrate which supports the induced eddy currents. These control functions will be discussed in more detail as follows.

Returning to FIGS. 75A and 75B the amount of tilt in a particular direction can affect the amount of force imbalance and hence the magnitude of the acceleration. Because the magnetic drag is function of the distance of the magnets from the substrate, the magnetic drag increases on the side closer to substrate and decreases on the side father away from the substrate. As the magnetic forces vary non-linearly with the distance of the magnets from the surface, the amount of translational forces which are generated may vary non-linearly with the tilt position of the STARM.

After a STARM 254 (or both the STARM 254 and motor 252) has been rotated via member 258 in a counter clockwise direction and the STARM has started translating in a first direction, an input torque can be provided which tilts the STARM in a clockwise direction to reduce the amount of translational force which is generated by the STARM. When the STARM is tilted past the horizontal in the clockwise direction, the STARM may generate a translational force which is in an opposite direction of the first direction. The translational force opposing the direction of motion can slow the STARM and bring it to rest. If desired, the translational force can be applied such that the vehicle stops and then the STARM can begin to translate in an opposite direction.

FIG. 75C is a side view of a hover engine 280 coupled to a tilt mechanism in a tilt position. The hover engine includes a motor 252 and a STARM 254 which can be positioned over the substrate 266. In one embodiment, the mechanism can include a minimum tilt off set angle 284. The minimum tilt off set angle 284 in this example is between the horizontal and line 282. The tilt range angle 286 is the angle amount through which the hover engine may rotate starting at the minimum tilt off set angle 284. The tilt mechanism can include one or more structures which constrain the motion of the tilt mechanism to the tilt angle range.

When the minimum tilt off set angle 284 is zero and the STARM 254 is parallel to the substrate 266, the STARM 254 may not generate a net translation force. A device to which a STARM is coupled can be tilted. Therefore, the angle of the STARM relative to the substrate can depend on the orientation of the STARM relative to some reference system associated with the device and the orientation of the device relative to the substrate where both orientations can change as a function of time. Thus, in some instances, a translation force can be generated even when the minimum tilt off-set is zero. When the minimum tilt off set angle is greater than zero, the STARM may generate a net translational force at its minimum position in a particular direction. When the minimum tilt off set angle is less than zero, then during the tilt angle range the magnitude of the force may be go to zero and the direction of the force which is generated can also change.

In some embodiments, the net minimum force generated by one hover engine can be balanced in some manner via translational forces associated with other hover engines. For example, as shown, two hover engines can be tilted to generate forces in opposite directions to cancel one another. Thus, although the net force for a single hover engine may be greater than zero at its minimum tilt off set angle position, it can be balanced by forces generated from another STARM such that the net force acting on the device is zero.

The forces which are generated from a tilted STARM can vary non-linearly with angle of the hover engine relative to the substrate. Thus, the change in force which is generated as a function of a change in angle can vary non-linearly. By utilizing, a minimum tilt angle offset, the hover engine can be configured to output more or less force in response to a change in a tilt angle over a selected tilt angle range. In this manner, the control characteristics of the device can be adjusted.

Next, another example of a STARM which can be tilted through multiple degrees of freedom is described. In FIG. 76A, hover engine including a STARM 254 coupled to a motor 252 is shown. The hover engine is coupled to a support structure 271 via a ball joint 273. Two pistons, 275a and 275b, are shown which are coupled to the hover engine and the support structure 271. The pistons, 275a and 275b, can be used to push the hover engine downward and change a tilt angle of the STARM 254 relative to a substrate 266. A plurality of different pistons can be used to tilt the motor in a plurality of different directions. Other types of actuators can be used which generate a downward force on the hover engine to tilt the STARM 254 and the example of a piston for the purposes of illustration only.

In FIG. 76B, a first piston 275A is shown extended downwards, which tilts the motor 252 and STARM 255 downwards on one side. To bring the motor 252 back to a horizontal position, the second piston 275b can be extended downwards which causes the first piston to shorten 275a. To tilt the motor 252 and STARM 254 in the opposite direction, the second piston 275 b can be extended a greater amount, which forces the first piston to shorten 275 a. In various embodiments, multiple pairs of pistons can be used to tilt the motor in different directions and change a direction in which a force is generated as a result of tilting the STARM. The pistons can be coupled to the motor and/or the support structure via an appropriate joining mechanism which may possess some rotational degrees of freedom.

Vehicles Including Flight Data

FIG. 77A is a bottom view of vehicle 200. In FIG. 77A, the vehicle 200 includes four hover engines, 204a, 204b, 204c and 204d. The hover engines are of equal size and use similar components, i.e., similar motor, number of magnets, STARM diameter, etc.

Each hover engine includes a STARM, such as 225, with a motor (not shown) and engine shroud 218 with a gap between the shroud 218 and STARM 225 to allow for rotation. The STARM 225 is mechanically connected to the motor via fasteners 222. The motor, which mount below the STARMs in the drawing, provides the input torque which rotates the STARM. In alternate embodiments, a single motor can be configured to drive more than one STARM.

The hover engines each have a shroud, such as 218. The shroud 218 partially encloses the STARM, such that a bottom of the STARM is exposed. In other embodiment, the shroud can enclose a bottom of the STARM. A tilt mechanism 212 is coupled to the shroud 218 of each hover engine. The tilt mechanism 212 is coupled to a pivot arm 210. The hover engines 204a, 204b, 204c and 204d are suspended beneath a support structure 202. The pivot arms, such as 210, extend through an aperture in the support structure.

The motors in each hover engine can be battery powered. In one embodiment, sixteen battery packs are used. The sixteen batteries are wired together in four groups of four batteries and each coupled to motor electronic speed controllers, such as 206a and 206b via connectors 216a and 216b to four adjacent battery packs. The four batteries in each group are wired in series in this example to provide up to about 60 V to the electronic speed controllers. Connectors 216c and 216d each connect to four batteries and an electronic speed controller. Two electronic speed controllers are stacked behind 206a and 206b. Thus, four brushless electronic speed controllers, one for each motor, are used.

FIG. 77B is a top view 230 of the vehicle. The hover engines are suspended beneath the central support structure 202 as described above with respect to FIG. 77A. The shrouds, such as 218, of the hover engines extend slightly beyond an edge of the support structure 202. The shrouds can be made strong enough to support a weight of a person without impinging any underlying parts, such as a rotating STARM.

In an embodiment, the vehicle can be a hoverboard. Similar mechanisms can be utilized for vehicles for personal use and mass transportation. A platform 232 is mounted above the support structure. Some examples of materials which may be used to form support structure 202, shroud 218 and rider platform 232 include but are not limited to wood, plywood, plastic, reinforced plastic, polymers, glass filled nylon, fiber glass, reinforced composites, metals (e.g., aluminum), metal alloys, metal composite materials (e.g., an aluminum composite material), a hemp composite, composites with a honeycomb core or other inner structure, composites with a balsa core, expanded metal, etc.

The pivot arms 210, which are attached to each of the hover engine shrouds, such as 218, are coupled to the rider platform 232 at connection points 234. The platform can be formed from a flexible material. When a rider stands on the platform and shifts their weight from quadrant to quadrant, the rider platform can flex. The flex can cause the pivot arm coupled to each of connection points 234 to move downwards which causes the hover engine coupled to each pivot arm to tilt. As described above, when the hover engine is tilted, a force can be generated which is approximately aligned with the tilt axis.

The rider can shift their weight and the amount of weight distributed to each pivot arm by changing their foot position on the rider platform 232 and the amount of weight distributed to each foot. Thus, the amount of force distributed to each pivot arm can be controlled and hence the amount of tilt to each hover engine can be varied. By varying the tilt, an amount of translational force output by each hover engine in a particular direction can be controlled. As described above, these forces can be used to control spin, such as starting or stopping a spin and controlling a rate of spin. The forces can also be used to steer the vehicle.

FIG. 77C is a side view 250 of a vehicle. As can be seen in the FIG. 77C, all of the components need to operate the hover engines, such as the batteries and speed controls are suspended from the bottom of support structure 302 and packaged below a height of the bottom of the hover engine.

In this embodiment, the rider platform 232 is supported at the ends and coupled to the structure 202 via members 274a and 274b. This configuration allows the rider platform 232 to bend in the middle, such as when weight is applied at location 254 and 256 above the pivot arms, such as 210. In an alternate embodiment, the rider platform may be supported by a member, which bisects it lengthwise. Then, the rider platform 232 may be bent on either side of this central member when weight is applied.

In yet another embodiment, the rider platform 232 may be sectioned to allow portions to move independently of one another. The individual sections can be coupled to the vehicle such that they may be flexed to actuate one of the tilt mechanisms. In another embodiment, the individual portions may be coupled to the vehicle via a hinge mechanism. The individual portions can then be rotated about the hinge.

When a hinge mechanism is used, a stiffer material may be utilized for the individual section. However, a repositioning mechanism, such as one or more springs or flexible foam, may be used to return the individual portion to an original position after a force is removed. The repositioning mechanism, such as springs, can also be used to affect the amount of force required to move the individual section.

The hover engine shrouds are coupled to a hinge mechanism 272. The hinge mechanism 272 hangs from the support structure 202. The hinge mechanism provides for rotation about one axis. Some examples of hinge mechanisms which may be utilized include but are not limited to a butt hinge, a barrel hinge, a flush hinge, a continuous hinge, a pivot hinge, a coiled spring pin hinge and self-closing hinges. A gap is provided beneath the hinge mechanism, the gap allows wires 208 b from the speed controller 206 b to reach the motor 265 encircled by the shroud 218. The electronic speed controllers, such as 206 b, are each connected via connectors, such as 216 b, to four adjacent battery packs (see FIG. 77A). In alternate embodiments, the shroud 218 can include one or more apertures (e.g., 267) which allow wires to be passed to the motor 265.

In this example, the hinges allow each hover engine to rotate through some angle, such as 266 and 269, about one rotational axis. As described above with respect to FIGS. 76A and 76B, joints which allow for more rotational degrees of freedom are possible and this example is provided for the purposes of illustration only. The bottom of the shrouds, such as 218, when tilted is illustrated by the dashed line 262 and 264. The tilt angles 258 and 260 are defined as the angle between the shrouds are horizontal and the bottom of the shrouds when tilted as indicated by lines 262 and 264.

In one embodiment, the hover engines can be configured to tilt up to ten degrees in one direction. In operation, when the weight is removed from locations 254 and 256, the rider platform 232 may unbend and the shrouds may return to a first position. When weight is added, the rider platform may flex by some amount at each location and the shrouds may each tilt by some amount.

As described above, the amount of tilt associated with each hover engine may be constrained. Further, the amount of tilt doesn't have to be same for each hover engine. For example, one hover engine can be allowed to rotate up to ten degrees while a second hover engine can be allowed to rotate up to only five degrees. In particular embodiments, a hover engine can be configured to rotate through up to 10 degrees, up to 20 degrees or up to 30 degrees of total rotation. The rotation directions 266 and 268 are shown for each hover engine. In one embodiment, each hover engine is allowed to rotate in only one direction. In another embodiment, a hover engine may be allowed to rotate in two directions, such as angles of plus or minus ten degrees past the horizontal.

Vehicle Configurations and Navigation, Guidance and Control (NGC)

Next, various configurations of magnetically lifted devices including multiple hover engines are described with respect to FIGS. 85-90. In particular, arrangements of hover engines and then their actuation to provide movement are described. In addition, Navigation, Guidance and Control (NGC) functions, which can be applied to magnetically lifted devices, are discussed.

FIG. 85 shows a top view of a vehicle 700 configured to operate over a conductive substrate 722. The vehicle 700 includes four hover engines 702a, 702b, 702c and 702d. Each hover engine includes a STARM and a motor and a mechanism which enables a propulsive force to be output from each hover engine. In one embodiment, each of the hover engines 702a, 702b, 702c and 702d can be tilted around an axis, such as 724a, 724b, 724c, 724d, via control of an actuator. In particular embodiments, the hover engines can each be individually actuated so that the direction and amount of the tilt angle as a function of time can be individually changed for each of the four engines.

In alternate embodiments, two or more hover engines can be controlled as a unit. For example, two or more hover engines can be mechanically coupled to a single actuator. The single actuator can move both hover engines simultaneously. In another example, the two or more hover engines can be digitally coupled such that the two or more hover engines are always moved together simultaneously, i.e., a movement of one hover engine specifies some specific movement of another hover engine, such as both being tilted in the same manner. When independently controlled, the movement of one hover engine can affect the movements of other engines, such as to implement GNC functions. However, a second hover engine may not be always constrained to a specific control movement in response to the movement a first hover engine as in the case when two hover engines are controlled digitally and/or mechanically controlled as unit.

The actuators associated with each hover engine can be coupled to one or more controllers 706 and an IMU 708 (Inertial Measurement Unit). The actuators can each also have a separate controller which responds to commands from the controller 706. The controller 706 can also be coupled to a power source 720 and one or more speed controllers 718. The one or more speed controllers 718 can be mechanical speed controller or electronic speed controllers. The power source can be on-board or off-board. The hover engines are secured via a housing and associated support structure 710.

The center of mass of the vehicle is indicated by the circle 705. The center of mass affects the moments generated when each of the four hover engines are actuated. In particular embodiments, the vehicle can include a mechanism which allows the center of mass to be adjusted in flight, such as a mechanism for moving a mass from one location to another. For example, in an airplane, fuel can be moved from one tank to another to affect the center of mass characteristics.

An IMU 708 works by detecting the current rate of acceleration using one or more accelerometers, and detects changes in rotational attributes like pitch, roll and yaw using one or more gyroscopes. It may also include a magnetometer, to assist calibrate against orientation drift. Inertial navigation systems can contain IMUs which have angular and linear accelerometers (for changes in position). Some IMUs can include a gyroscopic element (for maintaining an absolute angular reference).

Angular accelerometers can measure how the vehicle is rotating in space. Generally, there is at least one sensor for each of the three axes, pitch (nose up and down), yaw (nose left and right) and roll (clockwise or counter-clockwise from the cockpit). Linear accelerometers can measure non-gravitational accelerations of the vehicle. Since they can move in three axes (up & down, left & right, forward & back), there can be a linear accelerometer for each axis.

A processor can continually calculate the vehicle's current position. First, for each of the six degrees of freedom (x, y, z and θx, θy and θz), the sensed acceleration can be integrated over time, together with an estimate of gravity, to calculate the current velocity. Then, the velocity can be integrated to calculate the current position. These quantities can be utilized in the GNC system.

Returning to FIG. 85, as described above, the forces generated from changing a tilt of a rotating STARM relative to the substrate 722 are directed primarily along the tilt axes when the vehicle is parallel to the substrate 722. For example, a tilt of hover engine 702a can generate a force which is primarily parallel to axis 724a.

With the tilt axes arranged at an angle to one another as shown in FIG. 85, a combination of STARMs can be actuated to generate a net linear force in any desired direction. Further, the STARMs can be actuated in combination to cancel moments or if desired induce a desired rotation in a particular direction. In addition, different combinations of STARMs can be actuated as a function of time to generate a curved path in a desired direction(s) as a function of time. Yet further, a combination of STARMs can be actuated so that the vehicle moves along linear or curved path and rotates around an axis while moving along the path.

The tilt control can be used alone or in combination with rotational velocity control of each hover engine. The translational and lifting forces which are generated can vary as a function of the rotational velocity and a hover height. A rotational speed of a hover engine can be varied relative to other hover engines or in combination with other hover engines to change the magnitude of lifting and drag forces which are output from the one or more hover engines. For example, the rotational velocity control may be used to counter imbalances in forces, such as resulting from a shifting center of mass. For an electric motor, the one or more controllers 706 can control the speed controllers 718 to change the rotational velocity of a hover engine.

In the example of FIG. 85, angles can be defined relative to the tilt axes. For example, the angle between tilt axis 724a and 724b is approximately ninety degrees. The angle between tilt axis 724a and 724c is approximately ninety degrees and the angle between tilt axis 724a and tilt axis 724c is 180 degrees.

In one embodiment, the tilt axes of the hover engines opposite one another can be parallel to one another, i.e., an angle of one hundred eighty degrees. However, the angle between the tilt axes of the hover engines adjacent to one another don't have to be equal. In particular, the angle between tilt axes 724a and 724b can be a first angle and the angle between tilt axes 724a and 724c can be one hundred eighty degrees minus the first angle where the first angle is between zero and one hundred eighty degrees. For example, the angle between tilt axes 724a and 724b can be ten degrees and the angle between tilt axes 724a and 724c can be one hundred seventy degrees. In general, the angles between all of the tilt axes, 724a, 724b, 724c and 724d can be different from one another.

In FIG. 85, the hover engines can be tilted to generate various movements, such as left, 714a, right 714C, forward 714b and back 714d. Further, the hover engines can be tilted as a function of time to cause the vehicle 700 to follow a curved path, such as 716a and 716b. In addition, the hover engines can be tilted to cause the vehicle 700 to rotate in place in a clockwise or counterclockwise rotation 712. For example, without rotating, the vehicle 700 can be controlled to move in a first straight line for a first distance, and then move in a second straight line perpendicular to the first straight line for a second distance. Then, the vehicle 700 can rotate in place. In this way, the vehicle 700 possesses the ability to travel forwardly, reversely, laterally, diagonally, or otherwise, and may have zero or negative turning radii or other turning properties.

In addition, one actuator is shown per motor. In alternate embodiments, a single actuator can be used to tilt more than one hover engine. In yet other embodiments, a plurality of actuators can be used to change an orientation of a STARM and/or motor. In further, embodiments, one or more actuators in combination with an input force provided from a user can be used to change an orientation of a STARM and/or motor.

The servos are used to tilt a motor and a STARM in unison. The control system is configured to independently tilt each hover engine including the motor and STARM. In a particular embodiment, the motor and STARM are configured to tilt through a range of −10 to 10 degrees. Ranges, which are greater or small than this interval can be used and this example is provided for the purposes of illustration only.

In one embodiment, the same tilt range can be implemented for each hover engine. In other embodiments, the tilt range can vary from hover engine to hover engine. For example, a first hover engine can be tilted between a range of −15 to 15 degrees and a second hover engine can be tilted between −5 and 10 degrees.

In particular embodiments, a vehicle can be controlled via a mobile control unit. The mobile control unit can be coupled to a vehicle via a wireless or wired communication link. The mobile control unit can include one or more input mechanisms, such as control sticks, a touch screen, sliders, etc.

The mobile control can receive inputs from the input mechanisms and then send information, such as commands, to the vehicle. A command could be move right, move in some direction or rotate in place. The GNC system on the vehicle can receive the command, interpret it and then in response generate one or more additional commands involving controlling the actuators and/or hover engines to implement the commands. For examples, one or more of the actuators on the vehicle can be controlled to implement a received movement or rotation command.

FIGS. 86A, 86B and 86C, show some examples of actuating different combination of hover engines to produce a movement or rotation. In FIG. 86A, two hover engines 702b and 702c, which are shaded, are actuated to produce a net rightward force 742 which can move the vehicle to the right 742. The direction of the net force generated by each of the two hover engines is shown by the adjacent arrows, 740a and 740b. Hover engine 702b generates a net force 740a with a downward and rightward force component. Hover engine 702c generates a net force 740b which is upwards and to the right.

The upward and downward translational forces cancel when the two hover engines are actuated to generate the same magnitude of force which results from the eddy currents induced in the substrate. The rightward force components are additive and produce a net translational force to the right. When the two hover engines are an equal distance from the center of mass of the vehicle, the moments generated from the two hover engines cancel one another and thus rotational stability can be maintained.

The hover engines, even when identical, may not be actuated the same amount. For example, the vehicle 700 can be tilted such that one of hover engine 702b and 702c is closer to the substrate. The distance of the hover engine to the substrates affects the force output from the hover engine as a result of its tilt. Hence, different tilt angles may be required to balance the forces output from each hover engine.

Further, the vehicle 700 may hover in a stationary position while loading or unloading. When the vehicle 700 is loaded, the center of mass can shift depending on how the weight of the payload is distributed. Thus, the center of mass can shift from the unloaded state to the loaded state and the two hover engines may no longer be an equal distance from the center of mass of the vehicle. In this instance, when a pair of hover engines each generates the same amount of net force, a net moment may be present because the two hover engines are different distances from the center of mass. Thus, the combination of hover engines which are used and the amount of actuation of each hover engine may have to be adjusted to account for the shifting center mass due to payload shifts or the overall orientation of the vehicle 700 relative to the substrate over which it is operating.

The magnitude of the effects resulting from changes in the center of mass will depend on how much the center of mass shifts from the loaded to unloaded state. Further, in some instances, the center of mass can shift during operation if the payload is allowed to move during operation or if the payload is being lessened. For example, if a fuel is consumed during operation of the vehicle, the center of mass of the vehicle may change due to the fuel being consumed. As another example, if one or more persons is riding on a vehicle and can move around, the center of mass may change. Thus, in particular embodiments, the center of mass may be changing dynamically during operation and the GNC system can be configured to account for the shifts in the center of mass of the vehicle when maintaining rotational and translational control.

In FIG. 86B, a net rightward movement is generated using four hover engines. In this example, all four hover engines, 702a, 702b, 702c and 702d are actuated to generate a net force 746 in the rightward direction. In general, the hover engines can be actuated to generate a net translational force which is substantially in the rightward direction. In particular, the hover engines are actuated to cancel translational forces in other than rightward directions. Further, hover engines can be actuated such that the net moment acting on the vehicle is zero. As described above, to rotate the vehicle, a net moment can be generated which rotates the vehicle in a clockwise or counter-clockwise direction.

In FIG. 86C, the four hover engines, 702a, 702b, 702c and 702d, are shown actuated in a manner which causes a net moment in the clockwise direction. The translational forces associated with the four hover engines cancel one another. Thus, the vehicle can rotate in place.

In the example of FIGS. 86A, 86B and 86C, all four hover engines' tilt axes are orientated about the edges of a rectangle. This configuration allows the vehicle to move upward/downward or left/right on the page with equal ease. In other embodiments, the hover engines tilt axes can be located around the perimeter of a parallelogram. Thus, the hover engine may more easily generate a translational forces in particular directions, such as left/right on the page versus up/down on the page. Further, in some embodiments, as described above, mechanisms can be provided which allow the direction of a tilt axes to be changed on the fly. Thus, it may be possible to change the configuration of the hover engine tilt axes on the fly.

In the example of FIGS. 86A, 86B and 86C, the force vector generated by each hover engine is assumed to be an equal distance from the center of mass of the vehicle. In other embodiments, the hover engines can be different distances from the center of mass of the vehicle. For example, a pair of two hover engines can each be a first distance from the center of mass and a second pair of hover engines can each be a second distance from the center of mass.

Further, even when the hover engines are the same distance from the center of mass the hover engines can be configured to output different levels of propulsive forces. For instance, one hover engine may use a greater volume of magnets than another hover engine to output more force. In another example, the rotational velocities of two identical hover engines can be different, which can cause the hover engines to output different levels of propulsive forces relative to one another. In one embodiment, multiple hover engines used on a vehicle can be identical and operated at a similar rotational velocity so that they each output a similar amount of force.

In general, when a plurality of actuatable hover engines are used, each hover engine can be positioned at a different distance from the center of mass or combinations of hover engines may be positioned at the same distance from the center of mass. Further, the size of each hover engine, the magnet configurations used on each hover engine and the resultant force output by each hover can vary from hover engine to hover engine on a vehicle. Although, combinations of hover engines within the plurality of hover engines can be selected with equal force generating capabilities. A GNC system can be designed which accounts differences in hover engine placement location on a vehicle and force generation capabilities which differ between hover engines. In addition, the GNC system can be configured to account for dynamic loading and dynamic orientation changes of a vehicle, which affect the forces and moments output from each hover engine.

In the examples above, the STARMs which are part the hover engines are configured to generate lift, propulsive and rotational forces. In other embodiments, it may be desirable to specialize the hover engines. For example, a first hover engine can be configured to primarily generate lift and may be not actuatable for generating propulsive forces. Then, additional hover engines can be configured to generate some portion of the lift and can be actuatable to generate propulsive and rotational forces as well which can be used to control and direct a vehicle. Some magnet configurations may be more suitable for generating propulsive forces as compared to lifting forces. Hence, when multiple hover engines are used on a vehicle, the magnet configurations may be varied between the hover engines.

FIG. 87 shows an example of vehicle 750 with five hover engines. Four of the hover engines are configured in the manner described above with respect to FIG. 85. However, a fifth hover engine 752 located in the center of the vehicle is configured to generate lift only and is non-actuatable whereas four hover engines, similar to what was previously described, can be actuated to generate the propulsive, rotational and control forces.

In particular embodiments, the four hover engines, 702a, 702b, 702c and 702d, may not be able to hover the vehicle alone. For example, in one embodiment, the four STARMs may not be able to hover an unloaded vehicle and may require some lift to be generated from the lift-only engine. In another embodiment, four STARMs may be able to hover the vehicle while it is unloaded. However, if the vehicle carries some amount of payload, then operating the lift only hover engine may be needed.

In one embodiment, the height above the surface of the bottom of the magnets in the propulsive hover engines and height above the surface of the bottom of the magnets in the lift only hover engine can be offset from one another when the STARMs in the propulsive hover engines and the lift only hover engines are parallel to the surface. For example, the height of the bottom of the magnets in the propulsive STARMs can be positioned at a distance farther away from the surface than the height of the bottom of the magnets in the lifting STARM. The amount of force needed to tilt a STARM in a hover engine relative to the surface can increase as the STARM gets closer to the surface. The amount of force increases because magnetic forces are generated non-linearly and increase the closer the magnets are to the surface. Thus, by keeping the propulsive STARMs farther away from the surface than the lifting STARMs during operation, it may be possible to utilize less force to tilt the propulsive STARMs. STARMs with less magnet volume on the propulsive STARMs as compared to the lifting STARMs can also lessen the force output from the propulsive STARMs and hence require less force to tilt than the lifting STARMs.

In one embodiment, a mechanism can be provided, separate from the tilt mechanism, which can be used to control a distance of a hover engine, such as the propulsive STARM from the surface. For example, the mechanism can be configured to move the hover engine in the vertical direction closer or farther away from the surface. This capability can also be used when the vehicle is first started. For example, while at rest, the bottom of the vehicle can rest on the ground and the hover engines can be pulled up into the vehicle enclosure. Then, the hover engines can be started. After the hover engines reach a certain velocity the hover engines can be moved relative to the vehicle such that the hover engines are closer to a bottom of the vehicle.

Since the propulsive hover engines may not be needed to carry the full lift load, in some embodiments, it may be possible to use smaller propulsive and control STARMs than if the control and propulsive STARMs are also used to carry the entire lift load. One advantage of using this approach is that if the control and propulsive STARM can be made smaller (e.g., a smaller radius and moment of inertia), the amount of force used to actuate the STARMs can be smaller. Thus, it may be possible to use smaller, lighter and less expensive actuators.

Another advantage of using hover engines specialized for lift or control is that the operating conditions of the hover engine used to generate lift most efficiently can be different than the operating conditions used to generate the propulsive and control forces most efficiently. Thus, when some of the hover engines are used primarily for lift only, these hover engines may be operated at different conditions as compared to the hover engines configured to generate control forces. For example, to generate relatively more propulsive forces, a control hover engine can be operated at a rotational velocity which is near peak drag, i.e., a lower lift to drag ratio as compared to a higher rotational velocity. In contrast, a lift-only hover engine may be operated at a higher rotational velocity to minimize drag and maximize lift because, as described above, after peak drag the drag force on a hover engine can decrease and the lift to drag ration can increase as the rotational velocity increases.

Next, the NGC system, which can be used to control a hover engine configuration to move a magnetically lifted vehicle, is described. First, each of the functions of navigation, guidance and control (NGC) are briefly discussed. These functions can be incorporated as logic for an NGC system implemented as circuitry on a magnetically lifted device. For example, the NGC system can be a component of the controller 706 in the previous figures.

First, navigation is figuring out where you are and how you are oriented relative to a defined reference frame. For example, where you could be in your car in the driveway, and your orientation is trunk of the car towards the curb. In this example, the reference frame is a flat earth.

Second, guidance involves figuring out a path to take. In particular, guidance is figuring out how to get where you want to go based on where you are. Guidance comes after navigation, because if you don't know where you are, it is difficult to figure out which way to go. Guidance has potentially a very large number of solutions. However, rules and constraints can be imposed to limit the solution size.

Currently, using a personal car limits guidance options by the requirement to follow a predefined system of roadways. Rules about obeying speed limits and stop signs are also a consideration. This shrinks the solution space further. You may also have vehicle limitations. For example, a four cylinder Corolla might not have the same acceleration capability as a Ferrari. This notion can be applied to different configurations of hover engines which can have different performance characteristics.

When the rules and limitations are combined, a guidance solution that defines orientation, velocity, and acceleration as functions of time can be obtained. In the guidance space, there can be flexibility to impose or relax the rules to achieve the performance which is desired. For instance, per the example above, when one is trying to reach a destination very quickly for some reason, one may choose to ignore speed limits for some period of time.

Control is getting the vehicle to perform as the guidance solution asks it to perform. This means accelerating, decelerating, maintaining velocity, etc. so that the vehicle follows the guidance solution as closely a desired. In the current example, the driver is the control system. Thus, he or she monitors the speed and acceleration and can make minute adjustments to maintain the desired conditions. In the examples above, the NGC system can make adjustments to the tilt angles of the hover engines to maintain the desired conditions.

Thus, the combination of navigation, guidance, and control allows a magnetically lifted vehicle to be moved in a desired way. As disturbances do enter the system, it may be important to regularly update the navigation, guidance, and control solutions. A system updated in this manner can form a closed loop system. The closed loop system may allow for more accurate motion of the vehicle under GNC.

In alternate embodiments, an open-loop controller, also called a non-feedback controller, can be used. An open-loop controller is a type of controller that computes its input into a system using only the current state and its model of the system. A characteristic of the open-loop controller is that it does not use feedback to determine if its output has achieved the desired goal of the input. Thus, the system does not observe the output of the processes that it is controlling.

For a magnetically lifted vehicle, the GNC can include combinations of 1) velocity control, 2) waypoint management, 3) acceleration/de-acceleration curves (profiles), 4) velocity profiles, 5) free path, which combines acceleration/de-acceleration profiles and velocity en route and 6) navigation. Navigation can include utilizing one or more of a) dead reckoning, b) an indoor positioning system, c) retro-reflectors, d) infrared, e) magnetics, f) RFID, g) Bluetooth, f) ultrasound and g) GPS. An indoor positioning system (IPS) is a solution to locate objects inside a building, such as a magnetically lifted vehicle, using radio waves, magnetic fields, acoustic signals, or other sensory information collected by appropriate sensors. Various types of sensors sensitive to different types of energies can be used in a navigation solution. Thus, these examples are provided for the purpose of description and are not meant to be limiting.

A method of GNC can involve establishing acceleration/de-acceleration profiles (curves, limits, etc.), which may include establishing velocity acceleration/de-acceleration profiles (curves, etc.). Next, a route can be created. The route can be converted into x and y path points on a surface.

In one embodiment, waypoints can be added. Typically, start and end are waypoints by default. What happens at waypoints (null, stop, specific velocity, etc.) can be defined. Path segments can be defined by waypoints.

Next, the orientation for each path segment (relative to velocity direction, relative to fixed point, spinning profile, etc.) can be defined. With the path segments defined, the GNC system can maneuver the vehicle along each path segment according to user defined velocity/acceleration profiles and orientations. Finally, the current position (x, y) of the vehicle can be monitored relative to a preplanned route with regular navigation updates. As the vehicle moves, a current position and desired position can be compared based upon the sensor data. Then, the system can be configured to correct for errors.

In some embodiments, the hover height of a vehicle can be controlled. Thus, the system can be configured to determine a height profile of a vehicle along a path segment. Then, while the vehicle is maneuvered along the path segment, the system can receive sensor data which is used to determine a height of the vehicle. The system can be configured to compare the measured height from the desired height and then correct for errors.

Next, an embodiment of a GNC system used to control the vehicle described with the respect to FIGS. 88-90 is discussed. In this example, a wireless controller is used to control the vehicle. The wireless controller can generate input signals in response to user commands.

A proportional-integral-derivative controller (PID controller) is a control loop feedback mechanism (controller) often used in industrial control systems. A PID controller can calculate an error value as the difference between a measured process variable and a desired set point. The controller can attempt to minimize the error by adjusting the process through use of a manipulated variable.

The translational motion control for the vehicle can use a PID control system for lateral acceleration control 800. Two lateral acceleration inputs can be received from the user via the wireless controller. These inputs can be fed into their own individual PID control loops, as in FIG. 88.

Inside the control loop, the input can be differenced with the acceleration output feedback measured by the accelerometer. The resulting difference is the error. The error can be fed into the PID controller, which can have three components, the proportional control, the integral control, and the differential control.

The proportional element multiplies the error by a proportional gain, Kp. The integral element computes the sum of the errors over time, and multiplies this by the integral gain, K1. The differential control differences the current input with the previous input, and multiples this difference by the differential gain, KD. The proportional, integral, and differential elements are then summed and sent to the mixing logic as shown in equation 810 of FIG. 89.

The outputs from the mixing logic are sent into the plant, G. The resulting translational acceleration is the output from the plant. The vehicle's translational acceleration is measured by the accelerometers. This measured acceleration is fed back to the beginning of the PID control loop.

The spin control for the vehicle can use a PI (Proportional-Integral) control system 820 for yaw speed control, as shown in the block diagram in FIG. 90. A yaw acceleration input is received from the user via an RC controller. This yaw input can be differenced with the yaw output feedback measured by the gyroscope. The resulting difference is the error. This error can be fed into the PI controller, which has two components, the proportional control and the integral control. The proportional element multiplies the error by a proportional gain, Kp.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations can be applied to the compositions and methods and in the steps or in the sequence of steps of the methods described herein without departing from the concept, spirit and scope of the disclosure. More specifically, it will be apparent that certain agents which are related can be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A device for transportation utilizing magnetic levitation comprising
one or more vehicles capable of use for transportation in a tube or over any conductive substrate comprising at least one hover engine, each hover engine having an electric motor including a winding, a first set of magnets and a first structure which holds the first p magnets wherein an electric current is applied to the winding to cause one of the winding or the first set of magnets to rotate; wherein the magnets are permanent magnets, electromagnets, or a combination of permanent magnets and electromagnets;
a second structure, configured to receive a rotational torque from the electric motor to rotate the second structure, the structure holding a second set of magnets wherein the second set of magnets are rotated to induce eddy currents in a substrate such that the induced eddy currents and the second set of magnets interact to generate forces which cause the vehicle to hover above and/or translate from location to location along the substrate; wherein the magnets are permanent magnets, electromagnets, or a combination of permanent magnets and electromagnets;
one or more speed controllers coupled to the at least one hover engine;
an electric power source that supplies the electric current to the at least one hover engine via the one or more speed controllers; and
a travelling surface;
wherein the one or more vehicles are capable of moving in at least two directions.

2. The device of claim 1 wherein the cross-section of the vehicle is a different shape than the cross-section of the tube.

3. The device of claim 1 wherein the cross-section of the vehicle is a shape that is the same as the cross-section of the tube.

4. The device of claim 1 wherein the vehicle is capable of moving in at least four directions.

5. The device of claim 2 wherein the vehicle is capable of moving in at least five directions.

6. The device of claim 4 wherein the directions are forward, backward, laterally, diagonally, and upward.

7. The device of claim 1 wherein the vehicle is controlled by an individual inside of the vehicle.

8. The device of claim 1 wherein the vehicle is controlled by an external entity.

9. The device of claim 8 wherein the entity is selected from the group consisting of an individual and a computer.

10. The device of claim 1 wherein the device transports people.

11. The device of claim 1 wherein the device transports cargo.

12. The device of claim 1 wherein the vehicle travels on at least one selected from the group consisting of conduit, tube, tunnel, a conductive surface, and rail.

13. A system of transportation comprising the vehicle of claim 1 and a network of interconnected traveling surfaces.

14. The system of claim 13 wherein the interconnected traveling surfaces comprise at least one selected from the group consisting of conduit, tube, tunnel, and rail.

15. The system of claim 13 wherein the interconnected traveling surfaces are tubes or any conductive substrate.

16. The system of claim 15 wherein the cross-section of the vehicle is a different shape than the cross-section of the tube.

17. The system of claim 15 wherein the cross-section of the vehicle is a shape that is the same as the cross-section of the tube.

18. The system of claim 13 wherein the vehicle carries individuals.

19. The system of claim 13 wherein the vehicle carries cargo.

20. The system of claim 13 wherein the interconnected traveling surfaces comprise a conductive substrate.

21. The system of claim 13 wherein the vehicle travels in a tube.

22. The system of claim 21 wherein the tube has been pressurized.

23. The system of claim 21 wherein the tube has been evacuated of fluid.

24. The system of claim 13 wherein a route of the vehicle can be changed dynamically.

25. The system of claim 13 wherein the vehicle can be used with at least one selected from the group consisting of wheels, skids, standoffs, lifts, struts, superconductivity, or other means of static or dynamic support, tracking, propulsion, levitation, guidance, and influence.

26. The system of claim 15 wherein at least one selected from the group consisting of suspension struts, levitation, rolling, track, or suspension components extend from the vehicle in a manner that reduces aerodynamic obstruction within the tube.

27. The system of claim 13 wherein the vehicles travel between 400-800 mph.

* * * * *